(12) United States Patent
Nogami et al.

(10) Patent No.: US 12,200,763 B2
(45) Date of Patent: Jan. 14, 2025

(54) USER EQUIPMENTS, BASE STATIONS, AND METHODS

(71) Applicant: Sharp Kabushiki Kaisha, Sakai (JP)

(72) Inventors: Toshizo Nogami, Sakai (JP); Shoichi Suzuki, Sakai (JP); Tomoki Yoshimura, Sakai (JP); Huifa Lin, Sakai (JP); Daiichiro Nakashima, Sakai (JP); Wataru Ouchi, Sakai (JP); Taewoo Lee, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 408 days.

(21) Appl. No.: 17/633,285

(22) PCT Filed: Aug. 11, 2020

(86) PCT No.: PCT/JP2020/030928
§ 371 (c)(1),
(2) Date: Feb. 7, 2022

(87) PCT Pub. No.: WO2021/029441
PCT Pub. Date: Feb. 18, 2021

(65) Prior Publication Data
US 2022/0377791 A1 Nov. 24, 2022

(30) Foreign Application Priority Data
Aug. 9, 2019 (JP) .................. 2019-147911

(51) Int. Cl.
*H04W 72/12* (2023.01)
*H04W 74/00* (2009.01)
*H04W 74/0808* (2024.01)

(52) U.S. Cl.
CPC ..... *H04W 74/0808* (2013.01); *H04W 74/006* (2013.01)

(58) Field of Classification Search
CPC ......... H04W 56/0015; H04W 56/0045; H04W 74/006; H04W 74/0808
See application file for complete search history.

(56) References Cited

U.S. PATENT DOCUMENTS

| 11,445,539 B2 * | 9/2022 | Bhattad ................. H04L 5/0082 |
| 2017/0359808 A1 | 12/2017 | Dinan |

(Continued)

FOREIGN PATENT DOCUMENTS

| CA | 3125661 A1 * | 7/2020 | ........... H04L 1/1812 |
| WO | WO-2020091559 A1 * | 5/2020 | ......... H04L 41/0803 |

OTHER PUBLICATIONS

Huawei et al., "PHY signaling design for eLAA", 3GPP TSG RAN WG1 Meeting #85, R1-164829, May 23-27, 2016, 5 pages.

(Continued)

*Primary Examiner* — Phuc H Tran
(74) *Attorney, Agent, or Firm* — Keating & Bennett, LLP

(57) ABSTRACT

A UE which communicates with a base station is described. The UE may comprise receiving circuitry configured to monitor a PDCCH with a DCI format; transmitting circuitry configured to transmit a PUSCH subject to a channel access procedure, a starting position of initial symbol for PUSCH being adjusted by x; wherein the DCI format includes a 4-bit information field, the 4-bit information is characterized by at least one or more of following values.

3 Claims, 35 Drawing Sheets

(56) References Cited

U.S. PATENT DOCUMENTS

| | | | |
|---|---|---|---|
| 2019/0150170 A1* | 5/2019 | Park | H04W 74/08 |
| | | | 370/329 |
| 2020/0127796 A1* | 4/2020 | Li | H04L 1/1812 |
| 2020/0267764 A1* | 8/2020 | Rastegardoost | H04W 76/27 |
| 2022/0353758 A1* | 11/2022 | Rastegardoost | H04W 72/23 |

OTHER PUBLICATIONS

LG Electronics, "LBT parameter signalling in LAA", 3GPP TSG RAN WG1 Meeting #86, R1-166818, Aug. 22-26, 2016, 5 pages.

\* cited by examiner

| Channel Access Priority Class (p) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

FIG. 18

| Channel Access Priority Class ($p$) | $m_p$ | $CW_{min,p}$ | $CW_{max,p}$ | $T_{mcot,p}$ | Allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

FIG. 19

USER EQUIPMENTS, BASE STATIONS, AND METHODS

TECHNICAL FIELD

The present disclosure relates generally to communication systems. More specifically, the present disclosure relates to new signaling, procedures, user equipments (UEs), base stations and methods.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 18 shows an example of channel access priority class for downlink transmission(s);

FIG. 19 shows an example of channel access priority class for uplink transmission(s);

DESCRIPTION OF EMBODIMENTS

Figure 1:
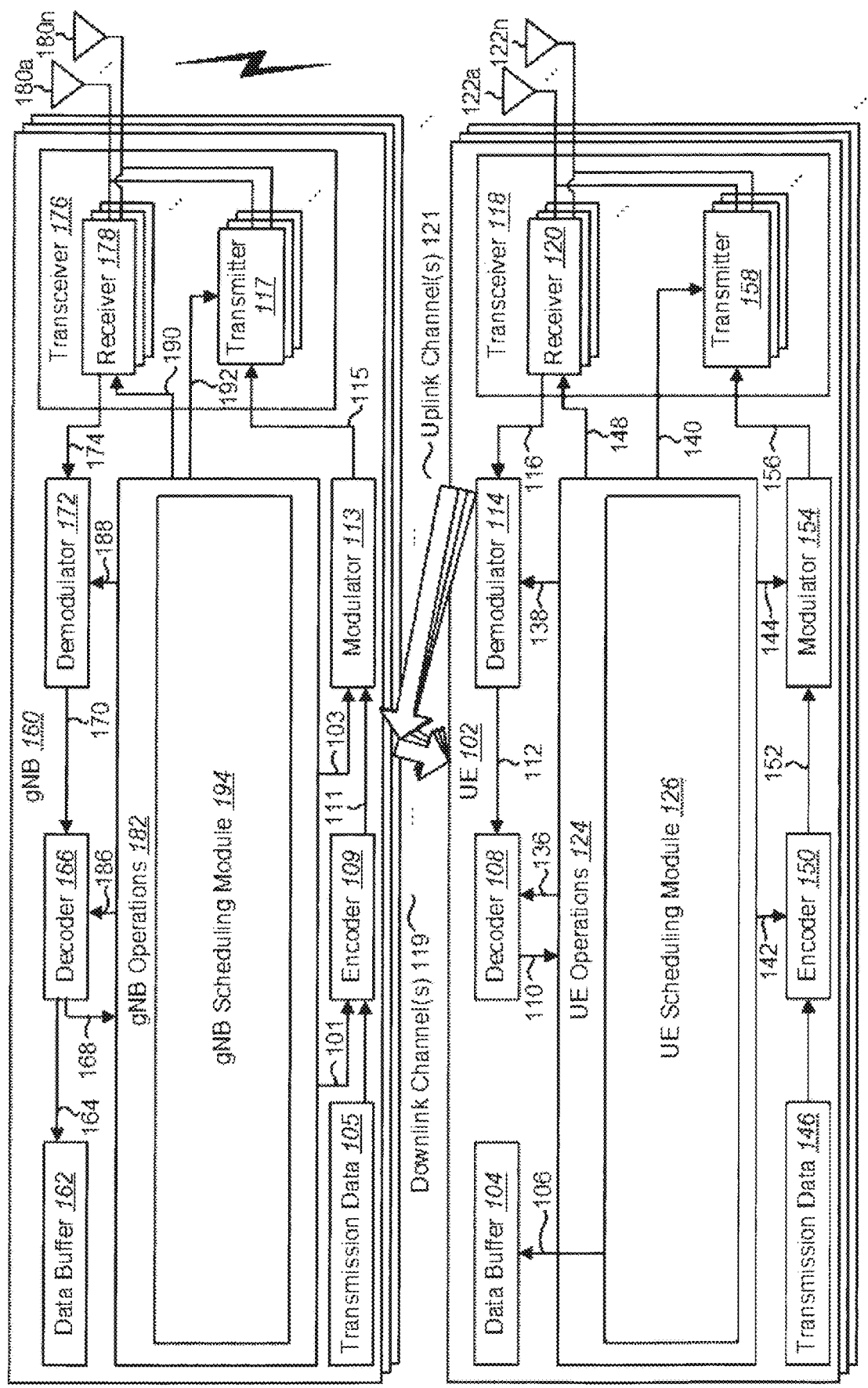
FIG. 1 is a block diagram illustrating one implementation of one or more gNBs and one or more user equipments (UEs) in which systems and methods for downlink and uplink transmissions may be implemented.

A user equipment (UE) which communicates with a base station is described. The UE may comprise receiving circuitry configured to monitor a physical downlink control channel (PDCCH) with a down link control (DCI) format. The UE may also comprise transmitting circuitry configured to transmit a physical uplink shared channel (PUSCH) subject to a channel access procedure. A starting position of the PUSCH may be x micro seconds after an initial boundary of an initial symbol which is assigned for the PUSCH. The DCI format may include a 4-bit information field. The 4-bit information may be characterized by at least one or more of following values: a first value of the 4-bit information field indicates that a channel access procedure type is Category-1 Listen-Before-Talk (Cat-1 LBT) and $(N_{TA}+N_{TA\_offset})*T_c \leq x < (N_{TA}+N_{TA\_offset})*T_c+16$; a second value of the 4-bit information field indicates that the channel access procedure type is Cat-2 LBT, a duration for Cat-2 LBT is 16 micro seconds and $x=(N_{TA}+N_{TA\_offset})*T_c+16$; a third value of the 4-bit information field indicates that the channel access procedure type is Cat-2 LBT, the duration for Cat-2 LBT is 25 micro seconds and x=0; a fourth value of the 4-bit information field indicates that the channel access procedure type is Cat-2 LBT, the duration for Cat-2 LBT is 25 micro seconds and x=25; a fifth value of the 4-bit information field indicates that the channel access procedure type is Cat-2 LBT, the duration for Cat-2 LBT is 25 micro seconds and $x=(N_{TA}+N_{TA\_offset})*T_c+25$; a sixth value of the 4-bit information field indicates that the channel access procedure type is Cat-4 LBT, channel access priority class for Cat-4 LBT is class 1 and x=0; a seventh value of the 4-bit information field indicates that the channel access procedure type is Cat-4 LBT, the channel access priority class for Cat-4 LBT is class 2 and x=0; an eighth value of the 4-bit information field indicates that the channel access procedure type is Cat-4 LBT, the channel access priority class for Cat-4 LBT is class 3 and x=0; and a ninth value of the 4-bit information field indicates that the channel access procedure type is Cat-4 LBT, the channel access priority class for Cat-4 LBT is class 4 and x=0. $N_{TA}$ may be a timing adjustment value. $N_{TA\_offset}$ may be a timing advance offset value. $T_c$ may be $1/(480*10^3*4096)$.

The 4-bit information may be characterized by at least one or more of following values: a tenth value of the 4-bit information field indicates that the channel access procedure type is Cat-4 LBT, the channel access priority class for Cat-4 LBT is class 1 and $x=N_{TA\_offset}*T_c$; an eleventh value of the 4-bit information field indicates that the channel access procedure type is Cat-4 LBT, the channel access priority class for Cat-4 LBT is class 2 and $x=N_{TA\_offset}*T_c$; a twelfth value of the 4-bit information field indicates that the channel access procedure type is Cat-4 LBT, the channel access priority class for Cat-4 LBT is class 3 and $x=N_{TA\_offset}*T_c$; and a thirteenth value of the 4-bit information field indicates that the channel access procedure type is Cat-4 LBT, the channel access priority class for Cat-4 LBT is class 4 and $x=N_{TA\_offset}*T_c$.

A base station which communicates with a user equipment (UE) is described. The base station may comprise transmitting circuitry configured to transmit a physical downlink control channel (PDCCH) with a down link control (DCI) format. The base station may also comprise receiving circuitry configured to receive a physical uplink shared channel (PUSCH) which is transmitted subject to a channel access procedure. A starting position of the PUSCH may be x micro seconds after an initial boundary of an initial symbol which is assigned for the PUSCH. The DCI format may include a 4-bit information field. The 4-bit information may be characterized by at least one or more of following values: a first value of the 4-bit information field indicates that a channel access procedure type is Category-1 Listen-Before-Talk (Cat-1 LBT) and $(N_{TA}+N_{TA\_offset})*T_c \leq x < (N_{TA}+N_{TA\_offset})*T_c+16$; a second value of the 4-bit information field indicates that the channel access procedure type is Cat-2 LBT, a duration for Cat-2 LBT is 16 micro seconds and $x=(N_{TA}+N_{TA\_offset})*T_c+16$; a third value of the 4-bit information field indicates that the channel access procedure type is Cat-2 LBT, the duration for Cat-2 LBT is 25 micro seconds and x=0; a fourth value of the 4-bit information field indicates that the channel access procedure type is Cat-2 LBT, the duration for Cat-2 LBT is 25 micro seconds and x=25; a fifth value of the 4-bit information field indicates that the channel access procedure type is Cat-2 LBT, the duration for Cat-2 LBT is 25 micro seconds and $x=(N_{TA}+N_{TA\_offset})*T_c+25$; a sixth value of the 4-bit information field indicates that the channel access procedure type is Cat-4 LBT, channel access priority class for Cat-4 LBT is class 1 and x=0; a seventh value of the 4-bit information field indicates that the channel access procedure type is Cat-4 LBT, the channel access priority class for Cat-4 LBT is class 2 and x=0; an eighth value of the 4-bit information field indicates that the channel access procedure type is Cat-4 LBT, the channel access priority class for Cat-4 LBT is class 3 and x=0; and a ninth value of the 4-bit information field indicates that the channel access procedure type is Cat-4 LBT, the channel access priority class for Cat-4 LBT is class 4 and x=0. $N_{TA}$ may be a timing adjustment value. $N_{TA\_offset}$ may be a timing advance offset value. $T_c$ may be $1/(480*10^3*4096)$.

The 4-bit information may be characterized by at least one or more of following values: a tenth value of the 4-bit information field indicates that the channel access procedure type is Cat-4 LBT, the channel access priority class for Cat-4 LBT is class 1 and $x=N_{TA\_offset}*T_c$; an eleventh value of the 4-bit information field indicates that the channel access procedure type is Cat-4 LBT, the channel access priority class for Cat-4 LBT is class 2 and $x=N_{TA\_offset}*T_c$; a twelfth value of the 4-bit information field indicates that the channel access procedure type is Cat-4 LBT, the channel access priority class for Cat-4 LBT is class 3 and $x=N_{TA\_offset}*T_c$; and a thirteenth value of the 4-bit information field indicates that the channel access procedure type is Cat-4 LBT, the channel access priority class for Cat-4 LBT is class 4 and $x=N_{TA\_offset}*T_c$.

A method for a user equipment (UE) which communicates with a base station is described. The method may comprise monitoring a physical downlink control channel (PDCCH) with a down link control (DCI) format. The method may also comprise transmitting a physical uplink shared channel (PUSCH) subject to a channel access procedure. A starting position of the PUSCH may be x micro seconds after an initial boundary of an initial symbol which is assigned for the PUSCH. The DCI format may include a 4-bit information field. The 4-bit information may be characterized by at least one or more of following values: a first value of the 4-bit information field indicates that a channel access procedure type is Category-1 Listen-Before-Talk (Cat-1 LBT) and $(N_{TA}+N_{TA\_offset})*T_c \leq x < (N_{TA}+N_{TA\_offset})*T_c+16$; a second value of the 4-bit information field indicates that the channel access procedure type is Cat-2 LBT, a duration for Cat-2 LBT is 16 micro seconds and $x=(N_{TA}+N_{TA\_offset})*T_c+16$; a third value of the 4-bit information field indicates that the channel access procedure type is Cat-2 LBT, the duration for Cat-2 LBT is 25 micro seconds and x=0; a fourth value of the 4-bit information field indicates that the channel access procedure type is Cat-2 LBT, the duration for Cat-2 LBT is 25 micro seconds and x=25; a fifth value of the 4-bit information field indicates that the channel access procedure type is Cat-2 LBT, the duration for Cat-2 LBT is 25 micro seconds and $x=(N_{TA}+N_{TA\_offset})*T_c+25$; a sixth value of the 4-bit information field indicates that the channel access procedure type is Cat-4 LBT, channel access priority class for Cat-4 LBT is class 1 and x=0; a seventh value of the 4-bit information field indicates that the channel access procedure type is Cat-4 LBT, the channel access priority class for Cat-4 LBT is class 2 and x=0; an eighth value of the 4-bit information field indicates that the channel access procedure type is Cat-4 LBT, the channel access priority class for Cat-4 LBT is class 3 and x=0; and a ninth value of the 4-bit information field indicates that the channel access procedure type is Cat-4 LBT, the channel access priority class for Cat-4 LBT is class 4 and x=0. $N_{TA}$ may be a timing adjustment value. $N_{TA\_offset}$ may be a timing advance offset value. $T_c$ may be $1/(480*10^3*4096)$.

A method for a base station which communicates with a user equipment (UE) is described. The method may comprise transmitting a physical downlink control channel (PDCCH) with a down link control (DCI) format. The method may also comprise receiving a physical uplink shared channel (PUSCH) which is transmitted subject to a channel access procedure. A starting position of the PUSCH may be x micro seconds after an initial boundary of an initial symbol which is assigned for the PUSCH. The DCI format may include a 4-bit information field. The 4-bit information may be characterized by at least one or more of following values: a first value of the 4-bit information field indicates that a channel access procedure type is Category-1 Listen-Before-Talk (Cat-1 LBT) and $(N_{TA} \pm N_{TA\_offset})*T_c \leq x < (N_{TA} \pm N_{TA\_offset})*T_c+16$; a second value of the 4-bit information field indicates that the channel access procedure type is Cat-2 LBT, a duration for Cat-2 LBT is 16 micro seconds and $x=(N_{TA}+N_{TA\_offset})*T_c+16$; a third value of the 4-bit information field indicates that the channel access procedure type is Cat-2 LBT, the duration for Cat-2 LBT is 25 micro seconds and $x=0$; a fourth value of the 4-bit information field indicates that the channel access procedure type is Cat-2 LBT, the duration for Cat-2 LBT is 25 micro seconds and $x=25$; a fifth value of the 4-bit information field indicates that the channel access procedure type is Cat-2 LBT, the duration for Cat-2 LBT is 25 micro seconds and $x=(N_{TA}\pm N_{TA\_offset})*T_c+25$; a sixth value of the 4-bit information field indicates that the channel access procedure type is Cat-4 LBT, channel access priority class for Cat-4 LBT is class 1 and $x=0$; a seventh value of the 4-bit information field indicates that the channel access procedure type is Cat-4 LBT, the channel access priority class for Cat-4 LBT is class 2 and $x=0$; an eighth value of the 4-bit information field indicates that the channel access procedure type is Cat-4 LBT, the channel access priority class for Cat-4 LBT is class 3 and $x=0$; and a ninth value of the 4-bit information field indicates that the channel access procedure type is Cat-4 LBT, the channel access priority class for Cat-4 LBT is class 4 and $x=0$. $N_{TA}$ may be a timing adjustment value. $N_{TA}$ offset may be a timing advance offset value. $T_c$ may be $1/(480*10^3*4096)$.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as The 3rd Generation NR (5G NR). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, vehicles, Internet of Things (IoT) devices, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and eMTC (massive Machine Type Communication) transmission. Also, in NR, single-beam and/or multi-beam operations is considered for downlink and/or uplink transmissions.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for downlink and uplink transmissions may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)), and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel), and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more receivers 120 may also sense the channel which would to be used for uplink transmissions. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may include received payload data, which may be stored in a data buffer 104. Another signal included in the decoded signals 110 (also referred to as a second UE-decoded signal 110) may include overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160.

The UE operations module 124 may include one or more of a UE scheduling module 126.

The UE scheduling module 126 may also be referred to as UE-side higher layer processing module which performs higher layer processing. The other units than UE scheduling module 126 in UE 102 may perform physical layer processing.

In a radio communication system, physical channels (uplink physical channels and/or downlink physical channels) may be defined. The physical channels (uplink physical channels and/or downlink physical channels) may be used for transmitting information that is delivered from a higher layer. For example, PCCH (Physical Control Channel) may be defined. PCCH is used to transmit control information.

In uplink, PCCH (e.g., Physical Uplink Control Channel (PUCCH)) is used for transmitting Uplink Control Information (UCI). The UCI may include Hybrid Automatic Repeat Request (HARQ-ACK), Channel State information (CSI), and/or Scheduling Request (SR). The HARQ-ACK is used for indicating a positive acknowledgement (ACK) or a negative acknowledgment (NACK) for downlink data (i.e., Transport block(s) carrying Medium Access Control Control Element (MAC CE) and/or MAC Protocol Data Unit (MAC PDU) which may contain Downlink Shared Channel (DL-SCH)). The CSI is used for indicating state of downlink channel. Also, the SR is used for requesting resources of uplink data (i.e., Transport block(s) carrying MAC CE and/or MAC PDU which may contain Uplink Shared Channel (UL-SCH)).

The UE 102 may be configured, for DL, to receive code block group (CBG) based transmissions where retransmissions may be scheduled to carry one or more sub-sets of all the code blocks of a transport block. The UE 102 may be configured to transmit CBG based transmissions where retransmissions may be scheduled to carry one or more sub-sets of all the code blocks of a transport block.

In downlink, PCCH (e.g., Physical Downlink Control Channel (PDCCH)) may be used for transmitting Downlink Control Information (DCI). Here, more than one DCI formats may be defined for DCI transmission on the PDCCH. Namely, fields may be defined in the DCI format, and the fields are mapped to the information bits (i.e., DCI bits). For example, a DCI format 1A that is used for scheduling of one physical shared channel (PSCH) (e.g., PDSCH, transmission of one downlink transport block) in a cell is defined as the DCI format for the downlink. The DCI format(s) for PDSCH scheduling may include multiple information field, for example, carrier indicator field, frequency domain PDSCH resource allocation field, time domain PDSCH resource allocation field, bundling size field, MCS field, new data indicator field, redundancy version field, HARQ process number field, code block group flush indicator (CBGFI) field, code block group transmission indicator (CBGTI) field, PUCCH power control field, PUCCH resource indicator field, antenna port field, number of layer field, quasi-co-location (QCL) indication field, SRS triggering request field, and RNTI field. More than one pieces of the above information may be jointly coded, and in this instance jointly coded information may be indicated in a single information field.

Also, for example, a DCI format 0 that is used for scheduling of one PSCH (e.g., PUSCH, transmission of one uplink transport block) in a cell is defined as the DCI format for the uplink. For example, information associated with PSCH (a PDSCH resource, PUSCH resource) allocation, information associated with modulation and coding scheme (MCS) for PSCH, and DCI such as Transmission Power Control (TPC) command for PUSCH and/or PUCCH are included the DCI format. Also, the DCI format may include information associated with a beam index and/or an antenna port. The beam index may indicate a beam used for downlink transmissions and uplink transmissions. The antenna port may include DL antenna port and/or UL antenna port. The DCI format(s) for PUSCH scheduling may include multiple information field, for example, carrier indicator field, frequency domain PUSCH resource allocation field, time domain PUSCH resource allocation field, MCS field, new data indicator field, redundancy version field, HARQ process number field, code block group flush indicator (CBGFI) field, code block group transmission indicator (CBGTI) field, PUSCH power control field, SRS resource indicator (SRI) field, wideband and/or subband transmit precoding matrix indicator (TPMI) field, antenna port field, scrambling identity field, number of layer field, CSI report triggering request field, CSI measurement request field, SRS triggering request field, and RNTI field. More than one pieces of the above information may be jointly coded, and in this instance jointly coded information may be indicated in a single information field.

Also, for example, PSCH may be defined. For example, in a case that the downlink PSCH resource (e.g., PDSCH resource) is scheduled by using the DCI format, the UE 102 may receive the downlink data, on the scheduled downlink PSCH resource. Also, in a case that the uplink PSCH resource (e.g., PUSCH resource) is scheduled by using the DCI format, the UE 102 transmits the uplink data, on the scheduled uplink PSCH resource. Namely, the downlink PSCH is used to transmit the downlink data. And, the uplink PSCH is used to transmit the uplink data.

Furthermore, the downlink PSCH and the uplink PSCH are used to transmit information of higher layer (e.g., Radio Resource Control (RRC)) layer, and/or MAC layer). For example, the downlink PSCH and the uplink PSCH are used to transmit RRC message (RRC signal) and/or MAC Control Element (MAC CE). Here, the RRC message that is transmitted from the gNB 160 in downlink may be common to multiple UEs 102 within a cell (referred as a common RRC message). Also, the RRC message that is transmitted from the gNB 160 may be dedicated to a certain UE 102 (referred as a dedicated RRC message). The RRC message and/or the MAC CE are also referred to as a higher layer signal.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the transmission data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more receivers 178 may also sense the channel which would to be used for downlink transmissions. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may include received payload data (e.g. UL TB), which may be stored in a data buffer 162. A second eNB-decoded signal 168 may include overhead data and/or control data. For example, the second eNB-decoded signal 168 may provide data (e.g., Uplink control information such as HARQ-ACK feedback information for PDSCH) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may also be referred to as gNB-side higher layer processing module which performs higher layer processing. The other units than gNB scheduling module 194 in gNB 160 may perform physical layer processing.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the transmission data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special slot.

It should also be noted that one or more of the elements or parts thereof included in the gNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

The downlink physical layer processing of transport channels may include: Transport block CRC attachment; Code block segmentation and code block CRC attachment; Channel coding (LDPC coding); Physical-layer hybrid-ARQ processing; Rate matching; Scrambling; Modulation (QPSK, 16QAM, 64QAM and 256QAM); Layer mapping; and Mapping to assigned resources and antenna ports.

Figure 2:
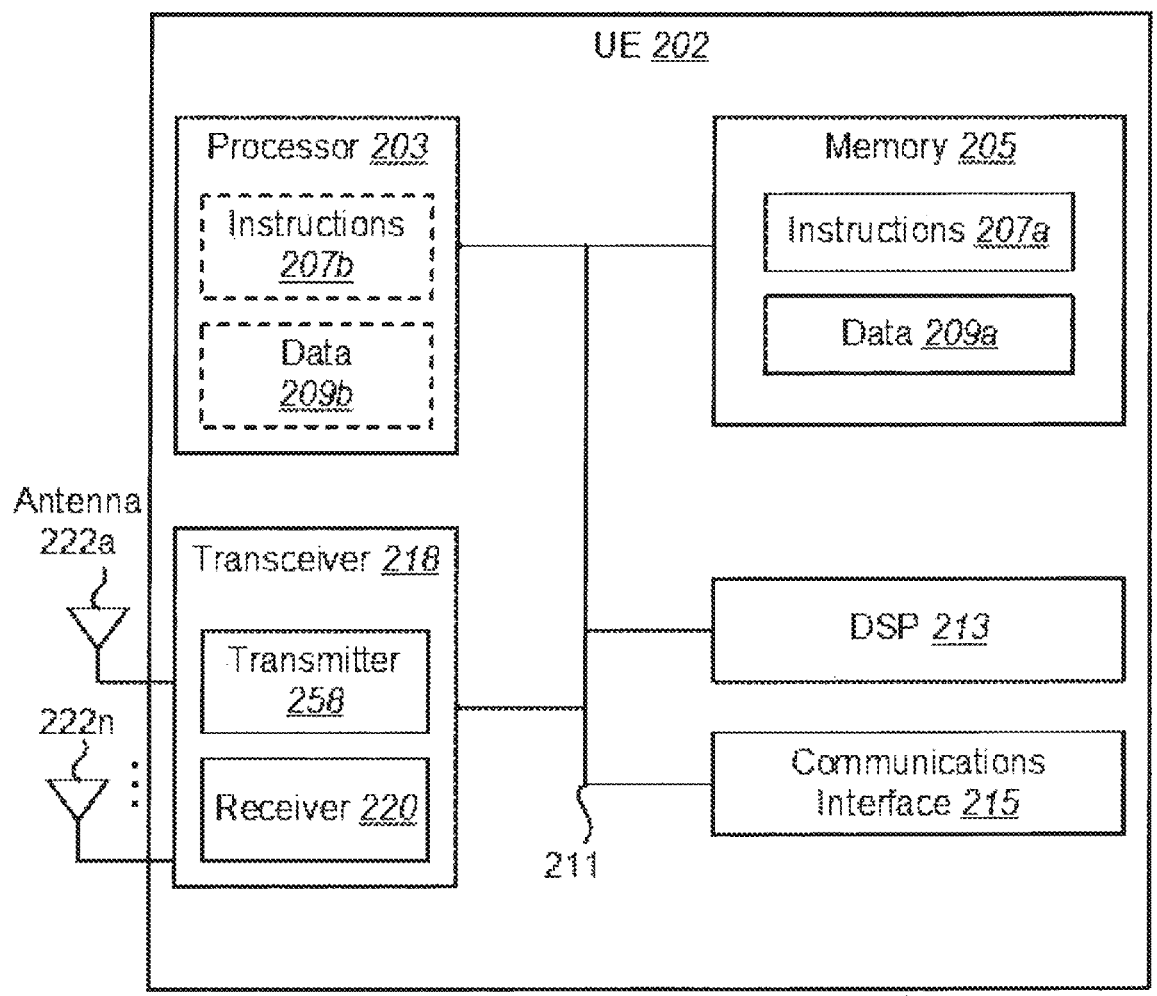
FIG. 2 illustrates various components that may be utilized in a UE.

FIG. 2 illustrates various components that may be utilized in a UE 202. The UE 202 described in connection with FIG. 2 may be implemented in accordance with the UE 22 described in connection with FIG. 1. The UE 202 includes a processor 203 that controls operation of the UE 202. The processor 203 may also be referred to as a central processing unit (CPU). Memory 205, which may include read-only memory (ROM), random access memory (RAM), a combination of the two or any type of device that may store information, provides instructions 207a and data 209a to the processor 203. A portion of the memory 205 may also include non-volatile random access memory (NVRAM). Instructions 207b and data 209b may also reside in the processor 203. Instructions 207b and/or data 209b loaded into the processor 203 may also include instructions 207a and/or data 209a from memory 205 that were loaded for execution or processing by the processor 203. The instructions 207b may be executed by the processor 203 to implement the methods described above.

The UE 202 may also include a housing that contains one or more transmitters 258 and one or more receivers 220 to allow transmission and reception of data. The transmitter(s) 258 and receiver(s) 220 may be combined into one or more transceivers 218. One or more antennas 222a-n are attached to the housing and electrically coupled to the transceiver 218.

The various components of the UE 202 are coupled together by a bus system 211, which may include a power bus, a control signal bus and a status signal bus, in addition to a data bus. However, for the sake of clarity, the various buses are illustrated in FIG. 2 as the bus system 211. The UE 202 may also include a digital signal processor (DSP) 213 for use in processing signals. The UE 202 may also include a communications interface 215 that provides user access to the functions of the UE 202. The UE 202 illustrated in FIG. 2 is a functional block diagram rather than a listing of specific components.

Figure 3:
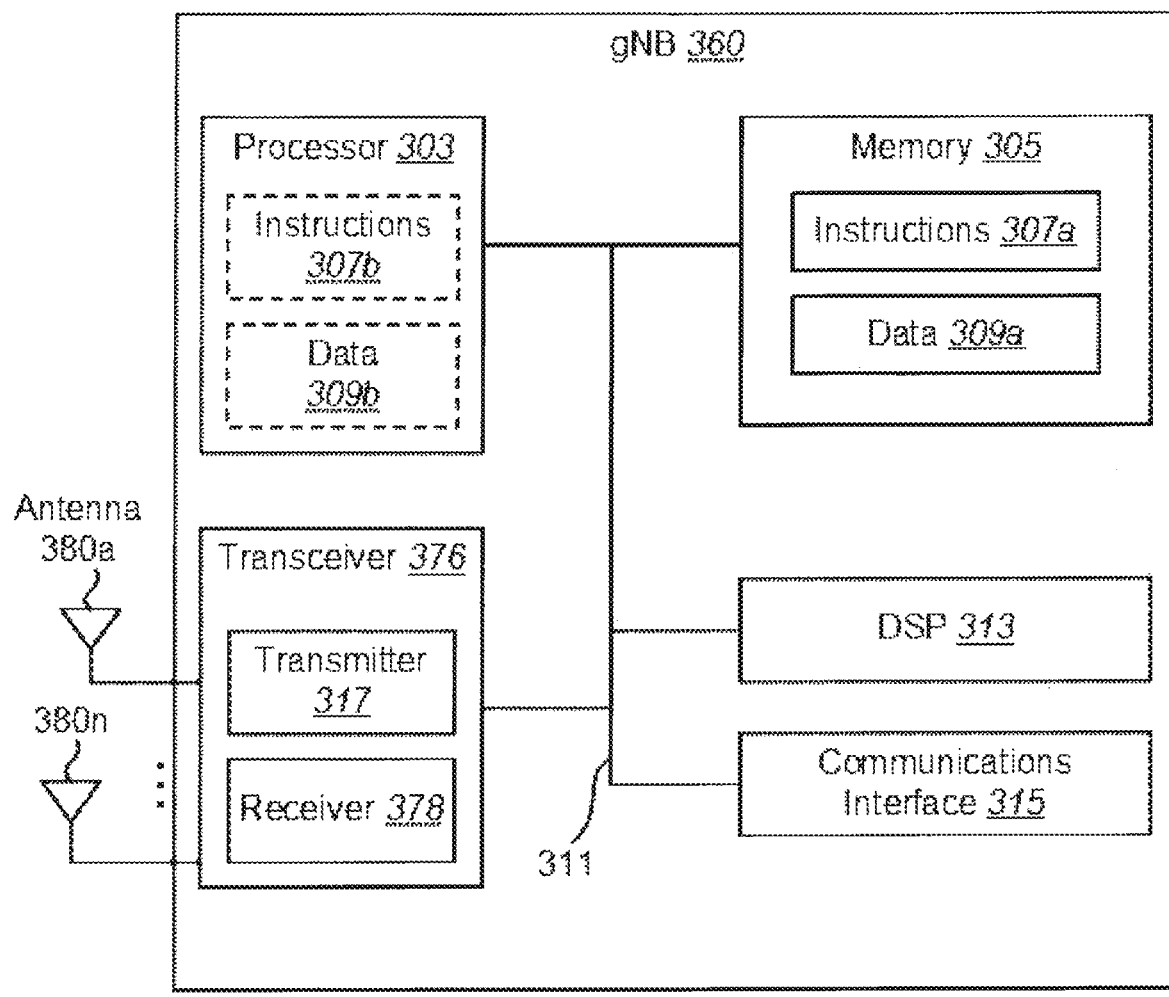
FIG. 3 illustrates various components that may be utilized in a gNB.

FIG. 3 illustrates various components that may be utilized in a gNB 360. The gNB 360 described in connection with FIG. 3 may be implemented in accordance with the gNB 160 described in connection with FIG. 1. The gNB 360 includes a processor 303 that controls operation of the gNB 360. The processor 303 may also be referred to as a central processing unit (CPU). Memory 305, which may include read-only memory (ROM), random access memory (RAM), a combination of the two or any type of device that may store information, provides instructions 307a and data 309a to the processor 303. A portion of the memory 305 may also include non-volatile random access memory (NVRAM). Instructions 307b and data 309b may also reside in the processor 303. Instructions 307b and/or data 309b loaded into the processor 303 may also include instructions 307a and/or data 309a from memory 305 that were loaded for execution or processing by the processor 303. The instructions 307b may be executed by the processor 303 to implement the methods described above.

The gNB 360 may also include a housing that contains one or more transmitters 317 and one or more receivers 378 to allow transmission and reception of data. The transmitter(s) 317 and receiver(s) 378 may be combined into one or more transceivers 376. One or more antennas 380a-n are attached to the housing and electrically coupled to the transceiver 376.

The various components of the gNB 360 are coupled together by a bus system 311, which may include a power bus, a control signal bus and a status signal bus, in addition to a data bus. However, for the sake of clarity, the various buses are illustrated in FIG. 3 as the bus system 311. The gNB 360 may also include a digital signal processor (DSP)

313 for use in processing signals. The gNB 360 may also include a communications interface 315 that provides user access to the functions of the gNB 360. The gNB 360 illustrated in FIG. 3 is a functional block diagram rather than a listing of specific components.

Figure 4:
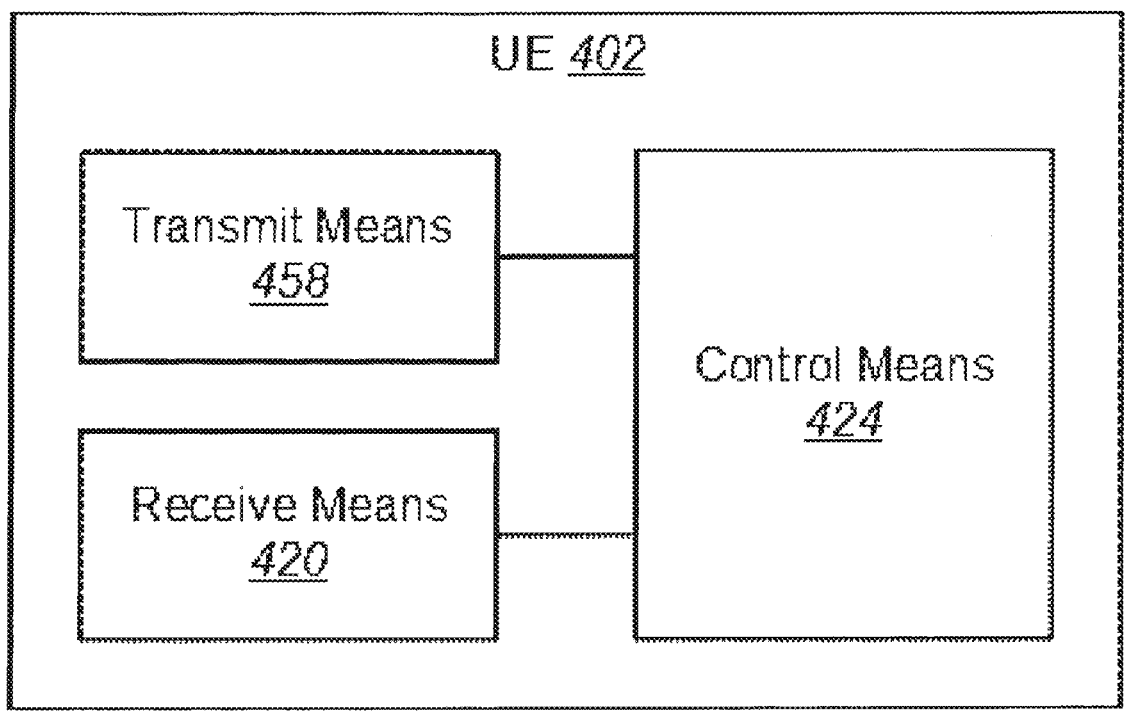
FIG. 4 is a block diagram illustrating one implementation of a UE in which systems and methods for downlink and uplink transmissions may be implemented.

FIG. 4 is a block diagram illustrating one implementation of a UE 402 in which systems and methods for downlink and uplink transmissions may be implemented. The UE 402 includes transmit means 458, receive means 420 and control means 424. The transmit means 458, receive means 420 and control means 424 may be configured to perform one or more of the functions described in connection with FIG. 1 above. FIG. 2 above illustrates one example of a concrete apparatus structure of FIG. 4. Other various structures may be implemented to realize one or more of the functions of FIG. 1. For example, a DSP may be realized by software.

Figure 5:
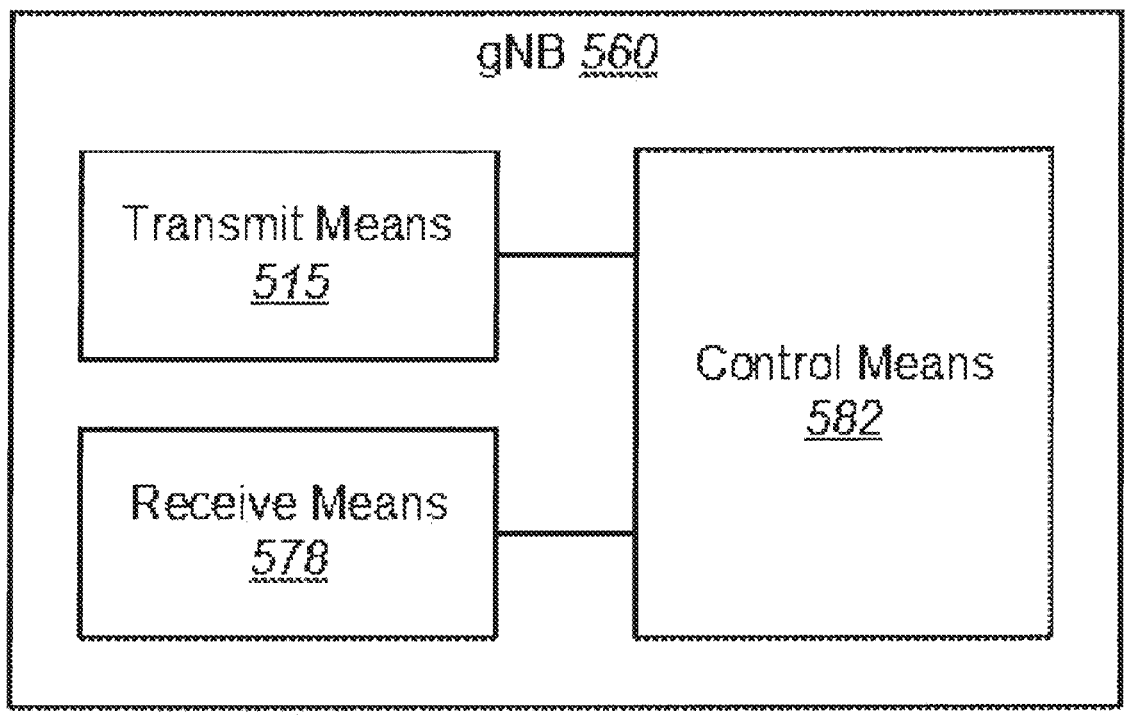
FIG. 5 is a block diagram illustrating one implementation of a gNB in which systems and methods for downlink and uplink transmissions may be implemented.

FIG. 5 is a block diagram illustrating one implementation of a gNB 560 in which systems and methods for downlink and uplink transmissions may be implemented. The gNB 560 includes transmit means 517, receive means 578 and control means 582. The transmit means 517, receive means 578 and control means 582 may be configured to perform one or more of the functions described in connection with FIG. 1 above. FIG. 3 above illustrates one example of a concrete apparatus structure of FIG. 5. Other various structures may be implemented to realize one or more of the functions of FIG. 1. For example, a DSP may be realized by software.

Figure 6:
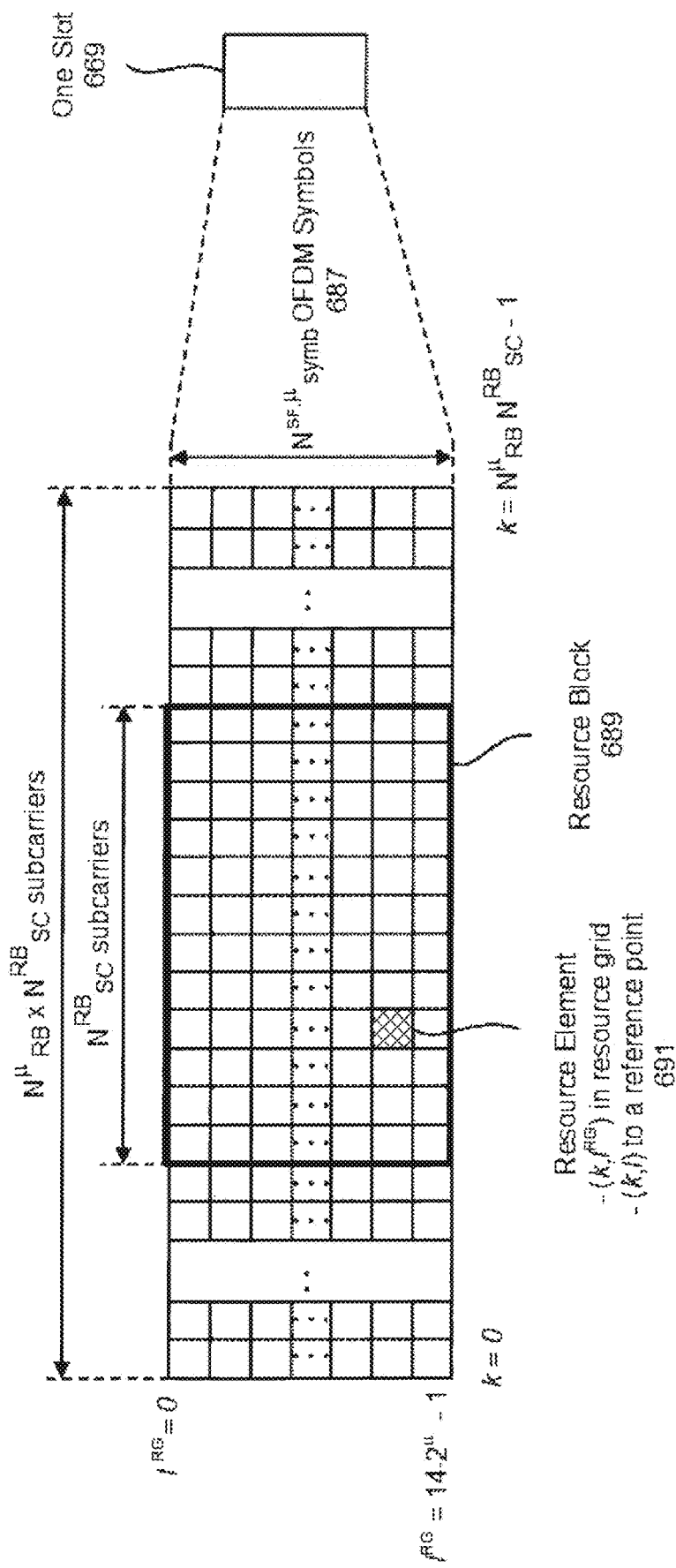
FIG. 6 is a diagram illustrating one example of a resource grid.

FIG. 6 is a diagram illustrating one example of a resource grid. The resource grid illustrated in FIG. 6 may be applicable for both downlink and uplink and may be utilized in some implementations of the systems and methods disclosed herein. More detail regarding the resource grid is given in connection with FIG. 1.

In FIG. 6, physical channels and physical signals may be transmitted/received using one or several slots 683. For a given numerology $\mu$, $N^{\mu}_{RB}$ is bandwidth configuration of a bandwidth part (BWP) in the serving cell, expressed in multiples of $N^{RB}_{sc}$, where $N^{RB}_{sc}$ is a resource block 689 size in the frequency domain expressed as a number of subcarriers, and $N^{SF,\mu}_{symb}$ is the number of Orthogonal Frequency Division Multiplexing (OFDM) symbols 687 in a subframe 669. In other words, For each numerology $\mu$ and for each of downlink and uplink, a resource grid of $N^{\mu}N^{RB}_{sc}$ subcarriers and $N^{SF,\mu}_{symb}$ OFDM symbols may be defined. There may be one resource grid per antenna port p, per subcarrier spacing configuration (SCS, also referred to as numerology) $\mu$, and per transmission direction (uplink or downlink). A resource block 689 may include a number of resource elements (RE) 691.

Multiple OFDM numerologies (also referred to as just numerologies) are supported as given by Table 1. Each of the numerologies may be tied to its own subcarrier spacing $\Delta f$.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For subcarrier spacing configuration $\mu$, slots are numbered $n^{\mu}_s \in \{0, \ldots, N^{SF,\mu}_{slot}-1\}$ in increasing order within a subframe and $n^{\mu}_{s,f} \in \{0, \ldots, N^{frame,\mu}_{slot}-1\}$ in increasing order within a frame. There are $N^{slot,\mu}_{symb}$ consecutive OFDM symbols in a slot where $N^{slot,\mu}_{symb}$ depends on the subcarrier spacing used as given by Table 2 for normal cyclic prefix and Table 3 for extended cyclic prefix. The number of consecutive OFDM symbols per subframe is $N^{SF,\mu}_{symb}=N^{slot,\mu}_{symb} \cdot N^{SF,\mu}_{slot}$. The start of slot $h^{\mu}_s$ in a subframe is aligned in time with the start of OFDM symbol $n^{\mu}_s N^{slot,\mu}_{symb}$ in the same subframe. Not all UEs may be capable of simultaneous transmission and reception, implying that not all OFDM symbols in a downlink slot or an uplink slot may be used.

TABLE 2

| $\mu$ | $N^{slot,\mu}_{symb}$ | $N^{frame,\mu}_{slot}$ | $N^{SF,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N^{slot,\mu}_{symb}$ | $N^{frame,\mu}_{slot}$ | $N^{SF,\mu}_{slot}$ |
|---|---|---|---|
| 2 | 12 | 40 | 4 |

For an initial BWP, $N^{\mu}_{RB}$ may be broadcast as a part of system information (e.g. Master Information Block (MIB), System Information Block Type 1 (SIB1)). For an SCell (including a Licensed-Assisted Access (LAA) SCell), $N^{\mu}_{RB}$ is configured by a RRC message dedicated to a UE 102. For PDSCH mapping, the available RE 691 may be the RE 691 whose index l fulfils $l \geq l_{data,start}$ and/or $l_{data,end} \geq l$ in a subframe.

The OFDM access scheme with cyclic prefix (CP) may be employed, which may be also referred to as CP-OFDM. In the downlink, PDCCH, EPDCCH (Enhanced Physical Downlink Control Channel), PDSCH and the like may be transmitted. A radio frame may include a set of slots 683 (e.g., 10 slots for $\mu$=1). The RB is a unit for assigning downlink radio resources, defined by a predetermined bandwidth (RB bandwidth) and one slot.

A resource block is defined as $N^{RB}_{sc}=12$ consecutive subcarriers in the frequency domain and one slot (which consists of 14 symbols for normal CP and 12 symbols for extended CP) in the time domain.

Carrier resource blocks are numbered from 0 to $N^{\mu}_{RB}-1$ in the frequency domain for subcarrier spacing configuration $\mu$. The relation between the carrier resource block number $n_{CRB}$ in the frequency domain and resource elements (k,l) is given by $n_{CRB}=\text{floor}(k/N^{RB}_{sc})$ where k is defined relative to the resource grid. Physical resource blocks are defined within a carrier bandwidth part (BWP) and numbered from 0 to $N^{size}_{BWP,i}-1$ where i is the number of the carrier bandwidth part. The relation between physical and absolute resource blocks in carrier bandwidth part i is given by $n_{CRB}=n_{PRB}+N^{start}_{BWP,i}-1$, where $N^{start}_{BWP,i}$ is the carrier resource block where carrier bandwidth part starts. Virtual resource blocks are defined within a carrier bandwidth part and numbered from 0 to $N^{size}_{BWP,i}-1$ where i is the number of the carrier bandwidth part.

A carrier bandwidth part is a contiguous set of physical resource blocks, selected from a contiguous subset of the carrier resource blocks for a given numerology $\mu$ on a given carrier. The number of resource blocks $N^{size}_{BWP,i}$ in a carrier BWP may fulfil $N^{min,\mu}_{RB,x} \leq N^{size}_{BWP,i} \leq N^{max,\mu}_{RB,x}$. A UE can be configured with up to four carrier bandwidth parts in the downlink with a single downlink carrier bandwidth part being active at a given time. The UE is not expected to receive PDSCH or PDCCH outside an active bandwidth part. A UE can be configured with up to four carrier bandwidth parts in the uplink with a single uplink carrier bandwidth part being active at a given time. The UE shall not transmit PUSCH or PUCCH outside an active bandwidth part.

The RB may include twelve sub-carriers in frequency domain and one or more OFDM symbols in time domain. A region defined by one sub-carrier in frequency domain and one OFDM symbol in time domain is referred to as a resource element (RE) and is uniquely identified by the index pair $(k,l^{RG})$ in the resource grid, where $k=0, \ldots, N^{\mu}_{RB}N^{RB}_{sc}-1$ and $l^{RG}=0, \ldots, N^{SF,\mu}_{symb}-1$ are indices in the frequency and time domains, respectively. Moreover, RE is uniquely identified by the index pair (k,l) based on a certain reference point, where l are indices in the time domain. The reference point can be based on the resource grid, i.e. component carrier (CC) basis. Alternatively the reference point can be based on a certain band width part in the component carrier. While subframes in one CC are discussed herein, subframes are defined for each CC and subframes are substantially in synchronization with each other among CCs.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, Physical Random Access Channel (PRACH) and the like may be transmitted.

For each numerology and carrier, a resource grid of $N^{max,\mu}_{RB,x}N^{RB}_{sc}$ subcarriers and $N^{SF,\mu}_{symb}$ OFDM symbols is defined, where $N^{max,\mu}_{RB,x}$ is given by Table 4 and x is DL or UL for downlink and uplink, respectively. There is one resource grid per antenna port p, per subcarrier spacing configuration μ, and per transmission direction (downlink or uplink).

TABLE 4

| μ | $N^{min,\mu}_{RB,DL}$ | $N^{max,\mu}_{RB,DL}$ | $N^{min,\mu}_{RB,DL}$ | $N^{max,\mu}_{RB,DL}$ |
|---|---|---|---|---|
| 0 | 20 | 275 | 24 | 275 |
| 1 | 20 | 275 | 24 | 275 |
| 2 | 20 | 275 | 24 | 275 |
| 3 | 20 | 275 | 24 | 275 |
| 4 | 20 | 138 | 24 | 138 |

A UE 102 may be instructed to receive or transmit using a subset of the resource grid only. The set of resource blocks a UE is referred to as a carrier bandwidth part and may be configured to receive or transmit upon are numbered from 0 to $N^{\mu}_{RB}-1$ in the frequency domain. The UE may be configured with one or more carrier bandwidth parts, each of which may have the same or different numerology.

Transmissions in multiple cells can be aggregated where up to fifteen secondary cells can be used in addition to the primary cell. A UE 102 configured for operation in bandwidth parts (BWPs) of a serving cell, is configured by higher layers for the serving cell a set of at most four bandwidth parts (BWPs) for receptions by the UE (DL BWP set) in a DL bandwidth by parameter DL-BWP-index and a set of at most four BWPs for transmissions by the UE 102 (UL BWP set) in an UL bandwidth by parameter UL-BWP-index for the serving cell. For unpaired spectrum operation, a DL BWP from the set of configured DL BWPs is linked to an UL BWP from the set of configured UL BWPs, where the DL BWP and the UL BWP have a same index in the respective sets. For unpaired spectrum operation, a UE 102 can expect that the center frequency for a DL BWP is same as the center frequency for a UL BWP.

The Physical Downlink Control Channel (PDCCH) can be used to schedule DL transmissions on PDSCH and UL transmissions on PUSCH, where the Downlink Control Information (DCI) on PDCCH includes: Downlink assignments containing at least modulation and coding format, resource allocation, and HARQ information related to DL-SCH; and Uplink scheduling grants containing at least modulation and coding format, resource allocation, and HARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; and Initiating a random access procedure.

In the random access procedure, the UE 102 may transmit a PRACH with a random-access preamble in a PRACH occasion selected from PRACH occasions which corresponds to the index of the detected SS/PBCH block candidate. The gNB 160 may receive the PRACH in the selected PRACH occasion. The message 2 is a procedure in which the UE 102 attempts to detect a DCI format 1_0 with CRC (Cyclic Redundancy Check) scrambled by an RA-RNTI (Random Access-Radio Network Temporary Identifier). The UE 102 may attempt to detect the DCI format 1_0 in a search-space-set. The message 3 is a procedure for transmitting a PUSCH scheduled by a random-access response (RAR) grant included in the DCI format 1_0 detected in the message 2 procedure. The random-access response grant is indicated by the MAC CE included in the PDSCH scheduled by the DCI format 1_0. The PUSCH scheduled based on the random-access response grant is either a message 3 PUSCH or a PUSCH. The message 3 PUSCH contains a contention resolution identifier MAC CE. The contention resolution ID MAC CE includes a contention resolution ID. Retransmission of the message 3 PUSCH is scheduled by DCI format 0_0 with CRC scrambled by a TC-RNTI (Temporary Cell-Radio Network Temporary Identifier). The message 4 is a procedure that attempts to detect a DCI format 1_0 with CRC scrambled by either a C-RNTI (Cell-Radio Network Temporary Identifier) or a TC-RNTI. The UE 102 may receive a PDSCH scheduled based on the DCI format 1_0. The PDSCH may include a collision resolution ID.

One or more sets of PRB(s) may be configured for DL control channel monitoring. In other words, a control resource set is, in the frequency domain, a set of PRBs within which the UE 102 attempts to blindly decode downlink control information (i.e., monitor downlink control information (DCI)), where the PRBs may or may not be frequency contiguous, a UE 102 may have one or more control resource sets, and one DCI message may be located within one control resource set. In the frequency-domain, a PRB is the resource unit size (which may or may not include DMRS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Namely, a UE 102 may have to monitor a set of PDCCH candidates in one or more control resource sets on one or more activated serving cells or bandwidth parts (BWPs) according to corresponding search spaces where monitoring implies decoding each PDCCH candidate according to the monitored DCI formats. Here, the PDCCH candidates may be candidates for which the PDCCH may possibly be assigned and/or transmitted. A PDCCH candidate is composed of one or more control channel elements (CCEs). The term "monitor" means that the UE 102 attempts to decode each PDCCH in the set of PDCCH candidates in accordance with all the DCI formats to be monitored.

The set of PDCCH candidates that the UE 102 monitors may be also referred to as a search space or a search space set. That is, the search space (or search space set) is a set of resource that may possibly be used for PDCCH transmission.

Furthermore, a common search space (CSS) and a user-equipment search space (USS) are set (or defined, configured). For example, the CSS may be used for transmission of PDCCH with DCI format(s) to a plurality of the UEs 102. That is, the CSS may be defined by a resource common to a plurality of the UEs 102. For example, the CSS is composed of CCEs having numbers that are predetermined between the gNB 160 and the UE 102. For example, the CSS is composed of CCEs having indices 0 to 15.

Here, the CSS may be used for transmission of PDCCH with DCI format(s) to a specific UE 102. That is, the gNB 160 may transmit, in the CSS, DCI format(s) intended for a plurality of the UEs 102 and/or DCI format(s) intended for a specific UE 102. There may be one or more types of CSS. For example, Type 0 PDCCH CSS may be defined for a DCI format scrambled by a System Information-Radio Network Temporary Identifier (SI-RNTI) on a primary cell (PCell). Type 1 PDCCH CSS may be defined for a DCI format scrambled by a Random Access- (RA-)RNTI. Additionally and/or alternatively, Type 1 PDCCH CSS may be used for a DCI format scrambled by a Temporary Cell- (TC-)RNTI or Cell- (C-)RNTI. Type 2 PDCCH CSS may be defined for a DCI format scrambled by a Paging- (P-)RNTI. Type 3 PDCCH CSS may be defined for a DCI format scrambled by an Interference- (INT-)RNTI, where if a UE 102 is configured by higher layers to decode a DCI format with CRC scrambled by the INT-RNTI and if the UE 102 detects the DCI format with CRC scrambled by the INT-RNTI, the UE 102 may assume that no transmission to the UE 102 is present in OFDM symbols and resource blocks indicated by the DCI format. Additionally and/or alternatively, Type 3 PDCCH CSS may be used for a DCI format scrambled by the other RNTI (e.g., Transmit Power Control- (TPC-)RNTI, Pre-emption Indication- (PI-)RNTI, Slot Format Indicator- (SFI-)RNTI, Semi persistent scheduling- (SPS-)RNTI, Grant free-(GF-)RNTI, Configured Scheduling- (CS-)RNTI, URLLC- (U-)RNTI), MCS- RNTI), Autonomous Uplink- (AUL-) RNTI, Downlink Feedback Information- (DFI-) RNTI.

A UE 102 may be indicated by System Information Block Type0 (SIB0), which is also referred to as MIB, a control resource set for Type0-PDCCH common search space and a subcarrier spacing and a CP length for PDCCH reception. The Type0-PDCCH common search space is defined by the CCE aggregation levels and the number of candidates per CCE aggregation level. The UE may assume that the DMRS antenna port associated with PDCCH reception in the Type0-PDCCH common search space and the DMRS antenna port associated with Physical Broadcast channel (PBCH) reception are quasi-collocated with respect to delay spread, Doppler spread, Doppler shift, average delay, and spatial Rx parameters. PBCH carries Master Information Block (MIB) which contains most important pieces of system information. A PDCCH with a certain DCI format in Type0-PDCCH common search space schedules a reception of a PDSCH with SIB Type 1 (SIB1) or with other SI messages. A UE may be indicated by SIB1 control resource set(s) for Type1-PDCCH common search space. A subcarrier spacing and a CP length for PDCCH reception with Type1-PDCCH common search space are same as for PDCCH reception with Type0-PDCCH common search space. The UE may assume that the DMRS antenna port associated with PDCCH reception in the Type1-PDCCH common search space and the DMRS antenna port associated with PBCH reception are quasi-collocated with respect to delay spread, Doppler spread, Doppler shift, average delay, and spatial Rx parameters. A monitoring periodicity of paging occasions for PDCCH in Type2-PDCCH common search space may be configured to the UE by higher layer parameter. A UE may be configured by higher layer signaling whether and/or which serving cell(s) to monitor Type3-PDCCH common search space.

The USS may be used for transmission of PDCCH with DCI format(s) to a specific UE 102. That is, the USS is defined by a resource dedicated to a certain UE 102. That is, the USS may be defined independently for each UE 102. For example, the USS may be composed of CCEs having numbers that are determined based on a RNTI assigned by the gNB 160, a slot number in a radio frame, an aggregation level, or the like.

Here, the RNTI(s) may include C-RNTI (Cell-RNTI), Temporary C-RNTI. Also, the USS (the position(s) of the USS) may be configured by the gNB 160. For example, the gNB 160 may configure the USS by using the RRC message. That is, the base station may transmit, in the USS, DCI format(s) intended for a specific UE 102.

Here, the RNTI assigned to the UE 102 may be used for transmission of DCI (transmission of PDCCH). Specifically, CRC (Cyclic Redundancy Check) parity bits (also referred to simply as CRC), which are generated based on DCI (or DCI format), are attached to DCI, and, after attachment, the CRC parity bits are scrambled by the RNTI. The UE 102 may attempt to decode DCI to which the CRC parity bits scrambled by the RNTI are attached, and detects PDCCH (i.e., DCI, DCI format). That is, the UE 102 may decode PDCCH with the CRC scrambled by the RNTI.

When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

DCI formats may be classified into at least 4 types, DL regular (also referred to as DCI format 1_1), UL regular (also referred to as DCI format 0_1), DL fallback (also referred to as DCI format 1_0) and UL fallback (also referred to as DCI format 0_0) for PDSCH and PUSCH scheduling. In addition, there may be some other types for control signaling. Furthermore, some more types (e.g. DCI format 0_2, 0_3, 1_2 and 1_3) may be defined for scheduling of one or more PUSCH(s) and one or more PDSCH(s), which may be applicable to an NR-based unlicensed access (NR-U) cell. Table 5 shows an example of a set of the DCI format types.

TABLE 5

| DCI format | Usage | RNTI |
|---|---|---|
| 0_0 | Scheduling of PUSCH containing up to one TB in one cell | C-RNTI, CS-RNTI, MCS-RNTI, TC-RNTI |
| 0_1 | Scheduling of PUSCH containing up to two TBs in one cell | C-RNTI, CS-RNTI, SP-CSI-RNTI, MCS-RNTI |
| 0_2 | Scheduling of one or more PUSCH(s) each containing up to one TB in one cell | C-RNTI, CS-RNTI, MCS-RNTI, AUL-RNTI, DFI-RNTI |
| 0_3 | Scheduling of one or more PUSCH(s) each containing up to two TBs in one cell | C-RNTI, CS-RNTI, MCS-RNTI, AUL-RNTI, DFI-RNTI |
| 1_0 | Scheduling of PDSCH containing up to one TB in one cell | C-RNTI, CS-RNTI, MCS-RNTI, P-RNTI, SI-RNTI, RA-RNTI, TC-RNTI |
| 1_1 | Scheduling of PDSCH containing up to two TBs in one cell | C-RNTI, CS-RNTI, MCS-RNTI |
| 1_2 | Scheduling of one or more PDSCH(s) each containing up to one TB in one cell | C-RNTI, CS-RNTI, MCS-RNTI |
| 1_3 | Scheduling of one or more PDSCH(s) each containing up to two TBs in one cell | C-RNTI, CS-RNTI, MCS-RNTI |
| 2_0 | Notifying a group of UEs of the slot format Notifying a group of UEs of the channel occupancy time information related to the NR-U cell | SFI-RNTI |
| 2_1 | Notifying a group of UEs of the PRB(s) and OFDM symbol(s) where UE may assume no transmission is intended for the UE | INT-RNTI |
| 2_2 | Transmission of TPC commands for PUCCH and PUSCH | TPC-PUSCH-RNTI, TPC-PUCCH-RNTI |
| 2_3 | Transmission of a group of TPC commands for SRS transmissions by one or more UEs | TPC-SRS-RNTI |
| 2_4 | Notifying a group of UEs of common control information related to the NR-U cell | CC-RNT1 |

The DL regular DCI format and the UL regular DCI format may have a same DCI payload size. The DL fallback DCI format and the UL fallback DCI format may have a same DCI payload size. Table 6, 7, 8, and 9 show examples of DCI formats 0_0, 0_1, 1_0 and 1_1, respectively. "Mandatory" may mean the information field is always present irrespective of RRC (re)configuration. "Optional" may mean the information field may or may not be present depending on RRC (re)configuration. In the DL fallback DCI format and the UL fallback DCI format, all information fields are mandatory so that their DCI payload sizes are fixed irrespective of RRC (re)configuration.

TABLE 6

| Information field | The number of bits | Mandatory/Optional | Remarks |
|---|---|---|---|
| Identifier for DCI formats | 1 | Mandatory | The value of this bit field may be always set to 0, indicating an UL DCI format |
| Frequency domain resource assignment | 15 | Mandatory | Virtual Resource Blocks (VRBs) indicated using type 1 resource allocation |
| Time domain resource assignment | 2 | Mandatory | Index of an entry of a table providing sets of OFDM symbols and a slot used for PUSCH transmission |
| Frequency hopping flag | 1 | Mandatory | Flag to control whether to use frequency hopping |
| Modulation and coding scheme | 5 | Mandatory | Modulation and coding scheme (MCS) for a single TB which is contained in the PUSCH |
| New data indicator | 1 | Mandatory | Indicating whether the TB transmission is an initial transmission (in which case the NDI value is toggled) or re-transmission (in which case the NDI value is nottoggled). |
| Redundancy version | 2 | Mandatory | Indicating rate-matching pattern |
| HARQ process number | 4 | Mandatory | |
| TPC command for scheduled PUSCH | 2 | Mandatory | |
| Padding bits, if required | | | |

TABLE 6-continued

| Information field | The number of bits | Mandatory/ Optional | Remarks |
|---|---|---|---|
| UL/SUL indicator | 0 or 1 | Optional | 1 bit for UEs configured with SUL in the cell as defined in Table 7.3.1.1.1-1 and the number of bits for DCI format 1_0 before padding is larger than the number of bits for DCI format 0_0 before padding; 0 bit otherwise. |

TABLE 7

| Information field | The number of bits | Mandatory/ Optional | Remarks |
|---|---|---|---|
| Identifier for DCI formats | 1 | Mandatory | The value of this bit field may be always set to 0, indicating an UL DCI format |
| Carrier indicator | 0 or 3 | Optional | Indicating SCellIndex of the serving cell in which the scheduled PUSCH is to be transmitted |
| UL/SUL indicator | 0 or 1 | Optional | 0 bit for UEs not configured with SUL in the cell or UEs configured with SUL in the cell but only PUCCH carrier in the cell is configured for PUSCH transmission; 1 bit for UEs configured with SUL in the cell |
| Bandwidth part indicator | 0, 1 or 2 | Optional | Indicating BWP ID of the BWP which contains scheduled PUSCH. If a UE does not support active BWP change via DCI, the UE may ignore this bit field |
| Frequency domain resource assignment | 25 | Mandatory | Virtual Resource Blocks (VRBs) indicated using type 0 or type 1 resource allocation |
| Time domain resource assignment | 0, 1, 2, 3 or 4 | Mandatory | Index of an entry of an RRC-configured table providing the set of OFDM symbols used for PUSCH transmission |
| Frequency hopping flag | 0 or 1 | Optional | 0 bit if only resource allocation type 0 is configured or if the higher layer parameter frequencyHopping is not configured, 1 bit otherwise |
| Modulation and coding scheme | 5 | Mandatory | MCS for TB(s) which are contained in the PUSCH |
| New data indicator | 1 | Mandatory | |
| Redundancy version | 2 | Mandatory | |
| HARQ process number | 4 | Mandatory | |
| 1st downlink assignment index | 1 or 2 | Mandatory | 1 bit for semi-static HARQ-ACK codebook, 2 bits for dynamic HARQ-ACK codebook. |
| 2nd downlink assignment index | 0 or 2 | Optional | 2 bits for dynamic HARQ-ACK codebook with two HARQ-ACK sub-codebooks, 0 bit otherwise |
| TPC command for scheduled PUSCH | 2 | Mandatory | |
| SRS resource indicator | 0, 1 or 2 | Optional | |
| Precoding information and number of layers | 0, 1, 2, 3, 4, 5 or 6 | Optional | 0 bit if the higher layer parameter txConfig = nonCodeBook or for 1 antenna port |
| Antenna ports | 2, 3, 4 or 5 | Mandatory | |
| SRS request | 2 or 3 | Mandatory | This bit field may also indicate the associated CSI RS. |
| CSI request | 0, 1, 2, 3, 4, 5 or 6 | Optional | The bit size may be determined by higher layer parameter reportTriggerSize |
| PTRS-DMRS association | 0 or 2 | Optional | 0 bit if PTRS-UplinkConfig is not configured and transformPrecoder = disabled, or if transformPrecoder = enabled, or if maxRank = 1, 2 bits otherwise. |

TABLE 7-continued

| Information field | The number of bits | Mandatory/ Optional | Remarks |
|---|---|---|---|
| beta_offset indicator | 0 or 2 | Optional | 0 bit if the higher layer parameter betaOffsets = semiStatic; otherwise 2 bits |
| DMRS sequence initialization | 0 or 1 | Optional | |
| UL-SCH indicator | 1 | Mandatory | A value of "1" may indicate UL-SCH shall be transmitted on the PUSCH and a value of "0" may indicate UL-SCH shall not be transmitted on the PUSCH. |

TABLE 8

| Information field | The number of bits | Mandatory/ Optional | Remarks |
|---|---|---|---|
| Identifier for DCI formats | 1 | Mandatory | The value of this bit field is always set to 1, indicating a DL DCI format |
| Frequency domain resource assignment | 15 | Mandatory | VRBs indicated using type 1 RA. |
| Time domain resource assignment | 4 | Mandatory | Index of an entry of a table providing sets of OFDM symbols and a slot used for PDSCH transmission |
| VRB-to-PRB mapping | 1 | Mandatory | Flag to control VRB-to-PRB mapping |
| Modulation and coding scheme | 5 | Mandatory | MCS for a single TB which is contained in the PDSCH |
| New data indicator | 1 | Mandatory | Indicating whether the TB transmission is an initial transmission (in which case the NDI value is toggled) or re-transmission (in which case the NDI value is not toggled). |
| Redundancy version | 2 | Mandatory | Indicating rate-matching pattern |
| HARQ process number | 3 | Mandatory | |
| Downlink assignment index | 2 | Mandatory | as counter DAI |
| TPC command for scheduled PUCCH | 2 | Mandatory | TPC command for the PUCCH on which HARQ-ACK feedback for the scheduled PDSCH is to be transmitted. |
| PUCCH resource indicator | 3 | Mandatory | Indicating a PUCCH resource index. |
| PDSCH-to-HARQ_feedback timing indicator | 3 | Mandatory | Indicating a timing offset between the slot where the scheduled PDSCH is transmitted and the slot where the corresponding PUCCH is to be transmitted. |

TABLE 9

| Information field | The number of bits | Mandatory/ Optional | Remarks |
|---|---|---|---|
| Identifier for DCI formats | 1 | Mandatory | The value of this bit field is always set to 1, indicating a DL DCI format |
| Carrier indicator | 0 or 3 | Optional | Indicating SCellIndex of the serving cell in which the scheduled PDSCH is transmitted |
| Bandwidth part indicator | 0, 1 or 2 | Optional | Indicating BWP ID of the BWP which contains scheduled PDSCH. If a UE does not support active BWP change via DCI, the UE may ignore this bit field |

TABLE 9-continued

| Information field | The number of bits | Mandatory/ Optional | Remarks |
|---|---|---|---|
| Frequency domain resource assignment | 25 | Mandatory | VRBs, indicated using type 0 or type 1 resource allocation |
| Time domain resource assignment | 0, 1, 2, 3 or 4 | Optional | Index of an entry of an RRC-configured table providing the set of OFDM symbols used for PUSCH transmission |
| VRB-to-PRB mapping | 0 or 1 | Mandatory | Flag to control VRB-to-PRB mapping 0 bit if only resource allocation type 0 is configured; 1 bit otherwise |
| PRB bundling size indicator | 0 or 1 | Optional | 1 bit if the higher layer parameter prb-BundlingType is set to 'dynamic', 0 bit otherwise |
| Rate matching indicator | 0, 1 or 2 | Optional | RB-level and/or RE-level indication of REs which are not available for the scheduled PDSCH transmission. Each bit corresponds to respective higher layer parameter rateMatchPattern. |
| ZP CSI-RS trigger | 0, 1 or 2 | Optional | Indicating CSI-RS REs which are not available for the scheduled PDSCH transmission. |
| UCI on PUSCH information | 2 | Optional | Indication of beta value for UCI on PUSCH, possibly also other UCI-on-PUSCH-related information |
| Modulation and coding scheme for TB1 | 5 | Mandatory | MCS for TB1 which is contained by the scheduled PDSCH. |
| New data indicator for TB1 | 1 | Mandatory | NDI for TB1 which is contained by the scheduled PDSCH. |
| Redundancy version for TB1 | 2 | Mandatory | RV for TB1 which is contained by the scheduled PDSCH. |
| Modulation and coding scheme for TB2 | 5 | Optional | MCS for TB2 which is contained by the scheduled PDSCH. Only present if maxNrofCodeWordsScheduledByDCI equals 2 |
| New data indicator for TB2 | 1 | Optional | NDI for TB2 which is contained by the scheduled PDSCH. Only present if maxNrofCodeWordsScheduledByDCI equals 2 |
| Redundancy version for TB2 | 2 | Optional | RV for TB2 which is contained by the scheduled PDSCH. Only present if maxNrofCodeWordsScheduledByDCI equals 2 |
| HARQ process number | 4 | Mandatory | |
| Downlink assignment index | 0, 2 or 4 | Optional | 4 bits if more than one serving cell are configured in the DL and the higher layer parameter pdsch-HARQ-ACK-Codebook = dynamic, where the 2 MSB (most significant bit) bits are the counter DAI and the 2 LSB (least significant bit) bits are the total DAI, 2 bits if only one serving cell is configured in the DL and the higher layer parameter pdsch-HARQ-ACK-Codebook = dynamic, where the 2 bits are the counter DAI, 0 bit otherwise |
| TPC command for scheduled PUCCH | 2 | Mandatory | TPC command for the PUCCH on which HARQ-ACK feedback for the scheduled PDSCH is to be transmitted. |
| PUCCH resource indicator | 3 | Mandatory | Indicating a PUCCH resource index. |
| PDSCH-to-HARQ_feedback timing indicator | 0, 1, 2 or 3 | Optional | Indicating a timing offset between the slot where the scheduled PDSCH is transmitted and the slot where the corresponding PUCCH is to be transmitted. |
| Antenna port(s) | 4, 5 or 6 | Mandatory | Indicating antenna ports used for the scheduled PDSCH transmission and/or the number of CDM groups without data (i.e. the number of |

TABLE 9-continued

| Information field | The number of bits | Mandatory/ Optional | Remarks |
|---|---|---|---|
| | | | CDM groups whose REs are not available for the PDSCH transmissions) |
| Transmission configuration indication | 0 or 3 | Optional | 0 bit if higher layer parameter tci-PresentInDCI is not enabled, 3 bits otherwise |
| SRS request | 2 or 3 | Mandatory | This bit field may also indicate the associated CSI-RS. |
| CBG transmission information (CBGTI) | 0, 2, 4, 6 or 8 | Optional | The bit size may be determined by the higher layer parameters maxCodeBlockGroupsPerTransport Block and Number-MCS-HARQ-DL-DCI for the PDSCH. |
| CBG flushing out information (CBGFI) | 0 or 1 | Optional | The bit size may be determined by higher layer parameter codeBlockGroupFlushIndicator. |
| DMRS sequence initialization | 0 or 1 | Optional | |

Figure 7:
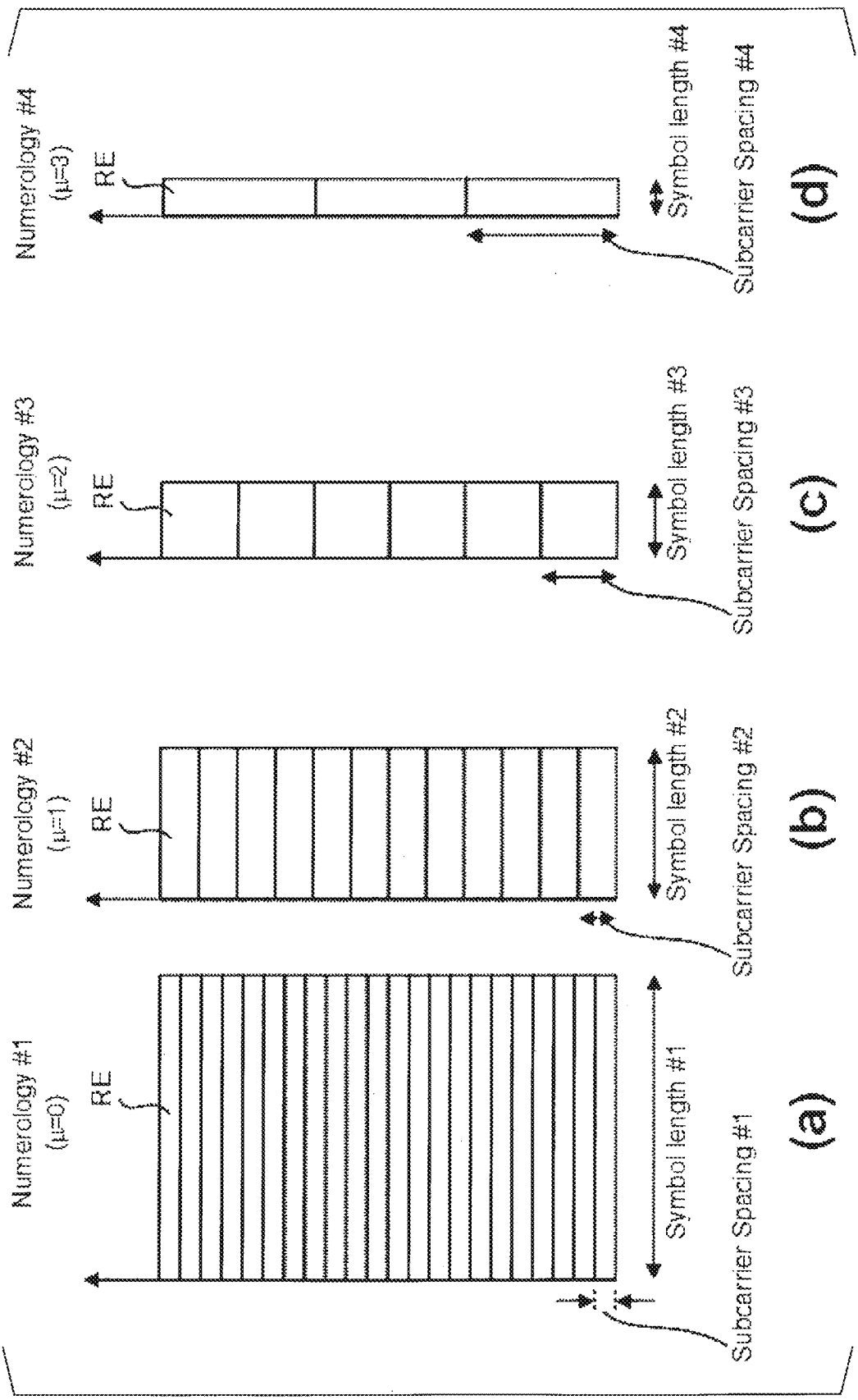
FIG. 7 shows examples of several numerologies.

FIG. 7 shows examples of several numerologies. The numerology #1 ($\mu=0$) may be a basic numerology. For example, a RE of the basic numerology is defined with subcarrier spacing of 15 kHz in frequency domain and 2048κTs+CP length (e.g., 512κTs, 160κTs or 144κTs) in time domain, where Ts denotes a baseband sampling time unit defined as 1/(15000*2048) seconds. For the μ-th numerology, the subcarrier spacing may be equal to $15*2^\mu$ and the effective OFDM symbol length NuTs=$2048*2^{-\mu}$κTs. It may cause the symbol length is $2048*2^{-\mu}$κTs+CP length (e.g., $512*2^{-\mu}$κTs, $160*2^{-\mu}$κTs or $144*2^{-\mu}$κTs). Note that κ=64, Ts=$1/(\Delta f_{max} \cdot N_f)$, $\Delta f_{max}=480 \cdot 10^3$ Hz (i.e. $\Delta f$ for $\mu=5$), and $N_f=4096$. In other words, the subcarrier spacing of the μ+1-th numerology is a double of the one for the μ-th numerology, and the symbol length of the μ+1-th numerology is a half of the one for the μ-th numerology. FIG. 7 shows four numerologies, but the system may support another number of numerologies.

Figure 8:
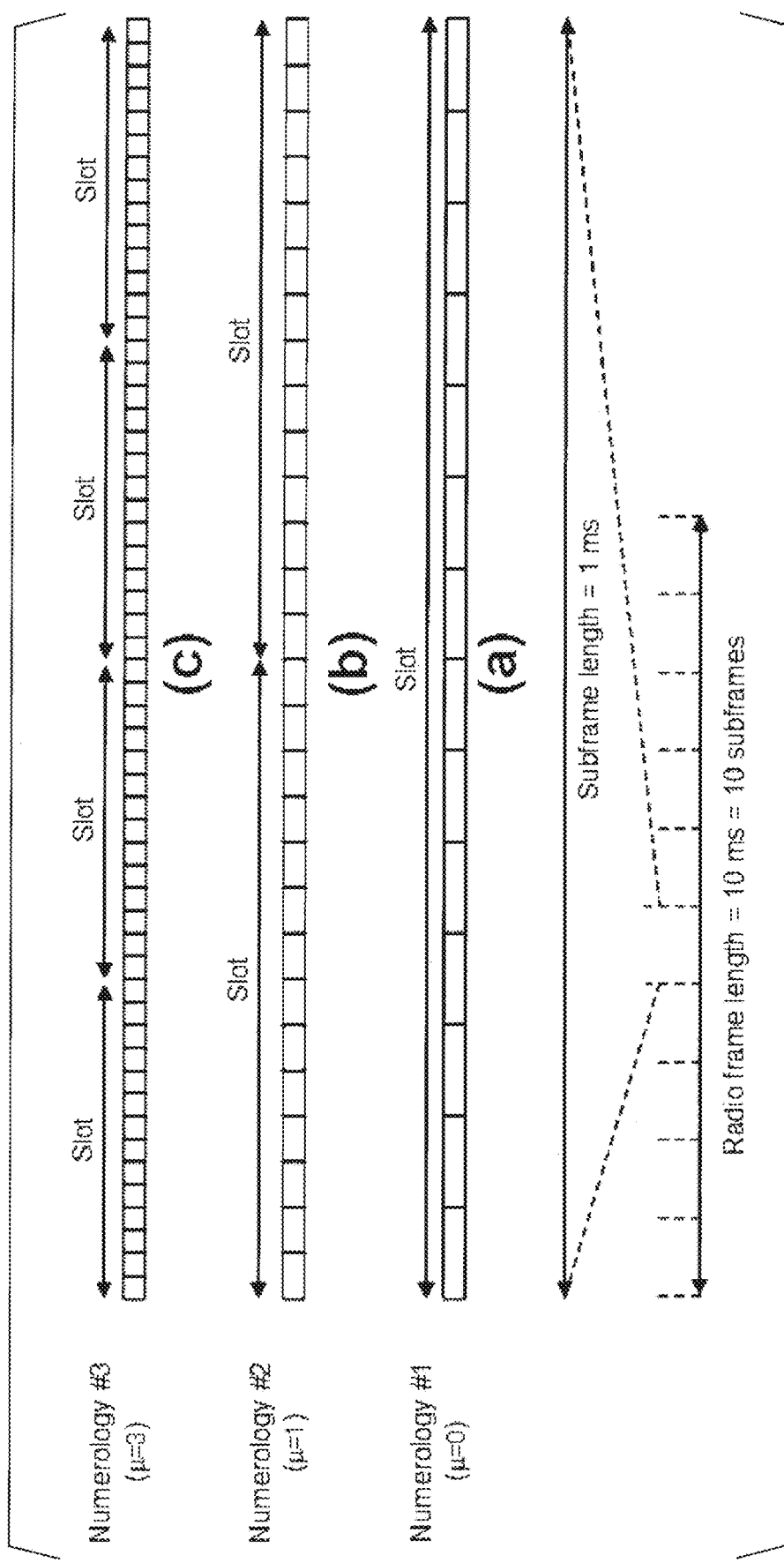
FIG. 8 shows examples of subframe structures for the numerologies that are shown in FIG. 7.

FIG. 8 shows a set of examples of subframe structures for the numerologies that are shown in FIG. 7. These examples are based on the slot configuration set to 0. A slot includes 14 symbols, the slot length of the μ+1-th numerology is a half of the one for the μ-th numerology, and eventually the number of slots in a subframe (i.e., 1 ms) becomes double. It may be noted that a radio frame may include 10 subframes, and the radio frame length may be equal to 10 ms.

Figure 9:
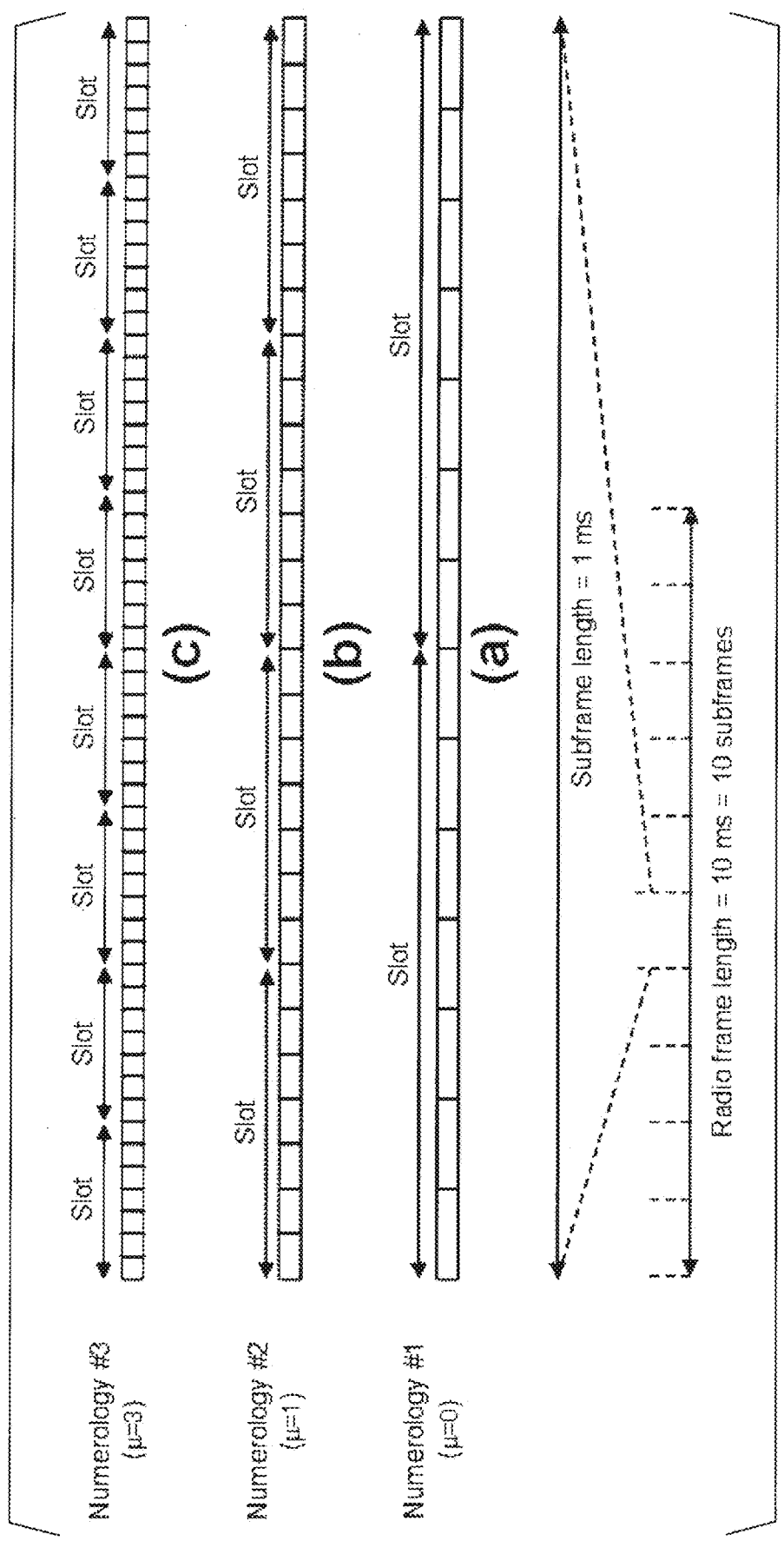
FIG. 9 shows examples of subframe structures for the numerologies that are shown in FIG. 7.

FIG. 9 shows another set of examples of subframe structures for the numerologies that are shown in FIG. 7. These examples are based on the slot configuration set to 1. A slot includes 7 symbols, the slot length of the μ+1-th numerology is a half of the one for the μ-th numerology, and eventually the number of slots in a subframe (i.e., 1 ms) becomes double.

A downlink physical channel may correspond to a set of resource elements carrying information originating from higher layers. The downlink physical channels may include Physical Downlink Shared Channel (PDSCH), Physical Broadcast Channel (PBCH), Physical Downlink Control Channel (PDCCH). A downlink physical signal corresponds to a set of resource elements used by the physical layer but might not carry information originating from higher layers. The downlink physical signals may include Demodulation reference signals (DM-RS), Phase-tracking reference signals (PT-RS), Channel-state information reference signal (CSI-RS) Primary synchronization signal (PSS), Secondary synchronization signal (SSS).

An uplink physical channel may correspond to a set of resource elements carrying information originating from higher layers. The uplink physical channels may include Physical Uplink Shared Channel (PUSCH), Physical Uplink Control Channel (PUCCH), Physical Random Access Channel (PRACH). An uplink physical signal is used by the physical layer but might not carry information originating from higher layers. The uplink physical signals may include Demodulation reference signals (DM-RS), Phase-tracking reference signals (PT-RS), Sounding reference signal (SRS).

The Synchronization Signal and PBCH block (SSB) may consist of primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. For a regular NR operation, PSS and SSS may be located in different OFDM symbols in between one OFDM symbol gap, with PSS first, then SSS. The periodicity of the SSB can be configured by the network and the time locations where SSB can be sent are determined by sub-carrier spacing. Within the frequency span of a carrier, multiple SSBs can be transmitted. The physical cell identities (PCIs) of those SSBs may not have to be unique, i.e. different SSBs can have different PCIs. However, when an SSB is associated with an SIB1 (also known as remaining minimum system information (RMSI)), the SSB may correspond to an individual cell, which has a unique NR Cell Global Identifier (NCGI). Such an SSB may be referred to as a Cell-Defining SSB (CD-SSB). A PCell may be always associated to a CD-SSB located on the synchronization raster.

Slot format indicator (SFI) may be defined to specify a format for one or more slot(s). With SFI, the UE 102 may be able to derive at least which symbols in a given slot that are 'DL', 'UL', and 'unknown', respectively. In addition, it may also indicate which symbols in a given slot that are 'reserved'. With SFI, the UE 102 may also be able to derive the number of slots for which the SFI indicates their formats. SFI may be configured by dedicated RRC configuration message. Alternatively and/or additionally, SFI may be signaled by a group-common PDCCH (e.g., PDCCH with SFI-RNTI). Yet alternatively and/or additionally, SFI may be broadcasted via master information block (MIB) or remaining minimum system information (RMSI).

For example, each SFI can express up to 8 combinations of 'DL', 'UL', 'Unknown' and 'reserved', each combination includes $N^{slot,\mu}_{symb}$ pieces of symbol types. More specifically, given that $N^{slot,\mu}_{symb}=14$, one combination may be 'Unknown' 'Unknown' 'Unknown' 'Unknown' 'Unknown' 'Unknown' 'Unknown' 'Unknown' 'Unknown' 'Unknown' 'Unknown' 'Unknown' 'Unknown' 'Unknown'. Another combination may be all 'DL, that is 'DL' 'DL' 'DL' 'DL' 'DL' 'DL' 'DL' 'DL' 'DL' 'DL' 'DL' 'DL' 'DL' 'DL'. Yet another combination may be all 'UL, that is 'UL' 'UL' 'UL' 'UL' 'UL' 'UL' 'UL' 'UL' 'UL' 'UL' 'UL' 'UL' 'UL' 'UL'. Yet another combination may be a combination of 'DL', 'UL' and 'Reserved' such as 'DL' DL' 'DL' 'DL' 'DL' 'DL' 'DL' 'DL' 'Reserved' 'Reserved' 'Reserved' 'Reserved' 'UL'.

'DL' symbols may be available for DL receptions and CSI/RRM measurements at the UE 102 side. 'UL' symbols may be available for UL transmissions at the UE 102 side. 'Unknown' resource may also be referred to as 'Flexible' and can be overridden by at least by DCI indication. 'Unknown' may be used to achieve the same as 'Reserved' if not overridden by DCI and/or SFI indication. On 'Unknown' symbols, UE 102 may be allowed to assume any DL and UL transmissions which are configured by higher-layer, unless overridden by DCI indicating the other direction, and any DL and UL transmissions indicated by DCI. For example, periodic CSI-RS, periodic CSI-IM, semi-persistently scheduled CSI-RS, periodic CSI reporting, semi-persistently scheduled CSI reporting, periodic SRS transmission, higher-layer configured Primary synchronization signal (PSS)/secondary SS (SSS)/PBCH can be assumed (i.e. for DL, assumed to be present and to be able to perform the reception, and for UL, assumed to be able to perform the transmission).

The overriding of 'Unknown' symbols by the DCI means that UE 102 may have to assume only DL and UL transmissions (PDSCH transmission, PUSCH transmission, aperiodic CSI-RS transmission, aperiodic CSI-IM resource, aperiodic SRS transmission) which are indicated by DCI indications. The overriding of 'Unknown' symbols by the SFI means that UE 102 may have to assume the symbols as either 'DL', 'UL', or 'Reserved' according to SFI indications. If the UE 102 assumes aperiodic CSI-RS transmission and/or aperiodic CSI-IM resource, the UE 102 may perform CSI and/or RRM measurement based on the aperiodic CSI-RS transmission and/or aperiodic CSI-IM resource. If the UE 102 does not assume aperiodic CSI-RS transmission and/or aperiodic CSI-IM resource, the UE 102 may not use the aperiodic CSI-RS transmission and/or aperiodic CSI-IM resource for CSI and/or RRM measurement.

The UE 102 may have to monitor PDCCH on some 'DL' or 'Unknown' symbols. There may be several options to monitor PDCCH. If all of the OFDM symbols which are assigned for a given control resource set (CORESET) are 'DL', the UE 102 may assume all of the OFDM symbols are valid for monitoring of a PDCCH associated with the given CORESET. In this case, the UE 102 may assume each PDCCH candidate in the CORESET is mapped to all of the OFDM symbols for time-first RE group (REG)-to-control channel element (CCE) mapping. If all of the OFDM symbols which are assigned for a given CORESET are 'Unknown', the UE 102 may assume all of the OFDM symbols are valid for monitoring of a PDCCH associated with the given CORESET. In this case, the UE 102 may assume each PDCCH candidate in the CORESET is mapped to all of the OFDM symbols for time-first REG-to-CCE mapping.

If every OFDM symbols which is assigned for a given combination of CORESET and search space set is either 'UL' or 'Reserved', the UE 102 may assume those OFDM symbols are not valid for monitoring of a PDCCH associated with the given combination of CORESET and search space set. If some of the OFDM symbols which are assigned for a given combination of CORESET and search space set are 'DL' and the others are 'UL' or 'Reserved' or if some of the OFDM symbols which are assigned for a given combination of CORESET and search space set are 'Unknown' and the others are 'UL' or 'Reserved', the UE 102 may not monitor PDCCH in the CORESET.

NR-U may not support RMSI and/or dedicated RRC configuration of slot format. In this case, all symbols are considered to be Flexible as default.

Figure 10:
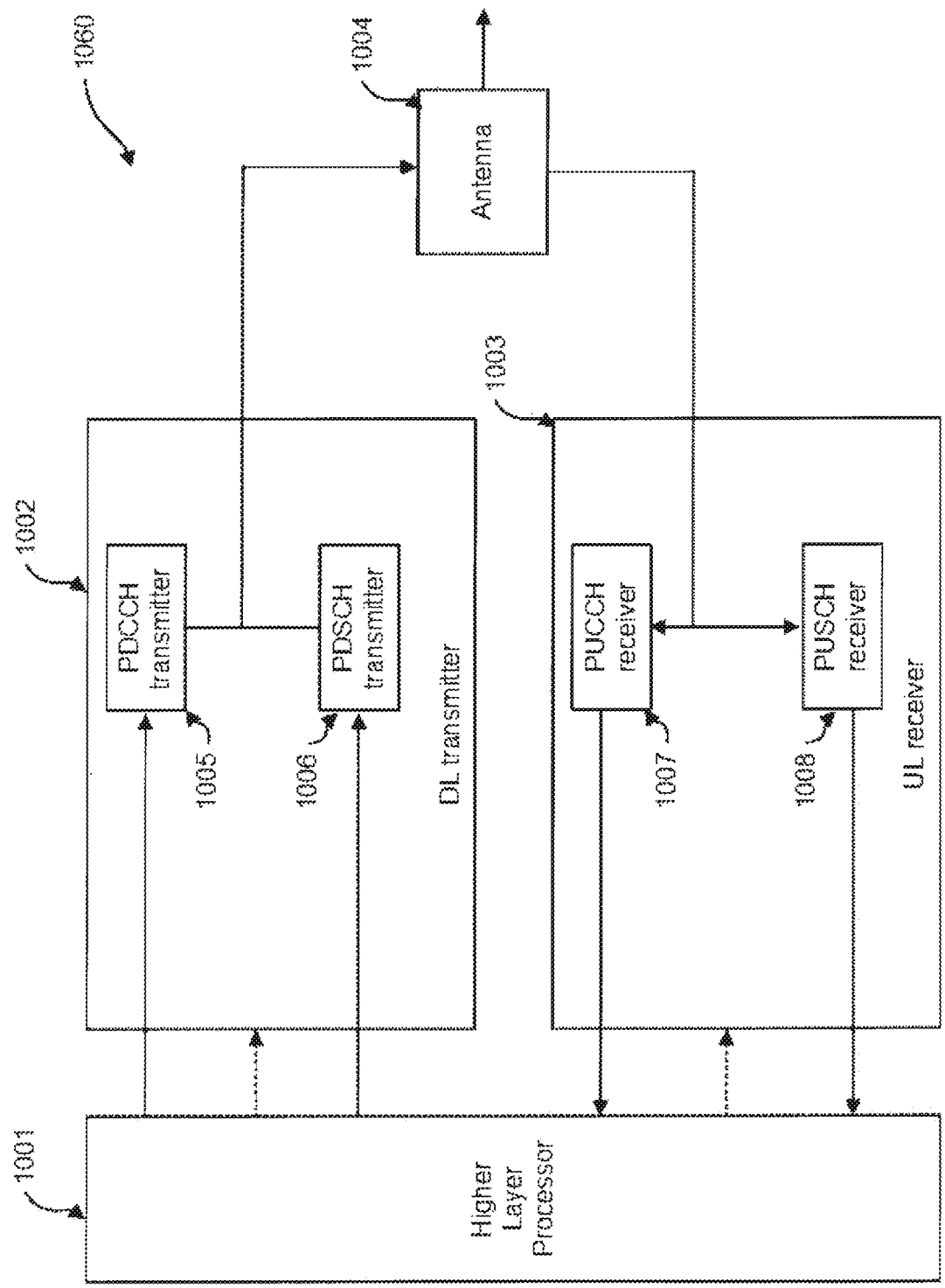
FIG. 10 is a block diagram illustrating one implementation of a gNB.

FIG. 10 is a block diagram illustrating one implementation of a gNB 1060 (an example of the gNB 160). The gNB 1060 may include a higher layer processor 1001 (also referred to as higher layer processing circuitry), a DL transmitter 1002, a UL receiver 1003, and antennas 1004. The DL transmitter 1002 may include a PDCCH transmitter 1005 and a PDSCH transmitter 1006. The UL receiver 1003 may include a PUCCH receiver 1007 and a PUSCH receiver 1008. The higher layer processor 1001 may manage physical layer's behaviors (the DL transmitter's and the UL receiver's behaviors, LBT, etc) and provide higher layer parameters to the physical layer. The higher layer processor 1001 may obtain transport blocks from the physical layer. The higher layer processor 1001 may send/acquire higher layer messages such as a common and dedicated RRC messages and/or MAC messages to/from a UE's higher layer. The higher layer processor 1001 may also set and/or store higher layer parameters carried by the higher layer messages. The higher layer processor 1001 may provide the PDSCH transmitter 1006 transport blocks and provide the PDCCH transmitter 1005 transmission parameters related to the transport blocks. The UL receiver 1003 may receive multiplexed uplink physical channels and uplink physical signals via receiving antennas and de-multiplex them. The PUCCH receiver 1007 may provide the higher layer processor UCI. The PUSCH receiver 1008 may provide the higher layer processor 1001 received transport blocks. The UL receiver 1003 may also sense a downlink channel where the DL transmitter 1002 would perform downlink transmissions.

Figure 11:
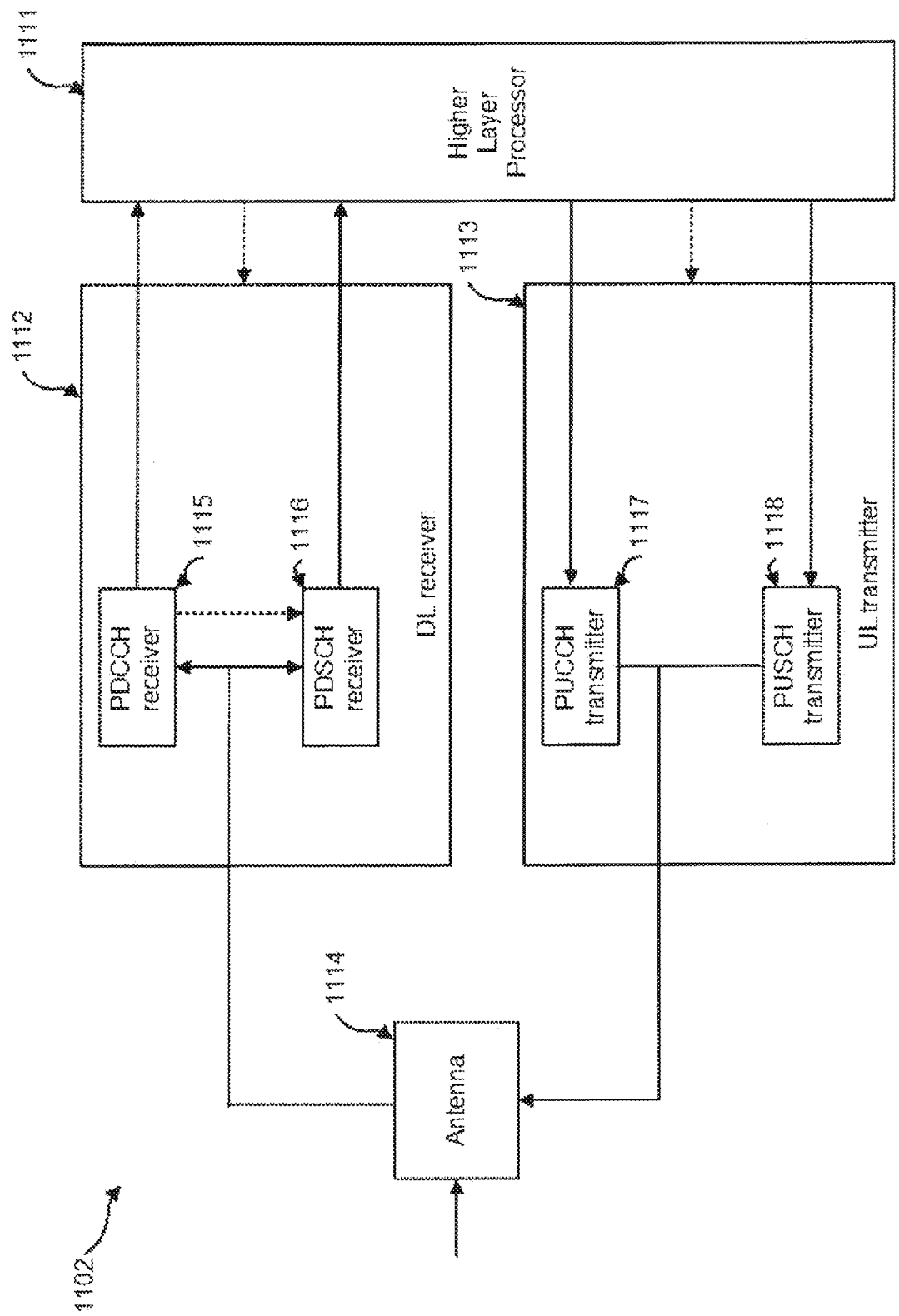
FIG. 11 is a block diagram illustrating one implementation of a UE.

FIG. 11 is a block diagram illustrating one implementation of a UE 1102 (an example of the UE 102). The UE 1102 may include a higher layer processor 1111, a UL transmitter 1113, a DL receiver 1112, and antennas 1114. The UL transmitter 1113 may include a PUCCH transmitter 1117 and a PUSCH transmitter 1118. The DL receiver 1112 may include a PDCCH receiver 1115 and a PDSCH receiver 1116. The higher layer processor 1111 may manage physical layer's behaviors (the UL transmitter's and the DL receiver's behaviors, LBT, etc) and provide higher layer parameters to the physical layer. The higher layer processor 1111 may obtain transport blocks from the physical layer. The higher layer processor 1111 may send/acquire higher layer messages such as a common and dedicated RRC messages and/or MAC messages to/from a UE's higher layer. The higher layer processor 1111 may also set and/or store higher layer parameters carried by the higher layer messages. The higher layer processor 1111 may provide the PUSCH transmitter transport blocks and provide the PUCCH transmitter 1117 UCI. The DL receiver 1112 may receive multiplexed downlink physical channels and downlink physical signals via receiving antennas and de-multiplex them. The PDCCH receiver 1115 may provide the higher layer processor DCI. The PDSCH receiver 1116 may provide the higher layer processor 1111 received transport blocks. The DL receiver 1112 may also sense an uplink channel where the UL transmitter 1113 would perform uplink transmissions.

For downlink data transmission, the UE 1102 may attempt blind decoding of one or more PDCCH (also referred to just as control channel) candidates. This procedure is also referred to as monitoring of PDCCH. The PDCCH may carry DCI format which schedules PDSCH (also referred to just as shared channel or data channel). The gNB 1060 may transmit PDCCH and the corresponding PDSCH in a downlink slot. Upon the detection of the PDCCH in a downlink slot, the UE 1102 may receive the corresponding PDSCH in the downlink slot. Otherwise, the UE 1102 may not perform PDSCH reception in the downlink slot.

Figure 12:
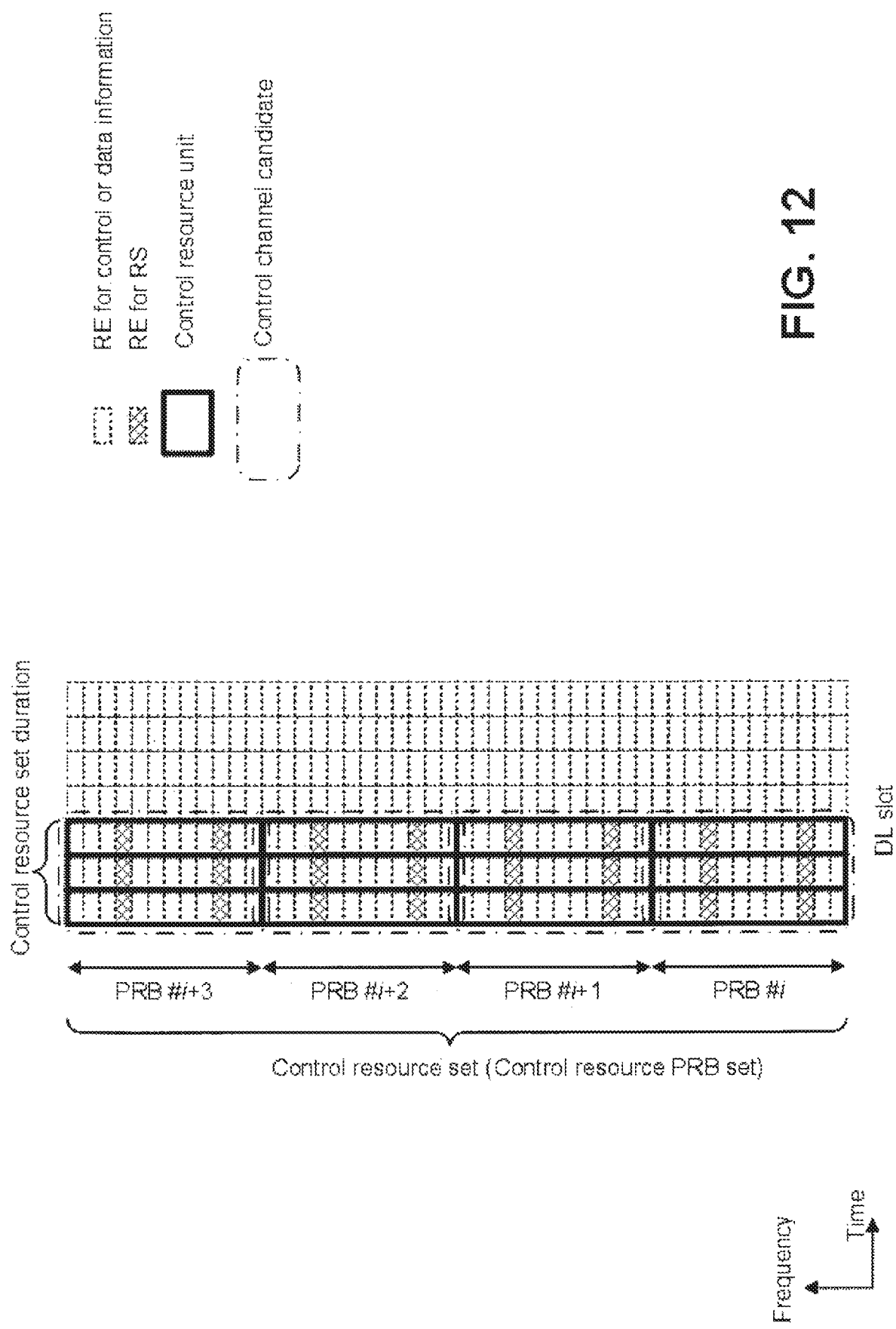
FIG. 12 illustrates an example of control resource unit and reference signal structure.

FIG. 12 illustrates an example of control resource unit and reference signal structure. A control resource set may be defined, in frequency domain, as a set of physical resource block(s) (PRBs). For example, a control resource set may include PRB #i to PRB #i+3 in frequency domain. The control resource set may also be defined, in time domain, as a set of OFDM symbol(s). It may also be referred to as a duration of the control resource set or just control resource set duration. For example, a control resource set may include three OFDM symbols, OFDM symbol #0 to OFDM symbol #2, in time domain. The UE 102 may monitor PDCCH in one or more control resource sets. The PRB set may be configured with respect to each control resource set through dedicated RRC signaling (e.g., via dedicated RRC reconfiguration). The control resource set duration may also be configured with respect to each control resource set through dedicated RRC signaling.

In the control resource unit and reference signal structure shown in FIG. 12, control resource units are defined as a set of resource elements (REs). Each control resource unit includes all REs (i.e., 12 REs) within a single OFDM symbol and within a single PRB (i.e., consecutive 12 subcarriers). REs on which reference signals (RSs) are mapped may be counted as those REs, but the REs for RSs are not available for PDCCH transmission and the PDCCH are not mapped on the REs for RSs.

Multiple control resource units may be used for a transmission of a single PDCCH. In other words, one PDCCH may be mapped the REs which are included in multiple control resource units. FIG. 12 shows the example that the UE 102 performing blind decoding of PDCCH candidates assuming that multiple control resource units located in the same frequency carries one PDCCH. The RSs for the PDCCH demodulation may be contained in all of the resource units on which the PDCCH is mapped. The REs for the RS may not be available for either the PDCCH transmission or the corresponding PDSCH transmission.

Figure 13:
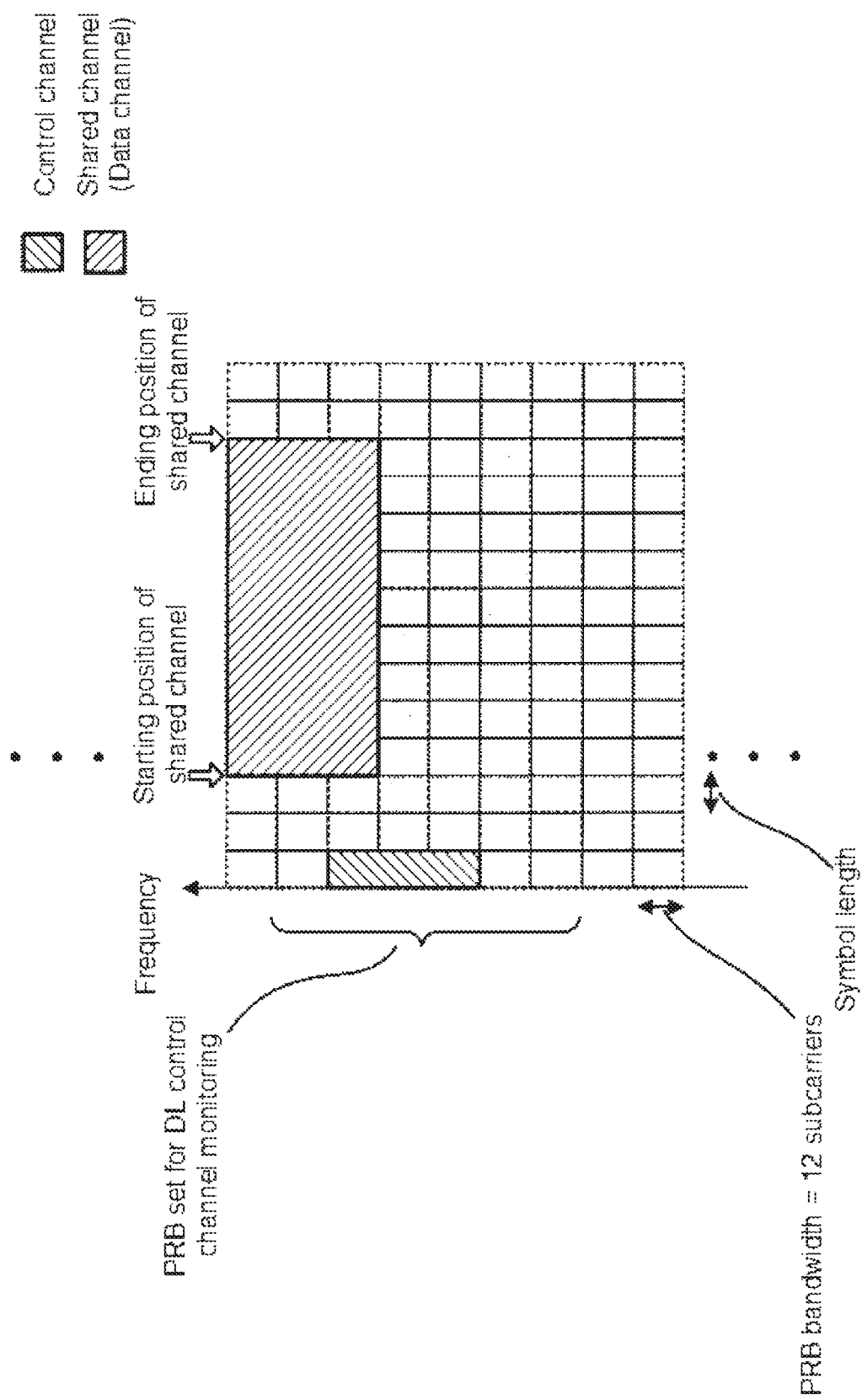
FIG. 13 illustrates an example of control channel and shared channel multiplexing.

FIG. 13 illustrates an example of control channel and shared channel multiplexing. The starting and/or ending position(s) of PDSCH may be indicated via the scheduling PDCCH. More specifically, the DCI format which schedule PDSCH may include information field(s) for indicating the starting and/or ending position(s) of the scheduled PDSCH.

The UE 102 may include a higher layer processor which is configured to acquire a common and/or dedicated higher layer message. The common and/or dedicated higher layer message may include system information and/or information for higher layer configuration/reconfiguration. Based on the system information and/or higher layer configuration, the UE 102 performs physical layer reception and/or transmission procedures. The UE 102 may also include PDCCH receiving circuitry which is configured to monitor a PDCCH. The PDCCH may carry a DCI format which schedule a PDSCH. Additionally and/or alternatively the PDCCH may carry a DCI format which schedule a PUSCH. The UE 102 may also include PDSCH receiving circuitry which is configured to receive the PDSCH upon the detection of the corresponding PDCCH. The UE 102 may also include PUCCH transmitting circuitry which is configured to transmit the PUCCH carrying HARQ-ACK feedback related to the PDSCH. Additionally and/or alternatively the UE 102 may also include PUSCH transmitting circuitry which is configured to transmit the PUSCH upon the detection of the corresponding PDCCH.

The gNB 160 may include a higher layer processor which is configured to send a common and/or dedicated higher layer message. The common and/or dedicated higher layer message may include system information and/or information for higher layer configuration/reconfiguration. Based on the system information and/or higher layer configuration, the gNB 160 performs physical layer reception and/or transmission procedures. The gNB 160 may also include PDCCH transmitting circuitry which is configured to transmit a PDCCH. The PDCCH may carry DCI format which schedule a PDSCH. Additionally and/or alternatively, the PDCCH may carry DCI format which schedule a PUSCH. The gNB 160 may also include PDSCH transmitting circuitry which is configured to transmit the PDSCH upon the transmission of the corresponding PDCCH. The gNB 160 may also include PUCCH receiving circuitry which is configured to receive the PUCCH carrying HARQ-ACK feedback related to the PDSCH. Additionally and/or alternatively the gNB 160 may also include PUSCH receiving circuitry which is configured to receive the PUSCH upon the detection of the corresponding PDCCH.

UE 102 may monitor PDCCH candidates in a control resource set. The set of PDCCH candidates may be also referred to as search space. The control resource set may be defined by a PRB set in frequency domain and a duration in units of OFDM symbol in time domain.

For each serving cell, higher layer signaling such as common RRC messages or UE dedicated RRC messages may configure the UE 102 with one or more PRB set(s) for PDCCH monitoring. For each serving cell, higher layer signaling such as common RRC messages or UE dedicated RRC messages may also configure the UE 102 with the control resource set duration for PDCCH monitoring.

For each serving cell, higher layer signaling configures a UE with P control resource sets. For control resource set p, $0<=p<P$, the configuration includes: a first symbol index provided by higher layer parameter CORESET-start-symb; the number of consecutive symbols provided by higher layer parameter CORESET-time-duration; a set of resource blocks provided by higher layer parameter CORESET-freq-dom; a CCE-to-REG mapping provided by higher layer parameter CORESET-trans-type (also referred to as CORESET-CCE-to-REG-mapping); a REG bundle size, in case of interleaved CCE-to-REG mapping, provided by higher layer parameter CORESET-REG-bundle-size; and antenna port quasi-collocation provided by higher layer parameter CORESET-TCI-StateRefId. If the UE is not configured with higher layer parameter CORESET-TCI-StateRefId, the UE may assume that the DMRS antenna port associated with PDCCH reception in the USS and the DMRS antenna port associated with PBCH reception are quasi-collocated with respect to delay spread, Doppler spread, Doppler shift, average delay, and spatial Rx parameters.

For each serving cell and for each DCI format with CRC scrambled by C-RNTI, SPS-RNTI and/or grant-free RNTI that a UE is configured to monitor PDCCH, the UE is configured with associations to control resource sets. The associations may include associations to a set of control resource sets by higher layer parameter DCI-to-CORESET-map. For each control resource set in the set of control resource sets, the associations may include: the number of PDCCH candidates per CCE aggregation level L by higher layer parameter CORESET-candidates-DCI; a PDCCH monitoring periodicity of $k_p$ slots by higher layer parameter CORESET-monitor-period-DCI; a PDCCH monitoring offset of $o_p$ slots, where $0<=o_p<k_p$, by higher layer parameter CORESET-monitor-offset-DCI; and a PDCCH monitoring pattern within a slot, indicating first symbol(s) of the control resource set within a slot for PDCCH monitoring, by higher layer parameter CORESET-monitor-DCI-symbolPattern. The UE 102 may assume that non-slot based scheduling is configured in addition to slot-based scheduling, if the UE 102 is configured with higher layer parameter CORESET-monitor-DCI-symbolPattern. The UE 102 may assume that non-slot based scheduling is not configured but slot-based scheduling only, if the UE 102 is not configured with higher layer parameter CORESET-monitor-DCI-symbolPattern.

Figure 14:
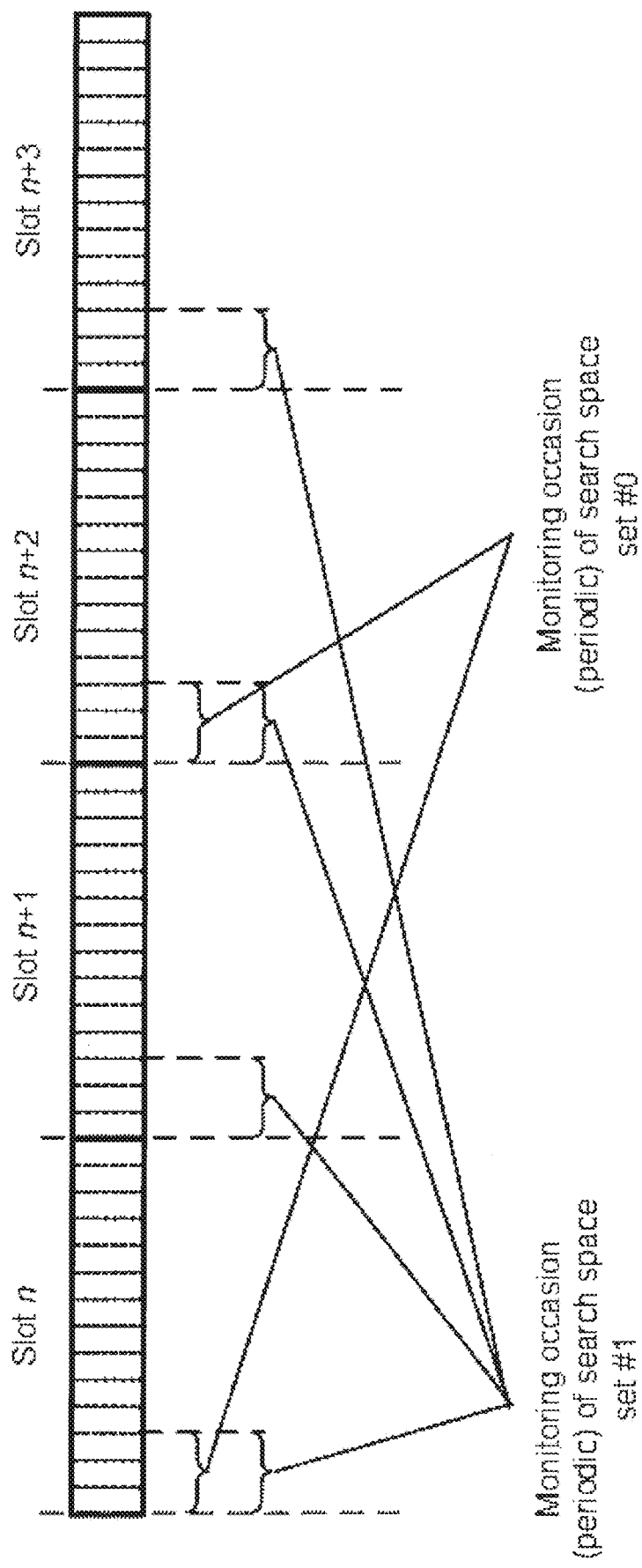
FIG. 14 illustrates PDCCH monitoring occasions for slot-based scheduling.

FIG. 14 illustrates PDCCH monitoring occasions for slot-based scheduling (also referred to as Type A resource allocation). PDCCH monitoring occasions may be OFDM symbols on which the PDCCH monitoring is configured by a search space configuration. A search space set may be identified for a combination of a control resource set, a DCI format (or DCI format group including DCI format having a same DCI payload size). In the example shown in FIG. 14, two search space sets are seen, search space set #0 and #1. Both search space set #0 and #1 are associated with a same CORESET. The configuration of the CORESET such as CORESET-start-symb, CORESET-time-duration, CORESET-freq-dom, CORESET-trans-type, CORESET-REG-bundle-size, CORESET-TCI-StateRefId apply to both search space set #0 and #1. For example, CORESET-time-duration set to 3 symbols applies to both of them. Search space set #0 may be associated with a certain DCI format (e.g., DCI format 1, fallback DCI format), and search space set #1 may be associated with another certain DCI format (e.g., DCI format 2, regular DCI format). The higher layer parameter CORESET-monitor-period-DCI is set to 2 slots for search space set #0, while the higher layer parameter CORESET-monitor-period-DCI is set to 1 slot for search space set #1. Therefore, DCI format 1 may be potentially transmitted and/or monitored in every 2 slot, while DCI format 2 may be potentially transmitted and/or monitored in every slot.

Figure 15:
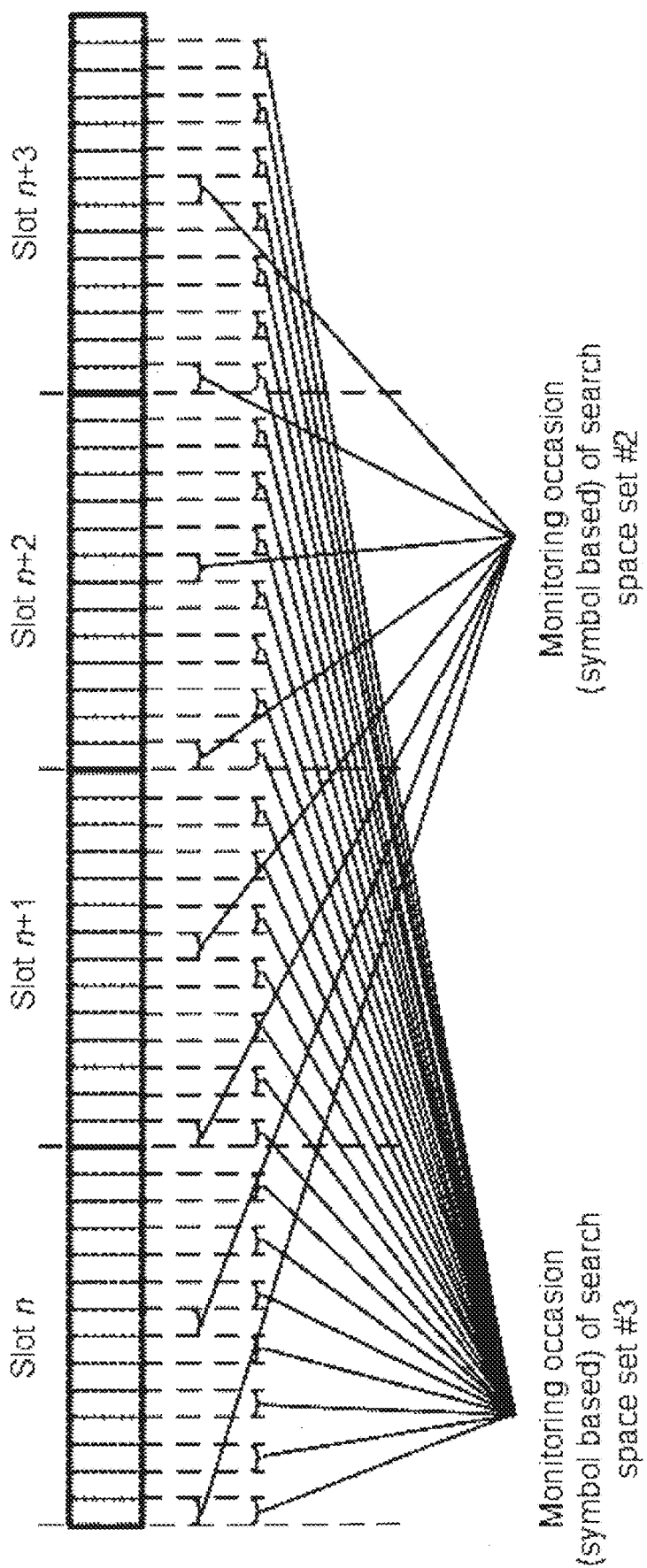
FIG. 15 illustrates PDCCH monitoring occasions for non-slot-based scheduling.

FIG. 15 illustrates PDCCH monitoring occasions for non-slot-based scheduling. In the example shown in FIG. 15, two search space sets are seen, search space set #2 and #3. Both search space set #2 and #3 are associated with a same CORESET. This CORESET may or may not be the same CORESET as in FIG. 15. The higher layer parameters CORESET-monitor-period-DCI for both search space set #2 and #3 are set to 1 slot.

In addition, the higher layer parameters CORESET-monitor-DCI-symbolPattern are individually configured to search space set #2 and #3. The higher layer parameter CORESET-monitor-DCI-symbolPattern may indicate, using a bitmap scheme, OFDM symbol(s) on which PDCCH is monitored.

To be more specific, the higher layer parameter CORESET-monitor-DCI-symbolPattern per search space set may include 14 bits, the $1^{st}$ bit to $14^{th}$ bit which correspond to OFDM symbol #0 to #13, respectively. Each of the bits indicates whether or not PDCCH is monitored on the corresponding OFDM symbol (e.g., "0" indicates no PDCCH monitoring and "1" indicates PDCCH monitoring, or vice versa). In this example, the higher layer parameters CORESET-monitor-DCI-symbolPattern for search space set #2 indicates OFDM symbols #0 and #7 for PDCCH monitoring, which the higher layer parameters CORESET-monitor-DCI-symbolPattern for search space set #3 indicates OFDM symbols #0, #2, #4, #6, #8, #10, #12 for PDCCH monitoring. It is noted that these PDCCH monitoring applies to the slot that is specified by CORESET-monitor-period-DCI and CORESET-monitor-offset-DCI.

A control-channel element may include 6 resource-element groups (REGs) where a resource-element group equals one resource block during one OFDM symbol. Resource-element groups within a control-resource set may be numbered in increasing order in a time-first manner, starting with 0 for the first OFDM symbol and the lowest-numbered resource block in the control resource set. A UE can be configured with multiple control-resource sets. Each control-resource set may be associated with one CCE-to-REG mapping only. The CCE-to-REG mapping for a control-resource set can be interleaved or non-interleaved, configured by the higher-layer parameter CORESET-CCE-REG-mapping-type. The REG bundle size is configured by the higher-layer parameter CORESET-REG-bundle-size. For non-interleaved CCE-to-REG mapping, the REG bundle size is 6. For interleaved CCE-to-REG mapping, the REG bundle size is either 2 or 6 for a CORESET with CORESET-time-duration set to 1, and the REG bundle size is either $N^{CORESET}_{symb}$ or 6 for a CORESET with CORESET-time-duration $N^{CORESET}_{symb}$ set to greater than 1. The UE may assume: the same precoding in the frequency domain being used within a REG bundle if the higher-layer parameter CORESET-precoder-granularity equals CORESET-REG-bundle-size; and the same precoding in the frequency domain being used across within contiguous RBs in CORESET if the higher-layer parameter CORESET-precoder-granularity equals the number of contiguous RBs in the frequency domain within CORESET.

Each control resource set includes a set of CCEs numbered from 0 to $N_{CCE,p,kp}-1$ where $N_{CCE,p,kp}$ is the number of CCEs in control resource set p in monitoring period $k_p$. The sets of PDCCH candidates that a UE monitors are defined in terms of PDCCH UE-specific search spaces. A PDCCH UE-specific search space $S^{(L)}_{kp}$ at CCE aggregation level L is defined by a set of PDCCH candidates for CCE aggregation level L. L can be one of 1, 2, 4, and 8.

PDSCH and/or PUSCH RE mapping may be affected by higher layer signaling and/or layer-1 signaling such as a PDCCH with a DCI format 1 and 2. For PDSCH, modulated complex-valued symbols may be mapped in REs which meet all of the following criteria: they are in the resource blocks assigned for transmission; they are declared as available for PDSCH according to rate matching resource set configuration and/or indication; they are not used for CSI-RS; they are not used for Phase Tracking RS (PT-RS); they are not reserved for SS/PBCH; they are not declared as 'reserved'.

To decode PDSCH according to a detected PDCCH, a UE may be configured with any of higher layer parameters: rate-match-PDSCH-resource-set including one or multiple reserved pairs of RBs (higher layer parameter rate-match- PDSCH-resource-RBs which is also referred to as bitmap-1) and reserved symbols (higher layer parameters rate-match-PDSCH-resource-symbols which is also referred to as bitmap-2) for which the reserved RBs apply; rate-match-resources-v-shift including LTE-CRS-vshift(s); rate-match-resources-antenna-port including LTE-CRS antenna ports 1, 2 or 4 ports;

rate-match-CORESET including CORESET-ID(s) of CORESET configured to a UE 102 for monitoring. The UE 102 may have to determine the PDSCH RE mapping according to the union of provided rate-matching configurations. To decode PDSCH a UE 102 rate-matches around the REs corresponding to detected PDCCH that scheduled the PDSCH. A UE 102 may not be expected to handle the case where PDSCH DMRS REs are over-lapping, even partially, with any RE(s) indicated by the rate-matching configuration rate-match-PDSCH-resource-set and rate-match-resources-v-shift and rate-match-resources-antenna-port and rate-match-CORESET.

If a UE 102 receives a PDSCH without receiving a corresponding PDCCH, or if the UE 102 receives a PDCCH indicating a SPS PDSCH release, the UE 102 may generate one corresponding HARQ-ACK information bit. If a UE 102 is not provided higher layer parameter PDSCH-CodeBlockGroupTransmission, the UE 102 may generate one HARQ-ACK information bit per transport block. A UE 102 is not expected to be indicated to transmit HARQ-ACK information for more than two SPS PDSCH receptions in a same PUCCH. For each physical cell group, UE 102 may be configured with higher layer parameter pdsch-HARQ-ACK-Codebook which indicates PDSCH HARQ-ACK codebook type. The PDSCH HARQ-ACK codebook may be either semi-static (also referred to as Type-1 HARQ-ACK codebook) or dynamic (also referred to as Type-2 HARQ-ACK codebook). This may be applicable to both CA and none CA operation and may correspond to L1 parameter 'HARQ-ACK-codebook'.

A UE 102 may report HARQ-ACK information for a corresponding PDSCH reception or SPS PDSCH release only in a HARQ-ACK codebook that the UE transmits in a slot indicated by a value of a PDSCH-to-HARQ_feedback timing indicator field in a corresponding DCI format (e.g. DCI format 1_0 or DCI format 1_1). If the UE 102 receives the PDCCH or SPS PDSCH release successfully, a value of the corresponding HARQ-ACK information bit may be basically set to ACK. If the UE 102 does not receive the PDCCH or SPS PDSCH release successfully (i.e. fails to receive it), the value of the corresponding HARQ-ACK information bit may be basically set to NACK. The UE 102 may report NACK value(s) for HARQ-ACK information bit(s) in a HARQ-ACK codebook that the UE transmits in a slot not indicated by a value of a PDSCH-to-HARQ_feedback timing indicator field in a corresponding DCI format (e.g. DCI format 1_0 or DCI format 1_1). If the UE 102 is provided higher layer parameter pdsch-AggregationFactor, $N_{PDSCH}^{repeat}$ is a value of pdsch-AggregationFactor; otherwise, $N_{PDSCH}^{repeat}=1$. The UE 102 may report HARQ-ACK information only for a last slot of the $N_{PDSCH}^{repeat}$ slots.

If a UE reports HARQ-ACK information in a PUSCH or a PUCCH only for a SPS PDSCH release or only for a PDSCH reception within the $M_{A,c}$ occasions for candidate PDSCH receptions that is scheduled by DCI format 1_0 with a counter DAI field value of 1 on the PCell, the UE may determine a HARQ-ACK codebook only for the SPS PDSCH release or only the PDSCH reception., e.g. one-bit HARQ-ACK codebook. Otherwise, the HARQ-ACK codebook may be more than one bit.

In some cases, a HARQ-ACK information bit may be automatically set to a fixed value (e.g. NACK, or ACK) without referring to PDSCH reception or SPS PDSCH release reception. For example, if the UE is configured with pdsch-HARQ-ACK-Codebook=semi-static, the UE 102 may report NACK value(s) for HARQ-ACK information bit(s) in a HARQ-ACK codebook that the UE transmits in a slot not indicated by a value of a PDSCH-to-HARQ_feedback timing indicator field in a corresponding DCI format (e.g. DCI format 1_0 or DCI format 1_1).

Another case where HARQ-ACK information bit may be automatically set to a fixed value (e.g. NACK, or ACK) without referring to PDSCH reception or SPS PDSCH release reception is that, if an occasion for a candidate PDSCH reception can be in response to a PDCCH with a DCI format (e.g. DCI format 1_1) and if higher layer parameter maxNrofCodeWordsScheduledByDCI indicates reception of two transport blocks, when the UE receives a PDSCH with one transport block, the HARQ-ACK information is associated with the first transport block and the UE 102 may generate a NACK for the second transport block if higher layer parameter harq-ACK-SpatialBundlingPUCCH is not provided and may generate HARQ-ACK information with value of ACK for the second transport block if higher layer parameter harq-ACK-SpatialBundlingPUCCH is provided.

Yet another case where HARQ-ACK information bit may be automatically set to a fixed value (e.g. NACK, or ACK) without referring to PDSCH reception or SPS PDSCH release reception is that, if the UE 102 is configured by higher layer parameter maxNrofCodeWordsScheduledByDCI with reception of two transport blocks for the active DL BWP of serving cell c, and if the UE 102 receives one transport block, the UE 102 may assume ACK for the second transport block.

Yet another case where HARQ-ACK information bit may be automatically set to a fixed value (e.g. NACK, or ACK) without referring to PDSCH reception or SPS PDSCH release reception is that the UE 102 may set to NACK value in the HARQ-ACK codebook any HARQ-ACK information corresponding to PDSCH reception or SPS PDSCH release scheduled by DCI format (e.g. DCI format 1_0 or DCI format 1_1) that the UE 102 detects in a PDCCH monitoring occasion that is after a PDCCH monitoring occasion where the UE detects a DCI format (e.g. DCI format 1_0 or DCI format 1_1) scheduling the PUSCH transmission.

NR may support code block group based transmission(s) for PDSCH and PUSCH. If the UE 102 is provided higher layer parameter PDSCH-CodeBlockGroupTransmission for a serving cell, the UE 102 may receive PDSCHs that include code block groups (CBGs) of a transport block and the UE 102 may be provided higher layer parameter maxCodeBlockGroupsPerTransportBlock indicating a maximum number $N_{HARQ-ACK}^{GBG/TB,max}$ of CBGs for generating respective HARQ-ACK information bits for a transport block reception for the serving cell, where for the number of C code blocks (CBs) in a transport block, the UE 102 may determine the number of CBGs as $N_{HARQ-ACK}^{CBG/TB}=\min(N_{HARQ-ACK}^{GBG/TBmax},C)$.

For CBG-based PDSCH reception, if the UE 102 successfully decodes all CGs in a given CBG of a TB, a value of the HARQ-ACK information bit corresponding the CBG may be basically set to ACK. If the UE 102 does not successfully decode (i.e. fails to decode) at least one CG in the given CBG of the TB, a value of the HARQ-ACK information bit corresponding the CBG may be basically set to NACK. In addition, in some cases, a HARQ-ACK information bit for a given CBG may be automatically set to a fixed value (e.g. NACK, or ACK) without referring to the reception of the associated CB(s).

For example, the HARQ-ACK codebook includes the $N_{HARQ-ACK}^{GBG/TBmax}$ HARQ-ACK information bits and, if $N_{HARQ-ACK}^{GBG/TB} < N_{HARQ-ACK}^{GBG/TBmax}$ for a transport block, the UE 102 may generate a NACK value for the last $N_{HARQ-ACK}^{GBG/TBmax} - N_{HARQ-ACK}^{GBG/TB}$ HARQ-ACK information bits for the transport block in the HARQ-ACK codebook.

In another case where a HARQ-ACK information bit for a CBG is automatically set to ACK without referring to the reception of the associated CB(s) is that, if the UE 102 generates a HARQ-ACK codebook in response to a retransmission of a transport block, corresponding to a same HARQ process as a previous transmission of the transport block, the UE 102 may generate an ACK for each CBG that the UE 102 correctly decoded in a previous transmission of the transport block.

Yet another case where a HARQ-ACK information bit for a CBG is automatically set to a certain value without referring to the reception of the associated CB(s) is that if the UE 102 receives a PDSCH that is scheduled by a PDCCH with DCI format (e.g. DCI format 1_0), or a SPS PDSCH, or the UE detects a SPS PDSCH release, and if the UE is configured with higher layer parameter pdsch-HARQ-ACK-Codebook=semi-static, the UE may repeat $N_{HARQ-ACK}^{GBG/TBmax}$ times the HARQ-ACK information for the transport block in the PDSCH or for the SPS PDSCH release, respectively, for generating $N_{HARQ-ACK}^{GBG/TBmax}$ HARQ-ACK information bits The 5G NR system may be operated licensed spectrum which is owned by cellular operators. Additionally and/or alternatively the 5G NR system may be operated in unlicensed spectrum as a complementary tool for the operators to augment their service offering. NR-based unlicensed access (NR-U) may be applicable to below 6 GHz and above 6 GHz unlicensed bands (e.g., 5 GHz, 37 GHz, 60 GHz). NR-U cell may be operated in TDD bands with either an LTE-based anchor cell or an NR-based anchor cell (i.e. standalone NR cell). Furthermore, standalone operation of NR-U in unlicensed spectrum may also be possible.

In order to ensure a fair co-existence with another NR-U node and/or another radio access technology (RAT) node such as wireless LAN node, the gNB 160 and/or the UE 102 may have to perform Listen Before Talk (LBT) procedure before their transmissions. LBT procedure is also referred to as Channel Access procedure. There may be several types of Channel Access (CA) procedures.

Figure 16:
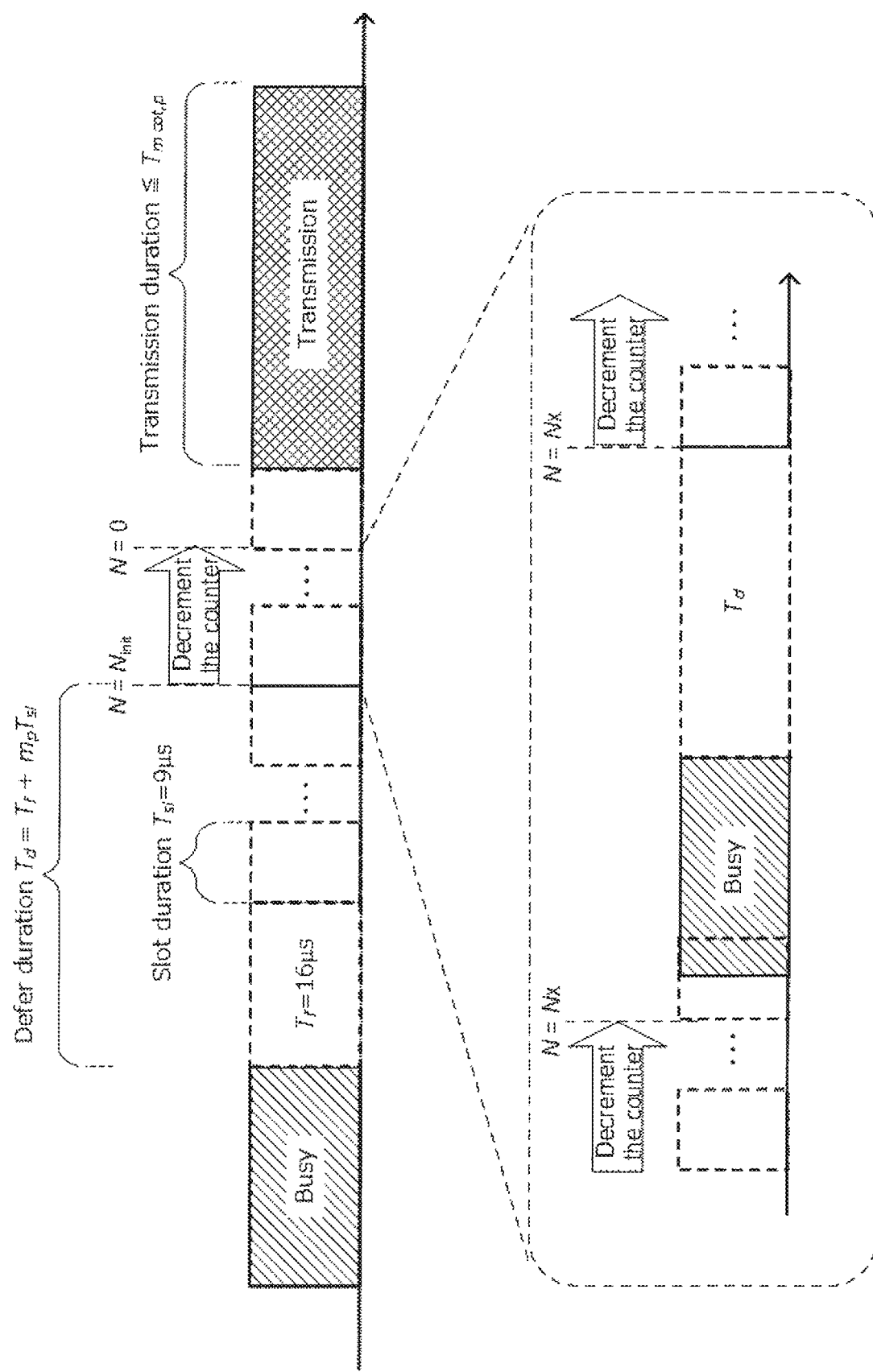
FIG. 16 shows an example of Channel Access procedure.

FIG. 16 shows the first type of Channel Access procedure. The first type of Channel Access procedure may be used for downlink transmission(s) including PDSCH and PDCCH. The gNB 160 may transmit a transmission including PDSCH and PDCCH on a carrier on which NR-U cell(s) transmission(s) are performed, after first sensing the channel to be idle during the CA slot durations of a defer duration $T_d$; and after the counter N is zero in step 4. The counter N is adjusted by sensing the channel for additional CA slot duration(s) according to the Step S1 to step S6. In Step S1, the gNB 160 may set $N=N_{init}$, where $N_{init}$ is a random number uniformly distributed between 0 and $CW_p$, and go to Step S4. In Step S2, if N>0 and the gNB 160 chooses to decrement the counter, the gNB 160 may set N=N−1. In Step S3, the gNB 160 may sense the channel for an additional CA slot duration, and if the additional CA slot duration is idle, go to Step S4, otherwise go to Step S5. In Step S4, if N=0, the gNB 160 may stop, otherwise go to Step S2. In Step S5, the gNB 160 may sense the channel until either a busy CA slot is detected within an additional defer duration $T_d$ or all the CA slots of the additional defer duration $T_d$ are detected to be idle. In Step S6, if the channel is sensed to be idle during all the CA slot durations of the additional defer duration $T_d$, the gNB 160 may go to Step S4, otherwise go to Step S5.

Figure 17:
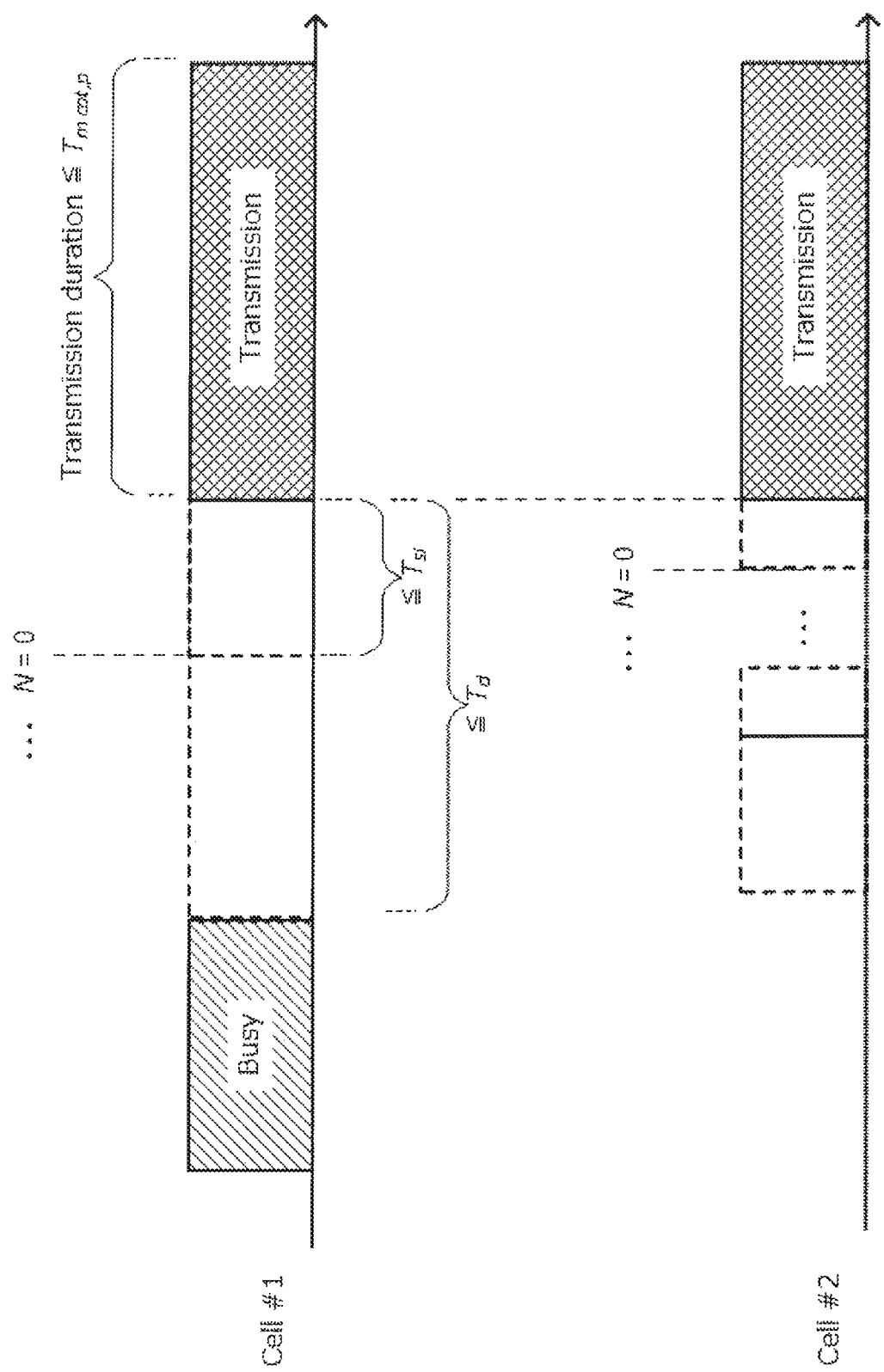
FIG. 17 shows an example of deferment of transmission.

FIG. 17 shows an example of deferment of transmission. If the gNB 160 has not transmitted a transmission including PDSCH/PDCCH on a carrier on which NR-U cell(s) transmission(s) are performed after Step S4 in this procedure, the gNB 160 may transmit a transmission including PDSCH/PDCCH on the carrier, if the channel is sensed to be idle at least in a CA slot duration $T_{sl}$ when the gNB 160 is ready to transmit PDSCH/PDCCH and if the channel has been sensed to be idle during all the CA slot durations of a defer duration $T_d$ immediately before this transmission. If the channel has not been sensed to be idle in as CA lot duration $T_{sl}$ when the gNB 160 first senses the channel after it is ready to transmit or if the channel has been sensed to be not idle during any of the CA slot durations of a defer duration $T_d$ immediately before this intended transmission, the gNB 160 may proceed to Step S1 after sensing the channel to be idle during the CA slot durations of a defer duration $T_d$. The defer duration $T_d$ may consist of duration $T_f=16$ us immediately followed by $m_p$ consecutive CA slot durations where each slot duration is $T_{sl}=9$ us, and T includes an idle CA slot duration $T_{sl}$ at start of $T_f$. A slot duration $T_{sl}$ may be considered to be idle if the gNB 160 senses the channel during the CA slot duration, and the power detected by the gNB 160 for at least 4 us within the CA slot duration is less than energy detection threshold $X_{Thresh}$. Otherwise, the CA slot duration $T_{sl}$ may be considered to be busy. By using the above-described transmission deferment, more than one cells of which locations are geometrically separated may be able to obtain channel access successfully at the same time, and therefore frequency reuse among the cells can be achieved. $CW_{min,p} \leq CW_p \leq CW_{max,p}$ is the contention window. $CW_p$ adjustment may be performed by the gNB 160. $CW_{min,p}$ and $CW_{max,p}$ may be chosen before Step S1 of the above-described procedure. $m_p$, $C_{min,p}$, and $CW_{max,p}$ may be derived based on channel access priority class associated with the gNB transmission.

FIG. 18 shows an example of channel access priority class for downlink transmission(s). In this example, there are 4 classes, and lower index may correspond to higher priority. For each class, a parameter set for the channel access procedure is defined. The parameter set for class p may include $m_p$, $CW_{min,p}$, $CW_{max,p}$, $T_{mcot,p}$, and allowed $CW_p$ sizes, where $T_{mcot,p}$ is referred to as maximum channel occupancy time (MCOT). The gNB 160 getting channel access with priority class p may not be allowed to continuously transmit on the carrier on which NR-U cell(s) transmission(s) are performed, for a period exceeding $T_{mcot,p}$.

Similarly, the UE 102 may use the first type of Channel Access procedure for uplink transmission(s) including PUSCH and/or PUCCH. The above-described Channel access procedure including Step S1 to Step S6 may be used with "gNB 160" replaced by "UE 102", with "PDSCH/PDCCH" replaced by "PUSCH/PUCCH/SRS", and with uplink channel access priority class. FIG. 19 shows an example of channel access priority class for uplink transmission(s). When the first type of Channel Access procedure is used for uplink transmission, it may also be referred to as Type-1 UL Channel Access procedure.

Figure 20:
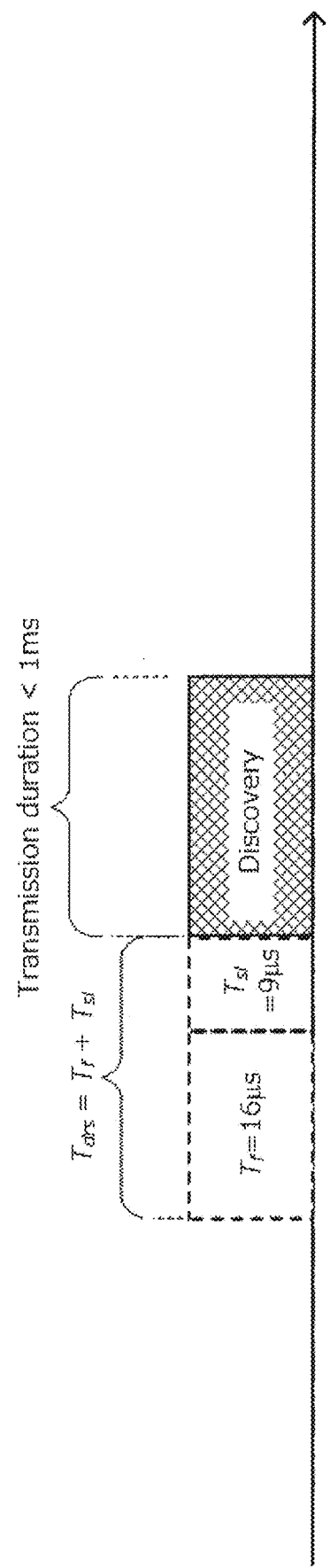
FIG. 20 shows an example of Channel Access procedure.

FIG. 20 shows the second type of Channel Access procedure. The second type of Channel Access procedure may be used for downlink transmission(s) including discovery signal transmission(s) and not including PDSCH. The discovery signal may include SS/PBCH(s), CSI-RS(s) and/or control resource set(s). The second type of Channel Access procedure may make the channel access easier than the first type, since the discovery signal may not occupy a long transmission duration compared with a PDSCH transmission. An gNB 160 may transmit a transmission including discovery signal but not including PDSCH on a carrier on which NR-U cell(s) transmission(s) are performed immediately after sensing the channel to be idle for at least a sensing interval $T_{drs}$=25 us and if the duration of the transmission is less than 1 ms. $T_{drs}$ may consist of a duration $T_f$=16 us immediately followed by one CA slot duration $T_{sl}$=9 us and $T_f$ includes an idle CA slot duration $T_{sl}$ at start of $T_f$. The channel is considered to be idle for $T_{drs}$ if it is sensed to be idle during the slot durations of $T_{drs}$.

Figure 21:
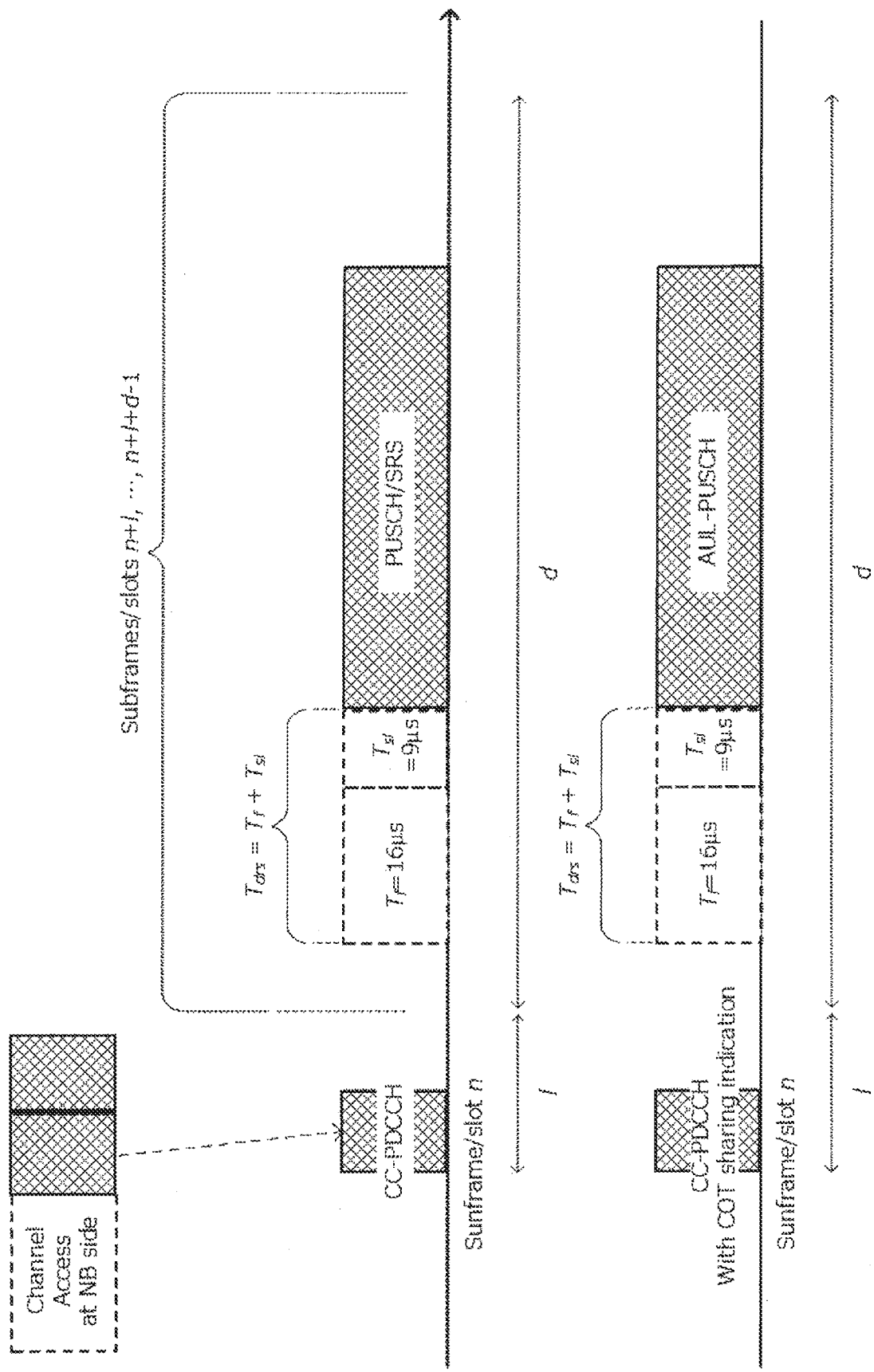
FIG. 21 shows an example of Channel Access procedure.

FIG. 21 shows the third type of Channel Access procedure. Channel sensing scheme of the third type of Channel Access procedure is almost the same as of the second type of Channel Access procedure. The third type of Channel Access procedure may be used for uplink transmission(s) which is to be transmitted inside of COT obtained by the first type channel access procedure at the gNB 160 side. In the example, the gNB 160 performs the first type channel access procedure right before a Common Control-PDCCH (CC-PDCCH) transmission. CC-PDCCH may also be referred to as PDCCH with CRC scrambled by common control-RNTI (CC-RNTI). In a DCI format carried by the CC-PDCCH may include several bit fields including bit field(s) for indicating "UL offset" and "UL duration". If UL offset l and duration d are indicated by the CC-PDCCH for subframe n, the UE 102 is not required to receive any downlink physical channels and/or physical signals in slot(s) n+l+i with i= 0, 1, . . . , d−1, and those slot(s) may have to be covered by the MCOT which was obtained by the channel access for the CC-PDCCH transmission at gNB 160 side. If the UE uses Type 2 channel access procedure for a transmission including PUSCH, the UE may be allowed to transmit the transmission including PUSCH immediately after sensing the channel to be idle for at least a sensing interval $T_{short\_ul}$=25 us or $T_{short\_ul}$=16 us. They may be considered as a same channel access procedure types but with different durations. Alternatively, Type 2 channel access procedure with $T_{short\_ul}$=25 us may also be referred to as uplink Type 2A channel access procedure and Type 2 channel access procedure with $T_{short\_ul}$=16 us may also be referred to as uplink Type 2B channel access procedure. In this case, they may be considered as two different channel access procedure types. $T_{short\_ul}$ consists of a duration $T_f$=16 us immediately followed by one CA slot duration $T_{sl}$=9 us and $T_f$ includes an idle CA slot duration $T_{sl}$ at start of $T_f$. The channel is considered to be idle for $T_{short\_ul}$ if it is sensed to be idle during the CA slot durations of $T_{short\_ul}$. The third type of Channel Access procedure may also be referred to as Type-2 UL Channel Access procedure. Note that the other type of PDCCH (e.g. PDCCH with DCI format 0_0, 0_1, 0_2, 0_3, 1_0, 1_1, 1_2, 1_3) for slot n may also indicate "UL offset" and "UL duration". In this case, the UE may also be allowed to use the third type of Channel Access procedure, if configured.

Figure 22:
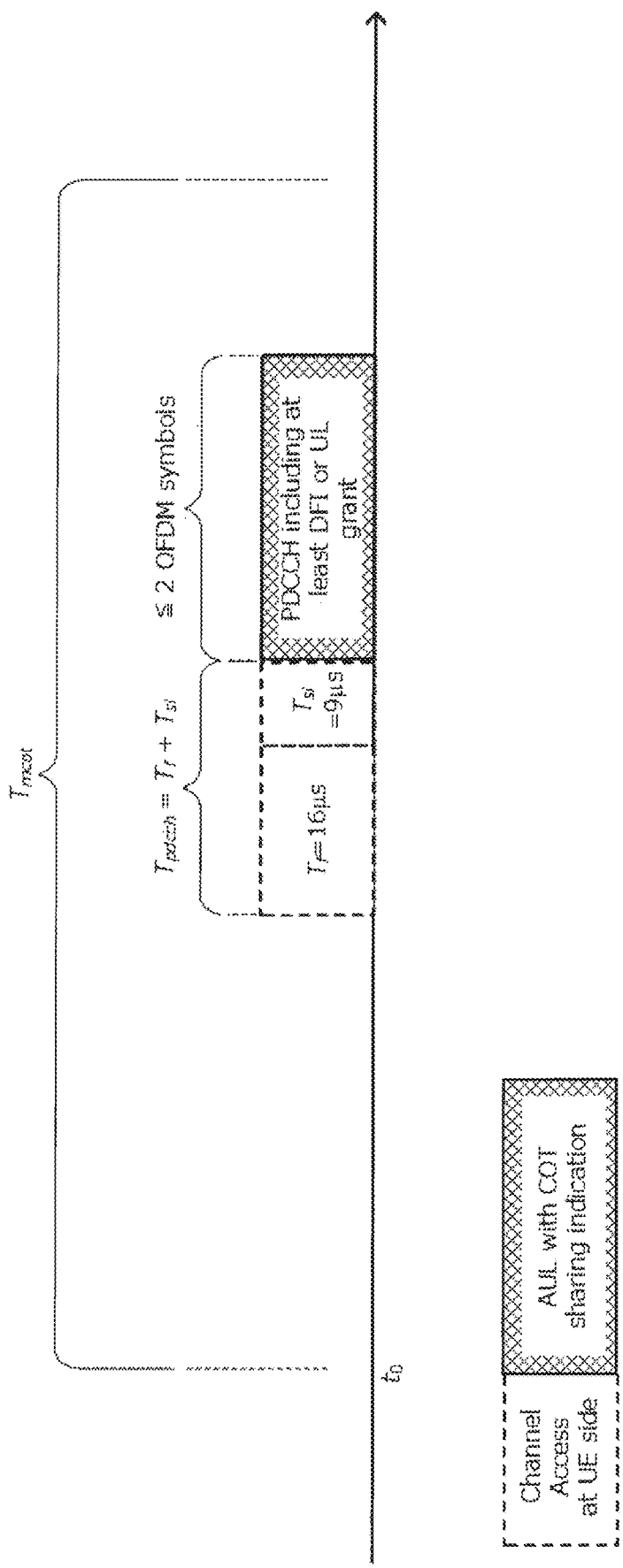
FIG. 22 shows an example of Channel Access procedure.

FIG. 22 shows the fourth type of Channel Access procedure. Channel sensing scheme of the fourth type of Channel Access procedure is almost the same as of the second and third types of Channel Access procedure. The fourth type of Channel Access procedure may be used for downlink transmission(s) which includes PUSCH but does not include PDSCH and is to be transmitted inside of COT obtained by the first type channel access procedure at the UE 102 side. If a PUSCH transmission indicates COT sharing, an gNB 160 may be allowed to transmit a transmission including PDCCH but not including PDSCH on the same carrier immediately after sensing the channel to be idle for at least a sensing interval $T_{pdcch}$=25 us, if the duration of the PDCCH is less than or equal to two OFDM symbols length and it shall contain at least Downlink Feedback Information (DFI) or UL grant to the UE from which the PUSCH transmission indicating COT sharing was received. $T_{pdcch}$ consists of a duration $T_f$=16 us immediately followed by one slot duration $T_{sl}$=9 us and $T_f$ includes an idle slot duration $T_{sl}$ at start of $T_f$. The channel is considered to be idle for $T_{pdcch}$ if it is sensed to be idle during the slot durations of $T_{pdcch}$.

Figure 23:
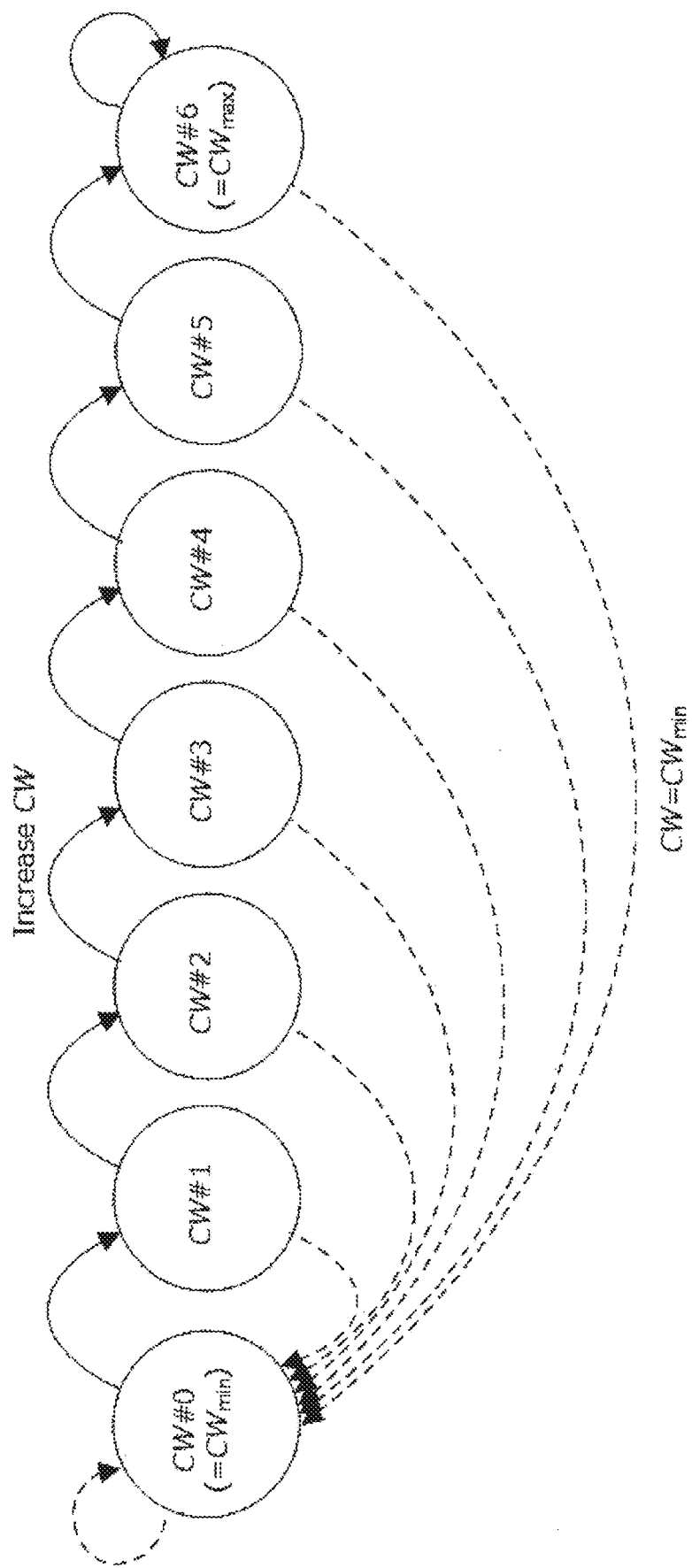
FIG. 23 shows an example of CW size adjustment.

In order to avoid collisions with transmissions from other nodes, contention window (CW) size may change depending on how many times collisions occur or equivalent. If a collision is observed at a node, the node may have to increase the CW size. If any collision is not observed, the node may be allowed to reduce the CW size. FIG. 23 shows an example of CW size adjustment. This example assumes that the number of available CW size is 7, i.e. CW #0 to CW #6. If a collision is observed, CW size is increased to the CW size with the next higher index, except for the $CW_{max}$ in which case the CW size is kept as $CW_{max}$. If any collision is not observed, the CW size may fallback to $CW_{min}$ irrespective of the previous CW size.

A possible metric for the gNB's decision on whether or not the collision occurs for PDSCH may be HARQ-ACK feedback from the UE 102. Another possible metric for the gNB's decision on whether or not the collision occurs in PDCCH may be PUSCH from the UE 102. For uplink, a possible metric for the UE's decision on whether or not the collision occurs for PUSCH may be whether or not uplink retransmission is requested.

Figure 24:
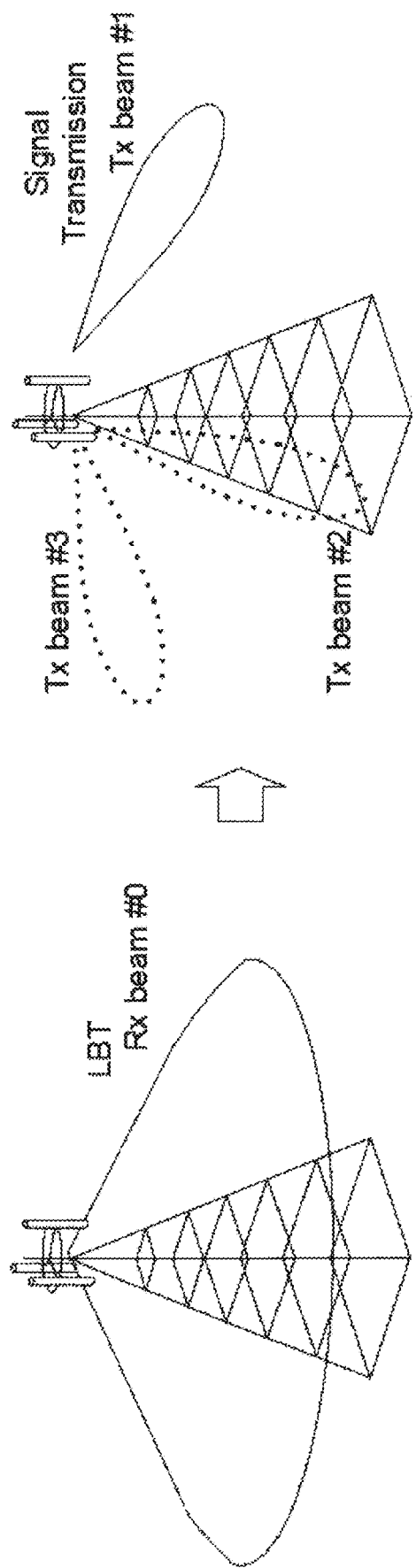
FIG. 24 shows an example of LBT for a transmission with a directional beam.

FIG. 24 shows an example of LBT for a transmission with a directional beam. The gNB 160 may perform transmission beam sweeping with multiple narrow Tx beams (e.g. Tx beam #1, #2 and #3). Immediately before a signal transmission with any Tx beam, the gNB 160 may have to perform LBT. In this example, the gNB 160 performs channel sensing by using a wider beam (Rx beam #0) in horizontal plane (e.g. omni-directional Rx beam). The LBT parameters (counter, CWS, channel access class, COT, and so on) may be managed per node. For example, counter and CWS may be managed per node. In this case, once the counter reaches zero, the gNB 160 may be allowed to perform transmission with any of the Tx beams, and a single CWS is maintained with referring to collisions (e.g. NACKs) on all of the Tx beams.

Additionally and/or alternatively, some linkage from Tx beam used for a transmission to Rx beam used for channel sensing for the transmission, or vice versa, may be defined. For example, each of the Tx beam #1, #2 and #3 corresponds to the Rx beam #0. In this case, the LBT parameters may be managed per Rx beam. For example, counter and CWS may be managed per node. Once the counter for a given Rx beam reaches zero, the gNB 160 may be allowed to perform transmission with any of the Tx beams which are linked to the given Rx beam, and a single CWS for the given Rx beam is maintained with referring to collisions on all of the Tx beams which are linked to the given Rx beam. COT may be figured per Rx beam. Within the COT for a given Rx beam, the gNB 160 may be allowed, subject to Cat-1 or Cat-2 LBT, to perform transmissions using any of the Tx beams which correspond to the given Rx beam. Alternatively, either the counter or the CWS may be managed per Rx beam while the other one may be managed per node. For example, the counter is managed per Rx beam, and once the counter reaches zero, the gNB 160 may be allowed to perform a transmission with any of the Tx beams which are linked to the Rx beam. On the other hand, collisions on all of Tx beams (including Tx beam #1, #2 and #3 and any other beams of the gNB 160) may be considered for CWS adjustment for the Rx beam #0.

Cat-1 LBT is a channel access procedure without channel sensing. Cat-2 LBT is a channel access procedure with one shot channel sensing. Cat-2 LBT may also be referred to as Type-2 channel access procedure. Cat-2 LBT may be further separated into two types in terms of a channel sensing slot length, the first one is Cat-2 LBT with 25 μs channel sensing slot and the other is Cat-2 LBT with 16 μs channel sensing slot. Cat-1 and Cat-2 LBTs may be allowed only inside COT. Cat-2 LBT with 16 μs channel sensing slot may be allowed to be used if a gap length from the timing when the channel gets idle is equal to 16 μs. Cat-2 LBT with 25 μs channel sensing slot may be allowed to be used if a gap length from the timing when the channel gets idle is equal to or longer than 25 μs. Cat-3 LBT is a channel access procedure with random backoff with a fixed CW size. Cat-4 LBT is a channel access procedure with random backoff with an adaptive CW size. Cat-4 LBT may also be referred to as Type-1 channel access procedure.

Tx beams may correspond to some physical channels or physical signals. For example, each Tx beam may correspond to a respective source of quasi-co-location (QCL) assumption. The sources of QCL assumption may include SS/PBCH, CSI-RS, PT-RS, NR-U discovery signal/channel which may comprise SS/PBCH, and the like. Therefore, it is noted that the above-described "Tx beam" can be interpreted as the corresponding physical channel or physical signal. Alternatively and/or additionally, the Tx beam may correspond to some transmission antenna configuration, e.g. a weight vector for a transmission antenna array. In this case, the above-described "Tx beam" can be interpreted as the corresponding antenna configuration. Similarly, the Rx beam may correspond to some reception antenna configuration, e.g. a weight vector for a reception antenna array. In this case, the above-described "Rx beam" can be interpreted as the corresponding antenna configuration.

If beam forming gain for channel sensing is different from one for the corresponding transmission, threshold for the channel sensing may need to be adjusted. For example, the antenna gain ratio between Rx antenna configuration and Tx antenna configuration for a given direction (e.g. the direction to the target UE, the center direction of the Tx beam main lobe, the direction of the peak of the Tx beam main lobe) may be used for the threshold adjustment. More specifically, if the antenna gain of the center direction of Tx beam #1 is 20 dBi and the antenna gain of the same direction of Rx beam #0 (which is linked from the Tx beam #1) is 2 dBi, the threshold value for the channel sensing using the Rx beam #0 may be decreased with 18 dB, compared with a non-directional transmission case.

Figure 25:
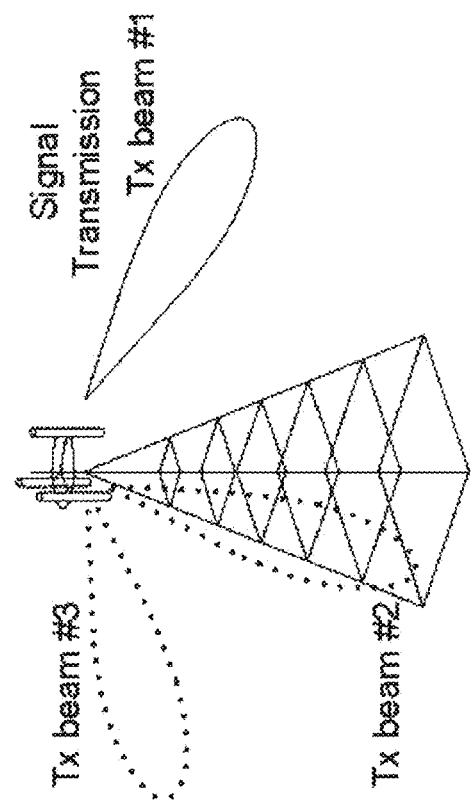
FIG. 25 shows an example of LBT for a transmission with a directional beam.
Figure 25:
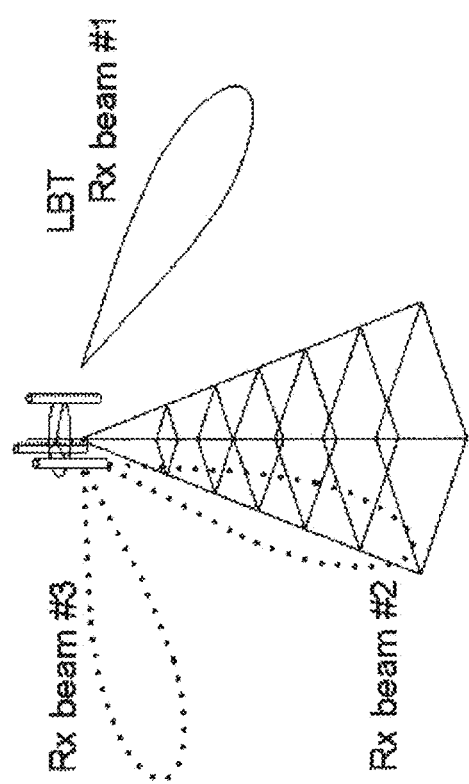

FIG. 25 shows an example of LBT for a transmission with a directional beam. The gNB 160 may be able to use multiple narrow Tx beams (e.g. Tx beam #1, #2 and #3) for transmissions as well as multiple narrow Rx beams (e.g. Rx beam #1, #2 and #3) for receptions. Immediately before a signal transmission with any Tx beam, the gNB 160 may have to perform LBT. Some linkage (e.g. 1-to-1 mapping) from Tx beam used for a transmission to Rx beam used for channel sensing for the transmission, or vice versa, may be defined. For example, the Tx beam #1, #2 and #3 correspond to the Rx beam #1, #2 and #3, respectively. Immediately before a transmission with a given Tx beam, LBT may have to be performed by using the Rx beam which is linked from the given Tx beam. In other words, once the gNB 160 obtains a channel by using the LBT with a given Rx beam, the gNB 160 may be allowed to perform a transmission with the Tx beam which is linked to the given Rx beam. LBT parameters may be managed per Tx beam. COT may be figured per Tx beam. Within the COT for a given Tx beam, the gNB 160 may be allowed, subject to Cat-1 or Cat-2 LBT, to perform transmissions using the given Tx beam. Additionally, some of the LBT parameters may be managed per node. For example, a single counter may be generated and updated for each Tx beam, while a single CWS per node may be adjusted by considering collisions on all of the Tx beams. The COT may be figured per node. Within the COT, the gNB 160 may be allowed, subject to Cat-1 or Cat-2 LBT, to perform transmissions using any of the Tx beams.

Figure 26:
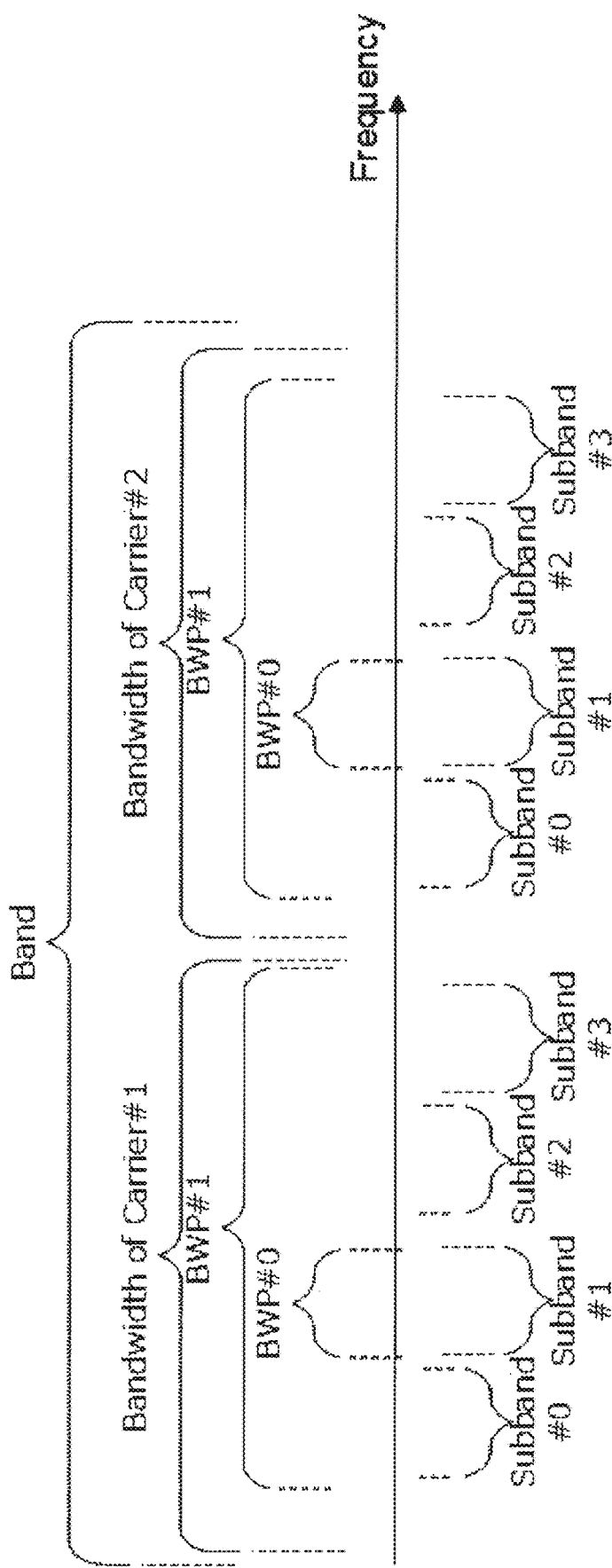
FIG. 26 shows an example of sub-band configuration.

FIG. 26 shows an example of sub-band configuration. A NR band may include one or more NR carriers (also referred to as just carrier). A carrier may include one or more BWPs. BWP #0 (also referred to as initial BWP or initial DL BWP, which may be configured by Master Information Block (MIB), System Information Block type 1 (SIB1), or equivalent for PCell) may have 20 MHz bandwidth. The other BWPs may have bandwidth of multiple of 20 MHz. Each sub-band may comprise 20 MHz or a multiple of 20 MHz bandwidth and is defined within a BWP. BWP #0 may consist of a single 20 MHz sub-band. Any other BWP may consist of one or more sub-bands. The sub-band may be a unit of frequency scheduling. The sub-band may also be referred to as sub-channel, channel access bandwidth, or the like. A higher layer configuration about a BWP may include a configuration of sub-band(s) in the BWP. Alternatively, the sub-band(s) may be configured by using frequency domain resource allocations in CORESET configurations. The sub-band may be an upper limit of the resources which is schedulable by a single DCI. In other words, PDSCH/PUSCH resource allocation is defined within a sub-band and not across a sub-band boundary. The sub-band may be a unit of LBT. The sub-band may be a unit of CORESET configuration. CORESET frequency resource allocation is defined within a sub-band and not across a sub-band boundary.

Additionally and/or alternatively, CORESET configuration may contains information for indicating frequency repetition of the CORESET. For example, if CORESET configuration contains an information element for frequency repetition, the frequency repetition of the CORESET may be considered to be enabled. if CORESET configuration does not contain the information element for frequency repetition, the frequency repetition of the CORESET may be considered to be disabled. The information element for frequency repetition may include one or more of 1) frequency domain repetition factor (i.e. the number of frequency domain repetitions), 2) frequency domain interval between adjacent repetitions, etc. If UE 102 is configured with the repetition enabled, the UE 102 may assume the same set of PDCCHs are transmitted among those repeated CORESETs.

PDCCH in a CORESET in a given sub-band may be able to schedule a PDSCH only in the same sub-band. For example, DCI format(s) used for the scheduling of PDSCH/PUSCH in a NR-U cell may include a frequency domain resource assignment field—$\lceil \log_2(N(N+1)/2) \rceil$ bits, where N may be the size of the bandwidth of the sub-band where the PDCCH carrying the DCI is detected, in case the DCI is detected in UE specific search space and satisfying requirement(s) on the total number of different DCI sizes. Otherwise (e.g. in case the DCI is detected in common search space), N may be the size of the bandwidth of the sub-band which corresponds to an initial BWP (i.e. BWP #0). N may be expressed in RB number.

In a BWP, the gNB 160 may perform channel sensing in every sub-band and may transmit a signal (PDCCH, PDSCH, etc) in the sub-band(s) on which the gNB 160 gets a channel access successfully. The UE 102 may be able to monitor PDCCHs in multiple CORESET which correspond to different sub-bands. The gNB 160 may manage the LBT parameters per sub-band, alternatively per BWP, or yet alternatively per cell. Additionally and/or alternatively some of the LBT parameters may be managed per sub-band, which the others may be managed differently (e.g. per BWP or per cell).

In a BWP, the UE 102 may perform channel sensing in every sub-band and may transmit a signal (PUCCH, PUSCH, etc) in the sub-band(s) on which the UE 102 gets a channel access successfully. The gNB 160 may be able to monitor the signal in every sub-bands. The UE 102 may manage the LBT parameters per sub-band, alternatively per BWP, or yet alternatively per cell. Additionally and/or alternatively some of the LBT parameters may be managed per sub-band, which the others may be managed differently (e.g. per BWP or per cell).

Additionally and/or alternatively, PDCCH in each sub-band may be able to schedule a PDSCH in the whole bandwidth of the BWP. For example, DCI format(s) used for the scheduling of PDSCH/PUSCH in a NR-U cell may include a frequency domain resource assignment field— $\lceil \log_2(N(N+1)/2) \rceil$ bits, where N may be the size of the bandwidth of the active BWP. In the BWP, the gNB 160 may prepare a PDSCH/PUSCH assuming that the whole bandwidth of the BWP is available for the PDSCH/PUSCH transmission. The gNB 160 may perform channel sensing in every sub-band and may transmit the prepared PDSCH only on the sub-band(s) where the LBT was successful. On the sub-band(s) where the LBT was failed, the PDSCH resources (e.g. REs or RBs) may have to be punctured (i.e. the PDSCH is not mapped to the physical resources) so that the PDSCH transmission does not happen in those sub-band(s). Regarding PDCCH which schedules the PDSCH, multiples PDCCHs scheduling the same PDSCH may be prepared. These PDCCHs may be assumed to be mapped in different sub-bands in the BWP. The PDCCH(s) in the sub-band(s) on which the gNB 160 gets a channel access successfully may be transmitted, while. The PDCCH(s) in the sub-band(s) on which the gNB 160 does not get a channel access successfully may not be transmitted.

In this case, if the gNB 160 gets the channel access in more than one sub-band, the UE 102 may detect more than one PDCCHs that schedule the same PDSCH. Scheduling the same PDSCH may mean the DCIs in the PDCCH have the same value in every information field and CRC. Alternatively, it may mean the DCIs, in the PDCCH indicate the same PDSCH parameter set, e.g. allocated resources, counter DAI, PUCCH resource, etc. Yet alternatively, it may mean those PDCCHs are repeated among the repeated CORESETs (i.e. CORESETS with the frequency domain repetition). If the UE 102 may detect more than one PDCCHs that schedule the same PDSCH, the UE may have to discard the PDCCHs except for one of them. In other words, only one PDCCH is considered to be valid, while all the other detected PDCCHs are considered to be invalid. Alternatively, the UE 102 may consider those multiple detected PDCCHs as a single detected PDCCH, and the duplicated indications of the multiple detected PDCCHs may apply only once.

The above-described principle may apply to the other type of DCI (e.g. DCI format 0_0, 0_1, 2_0, 2_1, 2_2, 2_3) than the one scheduling PDSCH. For example, the gNB 160 may transmit multiple PDCCHs with DCI format 2_2 in the multiple sub-bands in the BWP. If the UE 102 detects the multiple PDCCHs with DCI format 2_2 in the multiple sub-bands, the TPC command of only one of the PDCCHs with the DCI format 2_2 may apply and the TPC command(s) of the other PDCCHs may not apply.

The frequency domain resource assignment field in the DCI in the PDCCH may indicate allocated resources (e.g. resource blocks) comprise the resources on the sub-band(s) to which the gNB 160 does not actually map the PDSCH due to a channel access failure. Without any supplementary information, the UE 102 detecting the DCI may assume that the PDSCH is mapped to the resources in those sub-band(s).

Alternatively, the UE 102 may utilize some supplementary information so that the UE 102 can perform PDSCH decoding assuming that the PDSCH is not mapped to the resource in those sub-band(s). The supplementary information may be results of PDCCH detections in the sub-bands. Additionally and/or alternatively, the supplementary information may be information provided by CC-PDCCH or SFI PDCCH. Additionally and/or alternatively, the supplementary information may be information provided by DCI format 2_1 (also referred to as pre-emption indication).

Based on the results of PDCCH detections in the sub-bands, the UE 102 may perform PDSCH decoding assuming that the PDSCH is not mapped to the resource in those sub-band(s). More specifically, for example, the UE 102 configured with the repetition of the CORESET, the UE 102 may assume multiple PDCCHs scheduling a single PDSCH are transmitted in all repetitions of the CORESET. If the UE 102 does not detect the PDCCH in a given sub-band, the UE 102 may assume that the scheduled PDSCH resources in the sub-band are not available for the PDSCH transmission and that the PDSCH is punctured (i.e. prepared to be mapped but not actually mapped) on those PDSCH resources. On the other hand, if the UE 102 detects the PDCCH in a given sub-band, the UE 102 may assume the scheduled PDSCH resources in the sub-band are available for the PDSCH transmission.

Based on the information provided by CC-PDCCH or SFI PDCCH, the UE 102 may perform PDSCH decoding assuming that the PDSCH is not mapped to the resource in those sub-band(s). For example, SFI PDCCH (e.g. PDCCH with DCI format 2_0 or PDCCH with DCI format which indicates slot format(s)) which indicates a slot format may be transmitted in every sub-band in a BWP. A reference sub-carrier spacing configuration $\mu_{ref}$ may be configured by higher layer parameter. Each SFI PDCCH may indicate a slot format and/or COT structure in the respective sub-band where the SFI PDCCH is mapped.

Two transmission schemes may be supported for PUSCH: codebook based transmission and non-codebook based transmission. For codebook based transmission, the gNB 160 may provide the UE with a transmit precoding matrix indication in the DCI. The UE 102 may use the indication to select the PUSCH transmit precoder from the codebook. For non-codebook based transmission, the UE 102 may determine its PUSCH precoder based on wideband SRI field from the DCI. A closed loop DMRS based spatial multiplexing may be supported for PUSCH. For a given UE 102, up to 4 layer transmissions may be supported. The number of code words may be one. When transform precoding is used, only a single MIMO layer transmission may be supported. Transmission durations from 1 to 14 symbols in a slot may be supported. Aggregation of multiple slots with TB repetition may be supported. Two types of frequency hopping may be supported, intra-slot frequency hopping, and in case of slot aggregation, inter-slot frequency hopping. PUSCH may be scheduled with DCI on PDCCH, or a semi-static configured grant may be provided over RRC, where two types of operation may be supported: the first PUSCH is triggered with a DCI, with subsequent PUSCH transmissions following the RRC configuration and scheduling received on the DCI, or the PUSCH is triggered by data arrival to the UE's transmit buffer and the PUSCH transmissions follow the RRC configuration. In the uplink, the gNB 160 can dynamically allocate resources to UEs 102 via the C-RNTI on PDCCH(s). A UE 102 may always monitor the PDCCH(s) in order to find possible grants for uplink transmission when its downlink reception is enabled (activity governed by DRX when configured). When CA is configured, the same C-RNTI may apply to all serving cells.

A UE may upon detection of a PDCCH with a configured DCI format 0_0 or 0_1 transmit the corresponding PUSCH as indicated by that DCI. Upon detection of a DCI format 0_1 with "UL-SCH indicator" set to "0" and with a non-zero "CSI request" where the associated "reportQuantity" in CSI-ReportConfig set to "none" for all CSI report(s) triggered by "CSI request" in this DCI format 0_1, the UE may ignore all fields in this DCI except the "CSI request" and the UE may not transmit the corresponding PUSCH as indicated by this DCI format 0_1. For any HARQ process ID(s) in a given scheduled cell, the UE may not be expected to transmit a PUSCH that overlaps in time with another PUSCH. For any two HARQ process IDs in a given scheduled cell, if the UE is scheduled to start a first PUSCH transmission starting in symbol j by a PDCCH ending in symbol i, the UE may not be expected to be scheduled to transmit a PUSCH starting earlier than the end of the first PUSCH by a PDCCH that ends later than symbol i. The UE may not be expected to be scheduled to transmit another PUSCH by DCI format 0_0 or 0_1 scrambled by C-RNTI or MCS-C-RNTI for a given HARQ process until after the end of the expected transmission of the last PUSCH for that HARQ process.

The UE 102 may determine the resource block assignment in frequency domain using the resource allocation field in the detected PDCCH DCI except for a PUSCH transmission scheduled by a RAR UL grant, in which case the frequency domain resource allocation may be determined. Three uplink resource allocation schemes type 0, type 1 and type 2 may be supported. Uplink resource allocation scheme type 0 may be supported for PUSCH only when transform precoding is disabled. Uplink resource allocation scheme type 1 and type 2 may be supported for PUSCH for both cases when transform precoding is enabled or disabled. Uplink resource allocation scheme type 3 may be supported only for PUSCH in an NR-U cell. If the scheduling DCI is configured to indicate the uplink resource allocation type as part of the Frequency domain resource assignment field by setting a higher layer parameter resourceAllocation in pusch-Config to 'dynamicSwitch', the UE 102 may use uplink resource allocation type 0, type 1 or type 2 as defined by this DCI field. Otherwise the UE 102 may use the uplink frequency resource allocation type as defined by the higher layer parameter resourceAllocation. The UE 102 may assume that when the scheduling PDCCH is received with DCI format 0_0, then uplink resource allocation type 1 is used in a non NR-U cell. The UE 102 may assume that when the scheduling PDCCH is received with DCI format 0_0, then uplink resource allocation type 2 is used in an NR-U cell. If a bandwidth part indicator field is not configured in the scheduling DCI, the RB indexing for uplink type 0, type 1 and type 2 resource allocation may be determined within the UE's active bandwidth part. If a bandwidth part indicator field is configured in the scheduling DCI, the RB indexing for uplink type 0, type 1 and type 2 resource allocation may be determined within the UE's bandwidth part indicated by bandwidth part indicator field value in the DCI. The UE 102 may upon detection of PDCCH intended for the UE 102 determine first the uplink bandwidth part and then the resource allocation within the bandwidth part. RB numbering starts from the lowest RB in the determined uplink bandwidth part.

In uplink resource allocation of type 0, the resource block assignment information may include a bitmap indicating the Resource Block Groups (RBGs) that are allocated to the scheduled UE 102 where a RBG is a set of consecutive virtual resource blocks defined by higher layer parameter rbg-Size configured in pusch-Config and the size of the bandwidth part.

The total number of RBGs ($N_{RBG}$) for a uplink bandwidth part i of size $N_{BWP,i}^{size}$ PRBs may be given by $N_{RBG}=\lceil (N_{BWP,i}^{size}+(N_{BWP,i}^{start} \mod P))/P \rceil$ where the size of the first RBG may be $RBG_0^{size} = P - N_{BWP,i}^{start} \mod P$. The size of the last RBG may be $RBG_{last}^{size} = (N_{BWP,i}^{start} + N_{BWP,i}^{size}) \mod P$ if $(N_{BWP,i}^{start} + N_{BWP,i}^{size}) \mod P > 0$ and P otherwise. The size of all other RBG may be P.

The bitmap may be of size $N_{RBG}$ bits with one bitmap bit per RBG such that each RBG is addressable. The RBGs may be indexed in the order of increasing frequency of the bandwidth part and starting at the lowest frequency. The order of RBG bitmap may be such that RBG 0 to RBG $N_{RBG}-1$ are mapped from MSB to LSB of the bitmap. The RBG may be allocated to the UE 102 if the corresponding bit value in the bitmap is 1, the RBG may not be allocated to the UE 102 otherwise. In frequency range 1, only 'almost contiguous allocation' may be allowed as non-contiguous allocation per component carrier for UL RB allocation for CP-OFDM. In frequency range 2, non-contiguous allocation per component carrier for UL RB allocation for CP-OFDM may not be supported.

In uplink resource allocation of type 1, the resource block assignment information may indicate to a scheduled UE 102 a set of contiguously allocated non-interleaved virtual resource blocks within the active carrier bandwidth part of size $N_{BWP}^{size}$ PRBs except for the case when DCI format 0_0 is decoded in any common search space in which case the size of the initial bandwidth part $N_{BWP,0}^{size}$ may be used. An uplink type 1 resource allocation field may consist of a resource indication value (RIV) corresponding to a starting virtual resource block ($RB_{start}$) and a length in terms of contiguously allocated resource blocks $L_{RBs}$. The resource indication value may be defined by: if $(L_{RBs}-1) \le \lfloor N_{BWP}^{size}/2 \rfloor$ then $RIV = N_{BWP}^{size}(L_{RBs}-1)+RB_{start}$; else $RIV = N_{BWP}^{size}(N_{BWP}^{size}-L_{RBs}+1)+(N_{BWP}^{size}-1-RB_{start})$. $L_{RBs} \ge 1$ and may not exceed $N_{BWP}^{size}-RB_{start}$. When the DCI size for DCI format 0_0 in USS is derived from the initial BWP with size $N_{BWP}^{initial}$ but applied to another active BWP with size of $N_{BWP}^{active}$, an uplink type 1 resource block assignment field may consist of a resource indication value (RIV) corresponding to a starting resource block $RB_{start}=0, K, 2 \cdot K, \ldots -1) \cdot K$ and a length in terms of virtually contiguously allocated resource blocks $L_{RBs}=K, 2 \cdot K, \ldots \cdot K$. The resource indication value may be defined by: if $(L'_{RBs}-1) \leq \lfloor N_{BWP}^{initial}/2 \rfloor$ then $RIV=N_{BWP}^{initial}(L'_{RBs}-1)+RB'_{start}$; else $RIV=N_{BWP}^{initial}(N_{BWP}^{initial}-L'_{RBs}+1)+(N_{BWP}^{initial}-1-RB'_{start})$. $L'_{RBs}=L_{RBs}/K$, $RB'_{start}=RB_{start}/K$ and $L'_{RBs}$ may not exceed $N_{BWP}^{initial}-RB'_{start}$. If $N_{BWP}^{active}>N_{BWP}^{initial}$, K is the maximum value from set {1, 2, 4, 8} which satisfies $K \leq \lfloor N_{BWP}^{active}/N_{BWP}^{initial} \rfloor$; otherwise K=1.

An uplink resource allocation type 2 may be only applicable for an NR-U cell. The uplink resource allocation of type 2 may be used to indicate one or more interlaces, where each interlace consists of a set PRBs which locate discrete frequency positions with a common frequency interval. There are several ways for uplink resource allocation of type 2, for example, RIV-based scheme (referred to as type 2-1 hereafter) and bitmap-based scheme (referred to as type 2-2 hereafter).

The resource allocation information for uplink resource allocation type 2-1 may indicate to a scheduled UE 102 a set of interlacedly allocated virtual resource blocks $RB_{START}+l+i\cdot N$, where $N=\lfloor N_{BWP}^{size}/M_{Interlace}^{max} \rfloor$; i=0,1, ... $M_{Interlace}^{max}-1$; $M_{Interlace}^{max}=10$ for SCS=15 kHz; and $M_{Interlace}^{max}=5$ for SCS=30 kHz, within the active carrier bandwidth part of size $N_{BWP}^{size}$ PRBs except for the case when DCI format 0_0 is decoded in any common search space in which case the size of the initial bandwidth part $N_{BWP,0}^{size}$ and the value of $M_{Interlace}^{max}$ for the SCS of the initial bandwidth part may be used. Alternatively, the resource allocation information for uplink resource allocation type 2-1 may indicate to a scheduled UE 102 a set of interlacedly allocated resource blocks $(RB_{START}-RB_{offset})$ mod N+l+i·N, where N=10 for SCS=15 kHz and N=5 for SCS=30 kHz; and $$i = 0, 1, \ldots, \left\lceil \frac{N_{BWP}^{size} - (RB_{START} - RB_{offset})\text{mod} N - l}{N} \right\rceil,$$

within the active carrier bandwidth part of size $N_{BWP}^{size}$ PRBs and with $RB_{offset}$ for the active carrier bandwidth part except for the case when DCI format 0_0 is decoded in any common search space in which case the size of the initial bandwidth part $N_{BWP,0}^{size}$, the value of N for the SCS of the initial bandwidth part and the value of $RB_{offset}$ of the initial bandwidth part may be used. An uplink type 2 resource block assignment field in the scheduling grant may consist of a resource indication value (RIV). For $0 \leq RIV<N(N+1)/2$ and l=0, 1, ... L−1, the resource indication value corresponds to the starting resource block ($RB_{START}$) and the value of L(L≥1). The resource indication value is defined by: if $(L-1) \leq \lfloor N/2 \rfloor$ then $RIV=N(L-1)+RB_{START}$; else $RIV=N(N-L+1)+(N-1-RB_{START})$. For $RIV \geq N(N+1)/2$, the resource indication value corresponds to the starting resource block ($RB_{START}$) and the set of values l according to associations defined in a table, where each entry of the table specify a respective association between a value of RIV−N(N+1)/2 and a combination of the starting resource block ($RB_{START}$) and the set of 1. In this case, the RIV value set to 0 may correspond to an PRB interlace containing the PRB with the lowest PRB index within the active UL BWP. When the DCI size for DCI format 0_0 in USS is derived from the initial BWP with size $N_{BWP}^{initial}$ but applied to another active BWP with size of $N_{BWP}^{active}$, an uplink type 2 resource block assignment field may consist of a resource indication value (RIV). For $0 \leq RIV<N(N+1)/2$ with the size of the initial bandwidth part $N_{BWP,0}^{size}$ and the value of $M_{Interlace}^{max}$ for the initial bandwidth part, and l=0, ..., K−1, K, ..., 2K−1, ... K(L'−1), ..., K·L'−1, the resource indication value corresponds to the starting resource block ($RB_{START}$) and the value of L (L≥1), where $R'_{START}=RB_{START}/K$ and L'=L/K. The resource indication value is defined by: if $(L-1) \leq \lfloor N/2 \rfloor$ then $RIV=N(L'-1)+RB'_{start}$; else $RIV=N(N-L'+1)+(N-1-RB'_{start})$. L' may not exceed $N_{BWP}^{initial}-RB'_{start}$. If $N_{BWP}^{active}>N_{BWP}^{initial}$, K is the maximum value from set {1, 2, 4, 8} which satisfies $K \leq \lfloor N_{BWP}^{active}/N_{BWP}^{initial} \rfloor$; otherwise K=1.

$RB_{offset}$ may be given by higher layer parameter (e.g. RRC parameter) which may be configured per UL BWP. Alternatively, $RB_{offset}$ may be given by the equation $RB_{offset}=N_{BWP,i}^{start,\mu}$ mod N where $N_{BWP,i}^{start,\mu}$ is the common resource block where bandwidth part starts relative to common resource block 0. Common resource blocks are numbered from 0 and upwards in the frequency domain for subcarrier spacing configuration μ. The center of subcarrier 0 of common resource block 0 for subcarrier spacing configuration μ coincides with 'point A'. The relation between the common resource block number $n_{CRB}^\mu$ in the frequency domain and resource elements (k,l) for subcarrier spacing configuration μ is given by $$n_{CRB}^\mu = \left\lfloor \frac{k}{N_{sc}^{RB}} \right\rfloor,$$

where k is defined relative to point A such that k=0 corresponds to the subcarrier centered around point A.

The resource allocation information for uplink resource allocation type 2-1 may indicate to a scheduled UE 102 a bitmap for indicating a set of interlacedly allocated resource blocks $(RB_{START}-RB_{offset})$ mod N+l+i·N, where N=10 for SCS=15 kHz and N=5 for SCS=30 kHz; and $$i = 0, 1, \ldots, \left\lceil \frac{N_{BWP}^{size} - (RB_{START} - RB_{offset})\text{mod} N - l}{N} \right\rceil,$$

within the active carrier bandwidth part of size $N_{BWP}^{size}$ PRBs and with $RB_{offset}$ for the active carrier bandwidth part except for the case when DCI format 0_0 is decoded in any common search space in which case the size of the initial bandwidth part $N_{BWP,0}^{size}$ and the value of N for the SCS of the initial bandwidth part and he value of $RB_{offset}$ of the initial bandwidth part may be used. The resource block assignment information indicates a bitmap of the allocated values of 1 where l=0, 1, ... N−1. The order of set of resource blocks to bitmap bit mapping is in such way that l=0 to l=N−1 are mapped to MSB to LSB of the bitmap respectively. The set of resource blocks is allocated to the UE if the corresponding bit value in the bitmap is 1, and the set of resource blocks are not allocated otherwise. Alternatively, in uplink resource allocation type 2-2, the resource block assignment information may include a bitmap indicating a set of interlacedly allocated resource blocks, each interlaced resource block group (IRBG) consisting of $(IRBG_{START}-RB_{offset})$ mod N+i·N, where N=10 for SCS=15 kHz and N=5 for SCS=30 kHz; and $$i = 0, 1, \ldots, \left\lceil \frac{N_{BWP}^{size} - (IRBG_{START} - RB_{offset})\text{mod} N}{N} \right\rceil,$$

within the active carrier bandwidth part of size $N_{BWP}^{size}$ PRBs and with $RB_{offset}$ for the active carrier bandwidth part except for the case when DCI format 0_0 is decoded in any common search space in which case the size of the initial bandwidth part $N_{BWP,0}^{size}$, the value of N for the SCS of the initial bandwidth part and he value of $RB_{offset}$ of the initial bandwidth part may be used. The bitmap may be of size N bits with one bitmap bit per IRBG such that each IRBG is addressable by identifying $IRBG_{START}$. The order of bitmap is such that IRBGs with $IRBG_{START}$=0 to $IRBG_{START}$=N−1 are mapped from MSB to LSB of the bitmap. The IRBG is allocated to the UE if the corresponding bit value in the bitmap is 1, the RBG is not allocated to the UE otherwise.

As uplink type 2 resource block assignment scheme, the uplink type 2-1 resource may be always used for all of the DCI formats which schedule PUSCH. Alternatively, as uplink type 2 resource block assignment scheme, the uplink type 2-2 resource may be always used for all of the DCI formats which schedule PUSCH. Yet alternatively, as uplink type 2 resource block assignment scheme, the uplink type 2-1 resource may be used for some of the DCI formats which schedule PUSCH, while the uplink type 2-2 resource may be used for some other of the DCI formats which schedule PUSCH. Yet alternatively, as uplink type 2 resource block assignment scheme, the uplink type 2-1 resource may be used for UL BWP with a certain SCS (e.g. 15 kHz), while the uplink type 2-2 resource may be used for UL BWP with another SCS (e.g. 30 kHz).

Even when the UE 102 is configured with a BWP (e.g. 40, 60, 80 or 100 MHz) wider than 20 MHz, the gNB 160 may schedule PUSCH which is mapped within a part (e.g. 20 MHz) of the BWP. More specifically, even when the gNB 160 configures a BWP consisting of multiple sub-bands to the UE 102, the UE 102 may be scheduled with a PUSCH which is mapped within some but not all of the multiple sub-bands. Preferably, PUSCH may be scheduled on frequency-domain contiguous one or more sub-bands. A DCI format which schedule PUSCH may include a bit field (referred to as sub-band assignment field) for indicating one or more sub-bands (sub-band set) assigned for the PUSCH transmission (i.e. sub-band assignment). The sub-band assignment field may be included in all of the DCI formats scheduling PUSCH. Alternatively, the sub-band assignment field may be included in some of the DCI formats scheduling PUSCH but not included in some other of the DCI formats scheduling PUSCH. For example, the sub-band assignment field may be included in DCI format 0_1 but not included in DCI format 0_0.

At least for NR-U cells operated in 5 GHz spectrum, 20 MHz UL BWP (e.g. up to 106 RBs for 15 kHz SCS, up to 51 RBs for 30 kHz SCS) may include one sub-band (e.g. sub-band #0), 40 MHz UL BWP (e.g. up to 216 RBs for 15 kHz SCS, up to 106 RBs for 30 kHz SCS) may include two sub-bands (e.g. sub-band #0 and sub-band #1), 60 MHz UL BWP (e.g. up to 162 RBs for 30 kHz SCS) may include two sub-bands (e.g. sub-band #0, sub-band #1 and sub-band #2), 80 MHz UL BWP (e.g. up to 217 RBs for 30 kHz SCS) may include two sub-bands (e.g. sub-band #0, sub-band #1, sub-band #2 and sub-band #3), and 100 MHz UL BWP (e.g. up to 273 RBs for 30 kHz SCS) may include two sub-bands (e.g. sub-band #0, sub-band #1, sub-band #2, sub-band #3 and sub-band #4). Each of the sub-bands may be a set of consecutive virtual resource blocks. The sub-bands may be indexed within the BWP in an increasing order starting from the lowest frequency. There may not be any gap between adjacent sub-bands. Alternatively, there may be a gap in unit of resource block between adjacent sub-bands. The sub-band size S in unit of resource block may depend on the SCS of the active UL BWP. For example, the sub-band size for SCS=15 kHz may be equal to 108, and the sub-band size for SCS=30 kHz may be equal to 53.

Alternatively, the sub-band size S in unit of resource block may depend on the SCS of the active UL BWP and the size of the active UL BWP. For example, the sub-band size for SCS=15 kHz may be equal to 108 for 40 MHz UL BWP, and the sub-band size for SCS=30 kHz may be equal to 53 for 40 MHz UL BWP. The sub-band sizes of three sub-bands for SCS=30 kHz and for 60 MHz UL BWP may be 53, 55 and 53. The sub-band sizes of four sub-bands for SCS=30 kHz and for 80 MHz UL BWP may be 53, 55, 55 and 53. The sub-band sizes of five sub-bands for SCS=30 kHz and for 100 MHz UL BWP may be 54, 55, 55, 55 and 54. For another example, the sub-band sizes of two sub-bands for SCS=15 kHz and for 40 MHz UL BWP may be equal to 110 and 106. The sub-band sizes of two sub-bands for SCS=30 kHz and for 40 MHz UL BWP may be equal to 55 and 51. The sub-band sizes of three sub-bands for SCS=30 kHz and for 60 MHz UL BWP may be 55, 55 and 51. The sub-band sizes of four sub-bands for SCS=30 kHz and for 80 MHz UL BWP may be 55, 55, 55 and 51. The sub-band sizes of five sub-bands for SCS=30 kHz and for 100 MHz UL BWP may be 55, 55, 55, 55 and 51. For yet another example, the sub-band sizes of two sub-bands for. SCS=15 kHz and for 40 MHz UL BWP may be equal to 106 and 110. The sub-band sizes of two sub-bands for SCS=30 kHz and for 40 MHz UL BWP may be equal to 51 and 55. The sub-band sizes of three sub-bands for SCS=30 kHz and for 60 MHz UL BWP may be 51, 55 and 55. The sub-band sizes of four sub-bands for SCS=30 kHz and for 80 MHz UL BWP may be 51, 55, 55 and 55. The sub-band sizes of five sub-bands for SCS=30 kHz and for 100 MHz UL BWP may be 51, 55, 55, 55 and 55. Note that the order of the above sub-bands within the UL BWP may be an increase order along with frequency domain from the lowest frequency to the highest frequency within the UL BWP.

DCI formats which schedules PUSCH on NR-U cell may need to indicate several kinds of information, such as channel access procedure type (i.e. LBT category), channel access priority class, PUSCH starting position, etc. For channel access procedure type, the gNB 160 may need to inform the UE 102 of which channel access procedure type among Cat-1 LBT (also referred to as Type-0 UL channel access procedure or no channel sensing), Cat-2 LBT (also referred to as Type-2 UL channel access procedure) with 16 μs duration, Cat-2 LBT with 25 μs duration and Cat-4 LBT (also referred to as Type-1 UL channel access procedure) is used for the transmission of the PUSCH that the DCI format schedules. For channel access priority class, the gNB 160 may need to inform the UE 102 of which channel access priority class among classes 1, 2, 3 and 4 is used for the Cat-4 LBT for the transmission of the PUSCH that the DCI format schedules. For PUSCH starting position, the gNB 160 may need to inform the UE 102 of fractional symbol based starting position the PUSCH that the DCI format schedules so that an appropriate gap length from the previous transmission is created. These parameters may affect one another.

Figure 27:
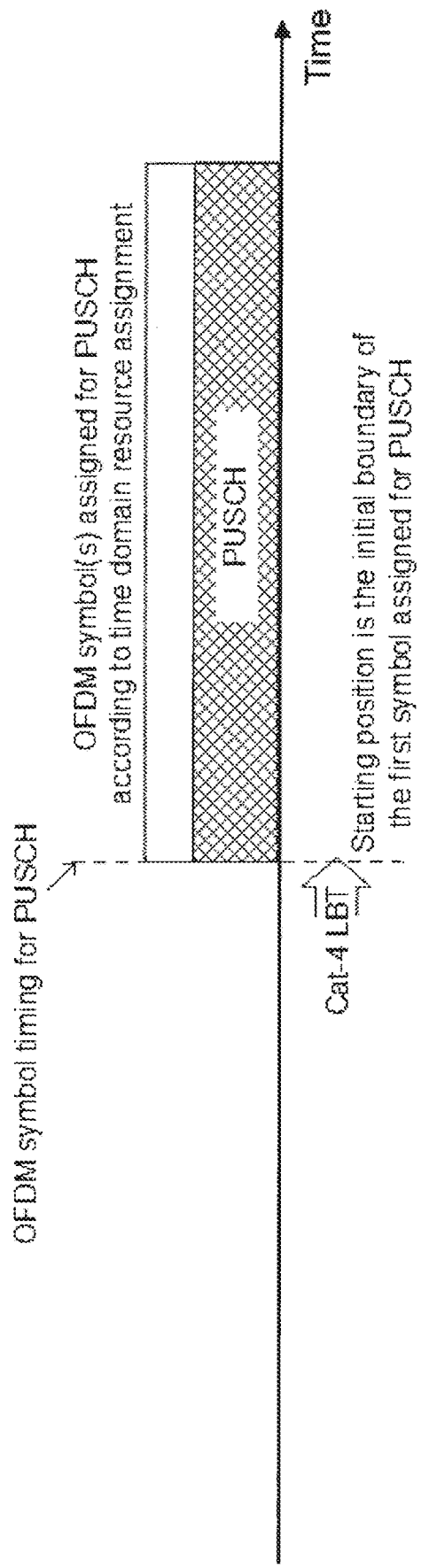
FIG. 27 shows a typical case for PUSCH transmission.

FIG. 27 shows a typical case for PUSCH transmission. In this case, there is no uplink or downlink transmission for a while before the schedule PUSCH transmission. Through the DCI format which schedules PUSCH, the gNB 160 may inform the UE 102 of that Cat-4 LBT is used for the PUSCH transmission. The DCI format may also indicate channel access priority class. The DCI format may further indicate that the starting position of the PUSCH is the initial boundary of the first symbol assigned for the PUSCH (i.e. x μs after the initial boundary of the first symbol where x=0) according to the time domain resource allocation field in the DCI format.

Figure 28:
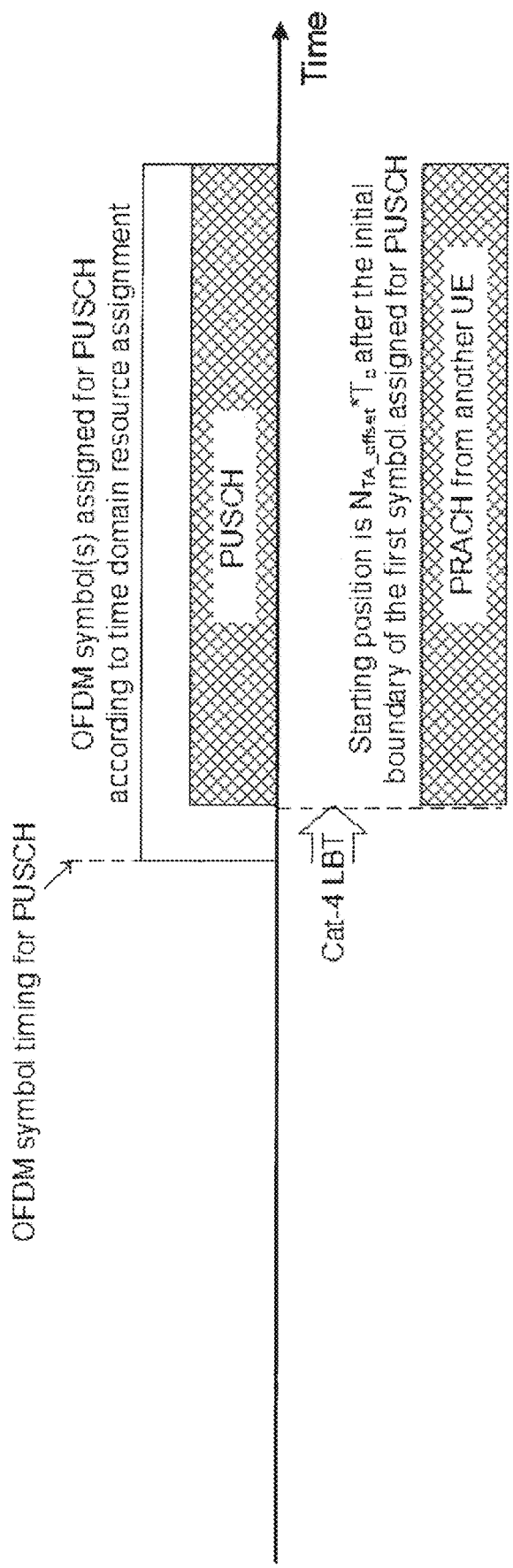
FIG. 28 shows a typical case for PUSCH transmission.

FIG. 28 shows a typical case for PUSCH transmission. In this case, there is no uplink or downlink transmission for a while before the schedule PUSCH transmission, but there could be another UE's PRACH transmission of which the time resource overlaps with the concerned PUSCH transmission. Through the DCI format which schedules PUSCH, the gNB 160 may inform the UE 102 of that Cat-4 LBT is used for the PUSCH transmission. The DCI format may also indicate channel access priority class. The DCI format may further indicate that the starting position of the PUSCH is $N_{TA\_offset}*T_c$ after the initial boundary of the first symbol assigned for the PUSCH, so that the starting position of the PUSCH is aligned with the starting position of a possible PRACH transmission from another UE.

Downlink and uplink transmissions may be organized into frames with $T_f=(\Delta f_{max}N_f/100) \cdot T_c=10$ ms duration, each consisting of ten subframes of $T_{sf}=(\Delta f_{max}N_f/1000) \cdot T_c=1$ ms duration. The number of consecutive OFDM symbols per subframe may be $N_{symb}^{subframe,\mu}=N_{symb}^{slot}N_{slot}^{subframe,\mu}$. Each frame may be divided into two equally-sized half-frames of five subframes each with half-frame 0 consisting of subframes 0-4 and half-frame 1 consisting of subframes 5-9. There may be one set of frames in the uplink and one set of frames in the downlink on a carrier. Uplink frame number i for transmission from the UE 102 may start $T_{TA}=(N_{TA}+N_{TA,offset})T_c$ before the start of the corresponding downlink frame at the UE. The UE 102 may have capability to follow the frame timing change of the reference cell in connected state. The uplink frame transmission may take place $(N_{TA}+N_{TAoffset}) \times T_c$ before the reception of the first detected path (in time) of the corresponding downlink frame from the reference cell. If the UE 102 is configured with a primary Timing Adjustment Group (pTAG, also referred to as TAG for master cell group (MCG)) containing the PCell, UE may use the PCell as the reference cell for deriving the UE transmit timing for cells in the pTAG. If the UE is configured with a primary secondary TAG (psTAG, also referred to as TAG for secondary cell group (SCG)) containing the PSCell, UE may use the PSCell as the reference cell for deriving the UE transmit timing for cells in the psTAG. UE initial transmit timing accuracy, maximum amount of timing change in one adjustment, minimum and maximum adjustment rate are defined in the following requirements. A UE can be provided a value $N_{TA\_offset}$ of a timing advance offset for a serving cell by n-TimingAdvanceOffset for the serving cell. If the UE is not provided n-TimingAdvanceOffset for a serving cell, the UE may determine a default value $N_{TA\_offset}$ of the timing advance offset for the serving cell. The default value of $N_{TA\_offset}$ may be 25600, 25600, 0, 39936 or 13792 in unit of $T_c$ for FR1 FDD band without LTE-NR coexistence case, FR1 TDD band without LTE-NR coexistence case, FR1 FDD band with LTE-NR coexistence case, FR1 TDD band with LTE-NR coexistence case or FR2 case, respectively.

For a SCS of $2^\mu \cdot 15$ kHz, the timing advance command for a TAG may indicate the change of the uplink timing relative to the current uplink timing for the TAG in multiples of $16.64 \cdot T_c/2^\mu$. For the start timing of the random access preamble, $N_{TA}=0$ may be assumed. In case of random access response, a timing advance command, $T_A$, for a TAG may indicate $N_{TA}$ values by index values of $T_A=0, 1, 2, \ldots, 3846$, where an amount of the time alignment for the TAG with SCS of $2^\mu \cdot 15$ kHz is $N_{TA}=T_A \cdot 16 \cdot 64/2^\mu$. $N_{TA}$ may be relative to the SCS of the first uplink transmission from the UE after the reception of the random access response. In other cases, a timing advance command, $T_A$, for a TAG may indicate adjustment of a current $N_{TA}$ value, $N_{TA\_old}$, to the new $N_{TA}$ value, $N_{TA\_new}$, by index values of $T_A=0, 1, 2, \ldots, 63$, where for a SCS of $2^\mu \cdot 15$ kHz, $N_{TA\_new} = N_{TA\_old}+(T_A-31) \cdot 16 \cdot 64/2^\mu$. $T_c=1/(\Delta f_{max} \cdot N_f)$ where $\Delta f_{max}=480 \cdot 10^3$ Hz and $N_f=4096$, namely $T_c$ is $1/(480*10^3*4096)$. $N_{TA}$ is a timing adjustment value, and $N_{TA\_offset}$ is a timing advance offset value.

Figure 29:
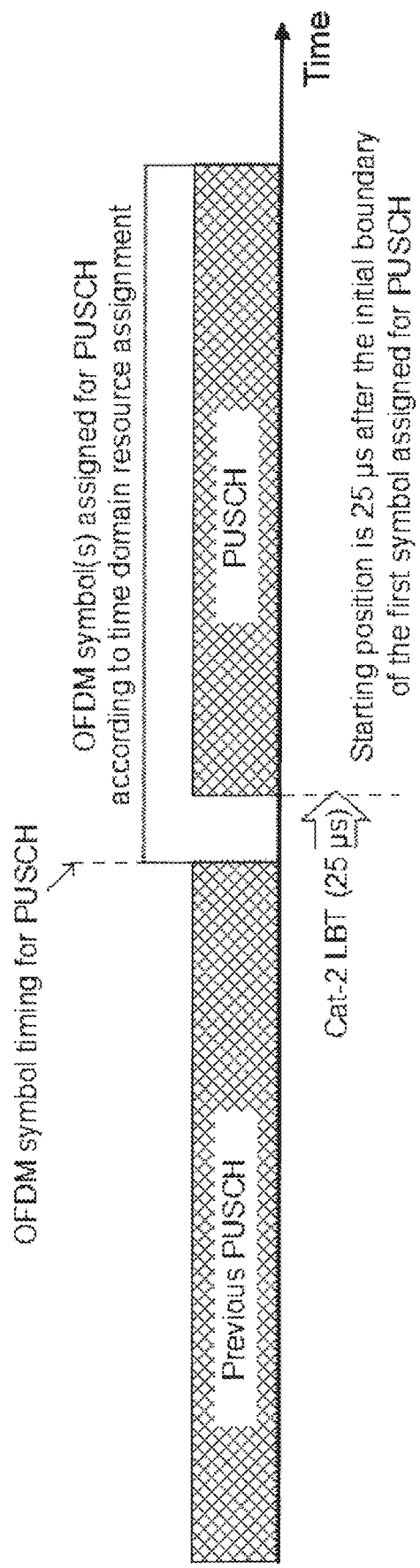
FIG. 29 shows a typical case for PUSCH transmission.

FIG. 29 shows a typical case for PUSCH transmission. In this case, there is another uplink transmission before the schedule PUSCH transmission. Through the DCI format which schedules PUSCH, the gNB 160 may inform the UE 102 of that Cat-2 LBT with 25 μs duration is used for the PUSCH transmission. The DCI format may not have to indicate channel access priority class, because Cat-2 LBT does not need information of the channel access priority class. Alternatively, although the DCI format may not indicate channel access priority class, the UE 102 may not use the indicated channel access priority class. The DCI format may further indicate that the starting position of the PUSCH is 25 μs after the initial boundary of the first symbol assigned for the PUSCH so that a 25 μs gap between the end of the previous uplink transmission and the start of the scheduled PUSCH is created.

Figure 30:
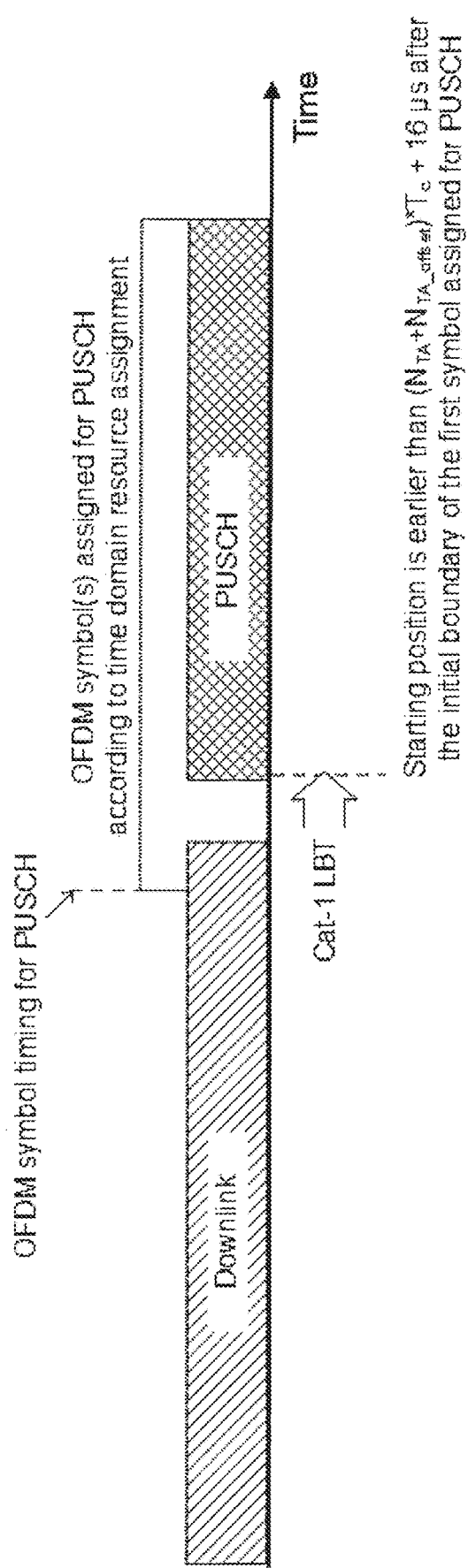
FIG. 30 shows a typical case for PUSCH transmission.

FIG. 30 shows a typical case for PUSCH transmission. In this case, there is a downlink transmission before the schedule PUSCH transmission. Through the DCI format which schedules PUSCH, the gNB 160 may inform the UE 102 of that Cat-1 LBT is used for the PUSCH transmission. The DCI format may not have to indicate channel access priority class, because Cat-1 LBT does not need information of the channel access priority class. Alternatively, although the DCI format may not indicate channel access priority class, the UE 102 may not use the indicated channel access priority class. The DCI format may further indicate that the starting position of the PUSCH is x μs after the initial boundary of the first symbol assigned for the PUSCH, where $(N_{TA}+N_{TA\_offset})*T_c \leq x < (N_{TA}+N_{TA\_offset})*T_c+16$ μs, so that a gap between the end of the previous downlink transmission and the start of the scheduled PUSCH is ensured to be less than 16 μs.

Figure 31:
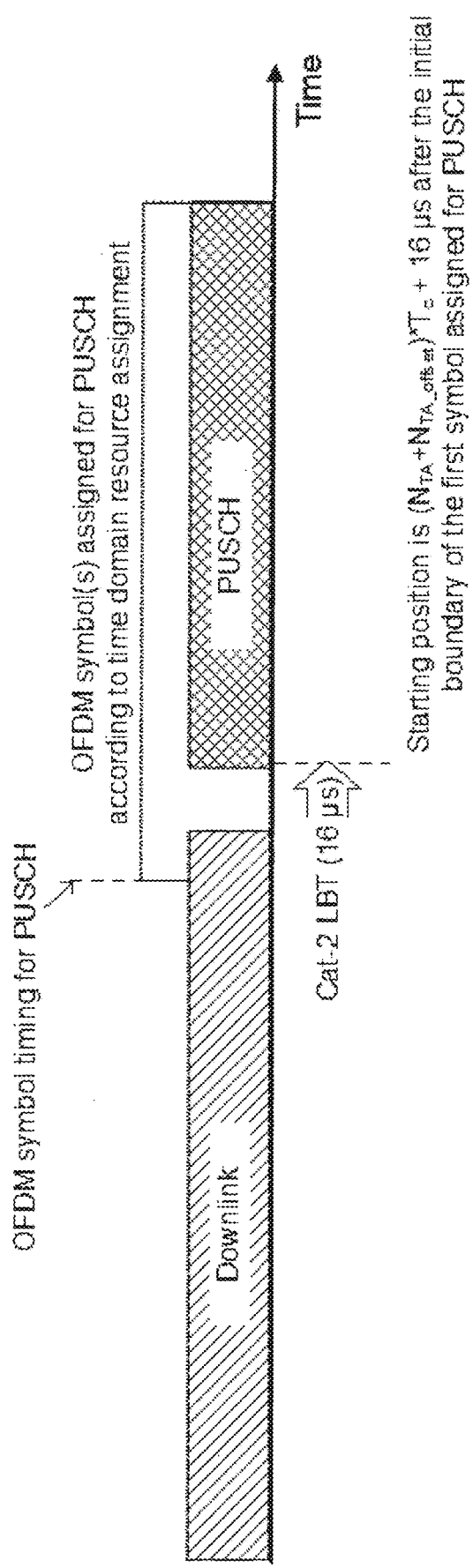
FIG. 31 shows a typical case for PUSCH transmission.

FIG. 31 shows a typical case for PUSCH transmission. In this case, there is a downlink transmission before the schedule PUSCH transmission. Through the DCI format which schedules PUSCH, the gNB 160 may inform the UE 102 of that Cat-2 LBT with 16 μs duration is used for the PUSCH transmission. The DCI format may not have to indicate channel access priority class, because Cat-2 LBT does not need information of the channel access priority class. Alternatively, although the DCI format may not indicate channel access priority class, the UE 102 may not use the indicated channel access priority class. The DCI format may further indicate that the starting position of the PUSCH is $(N_{TA}+N_{TA\_offset})*T_c+16$ μs after the initial boundary of the first symbol assigned for the PUSCH so that a 16 μs gap between the end of the previous downlink transmission and the start of the scheduled PUSCH is created.

Figure 32:
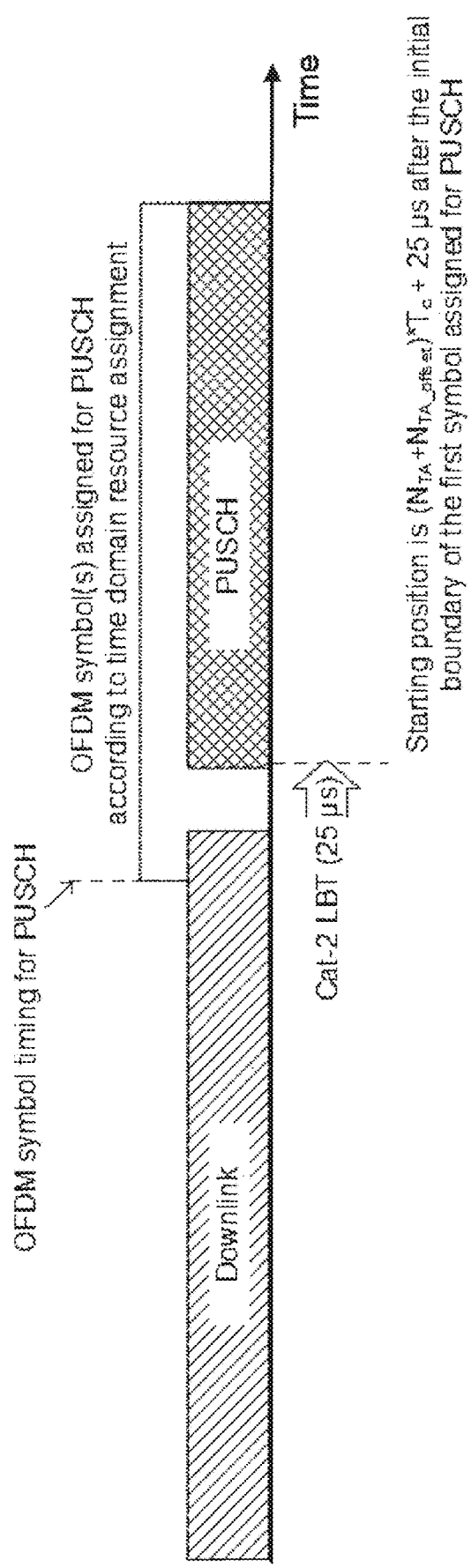
FIG. 32 shows a typical case for PUSCH transmission.

FIG. 32 shows a typical case for PUSCH transmission. In this case, there is a downlink transmission before the schedule PUSCH transmission. Through the DCI format which schedules PUSCH, the gNB 160 may inform the UE 102 of that Cat-2 LBT with 25 μs duration is used for the PUSCH transmission. The DCI format may not have to indicate channel access priority class, because Cat-2 LBT does not need information of the channel access priority class. Alternatively, although the DCI format may not indicate channel access priority class, the UE 102 may not use the indicated channel access priority class. The DCI format may further indicate that the starting position of the PUSCH is $(N_{TA}+N_{TA\_offset})*T_c+25$ µs after the initial boundary of the first symbol assigned for the PUSCH so that a 25 µs gap between the end of the previous downlink transmission and the start of the scheduled PUSCH is created.

Figure 33:
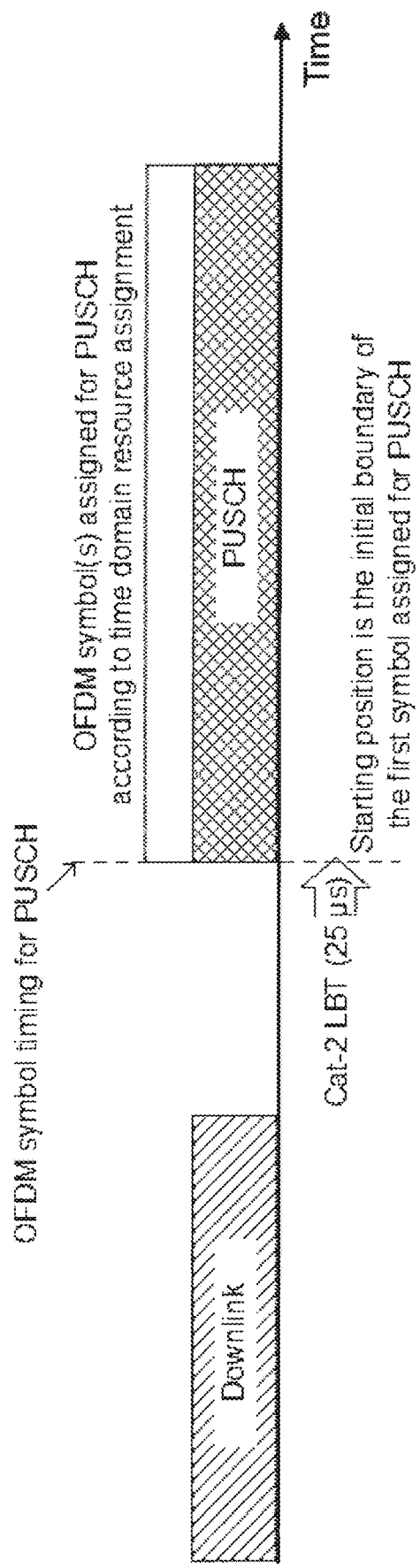
FIG. 33 shows a typical case for PUSCH transmission.

FIG. 33 shows a typical case for PUSCH transmission. In this case, there is a downlink transmission before the schedule PUSCH transmission. Through the DCI format which schedules PUSCH, the gNB 160 may inform the UE 102 of that Cat-2 LBT with 25 µs duration is used for the PUSCH transmission. The DCI format may not have to indicate channel access priority class, because Cat-2 LBT does not need information of the channel access priority class. Alternatively, although the DCI format may not indicate channel access priority class, the UE 102 may not use the indicated channel access priority class. The DCI format may further indicate that the starting position of the PUSCH is the initial boundary of the first symbol assigned for the PUSCH. A more-than-100 µs gap between the end of the previous downlink transmission and the start of the scheduled PUSCH may be present.

There may be several options in terms of notification of channel access procedure type, duration for Cat-2 LBT, channel access priority class for Cat-4 LBT, and PUSCH starting position.

The first option is that a single 4-bit information field in the DCI format indicates a combination of channel access procedure type, duration for Cat-2 LBT, channel access priority class for Cat-4 LBT, and PUSCH starting position. The UE 102 detecting the DCI format may use the field value to determine values of these parameters according to a pre-defined association between the information field values and the combinations of channel access procedure type, duration for Cat-2 LBT, channel access priority class for Cat-4 LBT, and PUSCH starting position. Table 10 shows an example of association between the information field values and the combinations of channel access procedure type, duration for Cat-2 LBT, channel access priority class for Cat-4 LBT, and PUSCH starting position.

TABLE 10

| Field value | Channel access procedure type | Duration for Cat-2 LBT | Channel access priority class p for Cat-4 LBT | PUSCH starting position x |
|---|---|---|---|---|
| 0 | Cat-1 LBT | — | — | $(N_{TA} + N_{TA\_offset})*T_c \leq x \leq (N_{TA} + N_{TA\_offset})*T_c + 16$ µs |
| 1 | Cat-2 LBT | 16 µs | — | $x = (N_{TA} + N_{TA\_offset})*T_c + 16$ µs |
| 2 | Cat-2 LBT | 25 µs | — | $x = 0$ µs |
| 3 | Cat-2 LBT | 25 µs | — | $x = 25$ µs |
| 4 | Cat-2 LBT | 25 µs | — | $x = (N_{TA} + N_{TA\_offset})*T_c + 25$ µs |
| 5 | Cat-4 LBT | — | Class 1 | $x = 0$ µs |
| 6 | Cat-4 LBT | — | Class 2 | $x = 0$ µs |
| 7 | Cat-4 LBT | — | Class 3 | $x = 0$ µs |
| 8 | Cat-4 LBT | — | Class 4 | $x = 0$ µs |
| 9 | Reserved | Reserved | Reserved | Reserved |
| 10 | Reserved | Reserved | Reserved | Reserved |
| 11 | Reserved | Reserved | Reserved | Reserved |
| 12 | Reserved | Reserved | Reserved | Reserved |
| 13 | Reserved | Reserved | Reserved | Reserved |
| 14 | Reserved | Reserved | Reserved | Reserved |
| 15 | Reserved | Reserved | Reserved | Reserved |

Table 11 shows another example of association between the information field values and the combinations of channel access procedure type, duration for Cat-2 LBT, channel access priority class for Cat-4 LBT, and PUSCH starting position.

TABLE 11

| Field value | Channel access procedure type | Duration for Cat-2 LBT | Channel access priority class p for Cat-4 LBT | PUSCH starting position x |
|---|---|---|---|---|
| 0 | Cat-1 LBT | — | — | $(N_{TA} + N_{TA\_offset})*T_c \leq x \leq (N_{TA} + N_{TA\_offset})*T_c + 16$ µs |
| 1 | Cat-2 LBT | 16 µs | — | $x = (N_{TA} + N_{TA\_offset})*T_c + 16$ µs |
| 2 | Cat-2 LBT | 25 µs | — | $x = 0$ µs |
| 3 | Cat-2 LBT | 25 µs | — | $x = 25$ µs |
| 4 | Cat-2 LBT | 25 µs | — | $x = (N_{TA} + N_{TA\_offset})*T_c + 25$ µs |
| 5 | Cat-4 LBT | — | Class 1 | $x = 0$ µs |
| 6 | Cat-4 LBT | — | Class 2 | $x = 0$ µs |
| 7 | Cat-4 LBT | — | Class 3 | $x = 0$ µs |
| 8 | Cat-4 LBT | — | Class 4 | $x = 0$ µs |
| 9 | Cat-4 LBT | — | Class 1 | $x = (N_{TA\_offset})*T_c$ µs |
| 10 | Cat-4 LBT | — | Class 2 | $x = (N_{TA\_offset})*T_c$ µs |
| 11 | Cat-4 LBT | — | Class 3 | $x = (N_{TA\_offset})*T_c$ µs |
| 12 | Cat-4 LBT | — | Class 4 | $x = (N_{TA\_offset})*T_c$ µs |
| 13 | Reserved | Reserved | Reserved | Reserved |

TABLE 11-continued

| Field value | Channel access procedure type | Duration for Cat-2 LBT | Channel access priority class p for Cat-4 LBT | PUSCH starting position x |
|---|---|---|---|---|
| 14 | Reserved | Reserved | Reserved | Reserved |
| 15 | Reserved | Reserved | Reserved | Reserved |

The associations shown in Table 10 and 11 may be characterized by the following aspects. A single entry may correspond to Cat-1 LBT. For Cat-1 LBT, the duration and the channel access priority class may not be specified. For Cat-1 LBT, a single PUSCH starting position is specified. A four entries (which is more than the one for Cat-1 LBT) may correspond to Cat-2 LBT. Among the four entries, a single entry may correspond to Cat-2 LBT with 16 μs duration and three entries (which is more than the one for Cat-2 LBT with 16 μs duration and the one for Cat-4 LBT) may correspond to Cat-2 LBT with 25 μs duration. For Cat-2 LBT, the channel access priority class may not be specified. For Cat-2 LBT with 16 μs duration, a single PUSCH starting position is specified. For Cat-2 LBT with 25 μs duration, three different PUSCH starting positions are specified. A four or eight (i.e. multiple of four) entries may correspond to Cat-4 LBT. For Cat-4 LBT, the duration may not be specified. For Cat-4 LBT, a single PUSCH starting position (e.g. x=0 μs) may be specified. Alternatively, two different PUSCH starting positions may be specified. For Cat-4 LBT and for a given PUSCH starting position, four different channel access priority classed are specified.

The second option is that a two information fields in the DCI format jointly indicates a combination of channel access procedure type, duration for Cat-2 LBT, channel access priority class for Cat-4 LBT, and PUSCH starting position. The first 2-bit information field may indicate the channel access procedure type. The second 2-bit information field may indicate either a combination of the duration and the PUSCH starting position or a combination of the channel access priority class and the PUSCH starting position, depending on the value of the first information field. Table 12 shows an example of the first 2-bit information. Tables 13 and 14 show examples of the second 2-bit information.

TABLE 12

| Field value | Channel access procedure type |
|---|---|
| 0 | Cat-1 LBT |
| 1 | Cat-2 LBT |
| 2 | Cat-4 LBT |
| 3 | Reserved |

TABLE 13

| Field value | Duration for Cat-2 LBT | PUSCH starting position x |
|---|---|---|
| 0 | 16 μs | $x = (N_{TA} + N_{TA\_offset})*T_c + 16$ μs |
| 1 | 25 μs | $x = 0$ μs |
| 2 | 25 μs | $x = 25$ μs |
| 3 | 25 μs | $x = (N_{TA} + N_{TA\_offset})*T_c + 25$ μs |

TABLE 14

| Field value | Channel access priority class p for Cat-4 LBT |
|---|---|
| 0 | Class 1 |
| 1 | Class 2 |
| 2 | Class 3 |
| 3 | Class 4 |

Tables 12, 13 and 14 may be characterized by the following aspects. The value of the first 2-bit information field may indicate one of Cat-1 LBT, Cat-2 LBT and Cat-4 LBT. If the value of the first 2-bit information field indicates Cat-1 LBT, the PUSCH starting position is determined as $(N_{TA} + N_{TA\_offset})*T_c \leq x < (N_{TA}+N_{TA\_offset})*T_c+16$ μs without referring to the second 2-bit information field. If the value of the first 2-bit information field indicates Cat-2 LBT, the value of the second 2-bit information field may be interpreted according to Table 13. Based on Table 13, the duration and PUSCH starting position may be determined. If the value of the first 2-bit information field indicates Cat-4 LBT, PUSCH starting position is determined as $x=0$ μs and the value of the second 2-bit information field may be interpreted according to Table 14. In Table 14, each of the four entries may correspond to a respective channel priority class.

The third option is that a two information fields in the DCI format jointly indicates a combination of channel access procedure type, duration for Cat-2 LBT, channel access priority class for Cat-4 LBT, and PUSCH starting position. The first 2-bit information field may indicate a combination of the channel access procedure type and the duration for Cat-2 LBT. The second 2-bit information field may indicate either the PUSCH starting position or the channel access priority class, depending on the value of the first information field. Table 15 shows an example of the first 2-bit information. Tables 16 and 17 show examples of the second 2-bit information.

TABLE 15

| Field value | Channel access procedure type | Duration for Cat-2 LBT |
|---|---|---|
| 0 | Cat-1 LBT | — |
| 1 | Cat-2 LBT | 16 μs |
| 2 | Cat-2 LBT | 25 μs |
| 3 | Cat-4 LBT | — |

TABLE 16

| Field value | PUSCH starting position x |
|---|---|
| 0 | $x = 0$ μs |
| 1 | $x = 25$ μs |
| 2 | $x = (N_{TA} + N_{TA\_offset})*T_c + 25$ μs |
| 3 | Reserved |

TABLE 17

| Field value | Channel access priority class p for Cat-4 LBT |
|---|---|
| 0 | Class 1 |
| 1 | Class 2 |
| 2 | Class 3 |
| 3 | Class 4 |

Tables 15, 16 and 17 may be characterized by the following aspects. The value of the first 2-bit information field may indicate one of Cat-1 LBT, Cat-2 LBT with 16 μs, Cat-2 LBT with 25 μs, and Cat-4 LBT. If the value of the first 2-bit information field indicates Cat 1 LBT, the PUSCH starting position is determined as $(N_{TA}+N_{TA\_offset})*T_c \leq x < (N_{TA}+N_{TA\_offset})*T_c+16$ μs without referring to the second 2-bit information field. If the value of the first 2-bit information field indicates Cat-2 LBT with 16 μs, the PUSCH starting position is determined as $x=(N_{TA}+N_{TA\_offset})*T_c+16$ μs without referring to the second 2-bit information field. If the value of the first 2-bit information field indicates Cat-2 LBT with 25 μs, the value of the second 2-bit information field may be interpreted according to Table 16. Based on Table 16, PUSCH starting position may be determined. If the value of the first 2-bit information field indicates Cat-4 LBT, PUSCH starting position is determined as x=0 μs and the value of the second 2-bit information field may be interpreted according to Table 17. In Table 17, each of the four entries may correspond to a respective channel priority class.

The fourth option is that an information fields in the DCI format indicates one of RRC-configured combinations of channel access procedure type, duration for Cat-2 LBT, channel access priority class for Cat-4 LBT, and PUSCH starting position. More specifically, the gNB 160 may send RRC parameters for configuring Y entries in terms of combinations of channel access procedure type, duration for Cat-2 LBT, channel access priority class for Cat-4 LBT, and PUSCH starting position. The information field may consist of ceiling($\log_2(Y)$) bits and may indicate one out of Y entries. The UE 102 detecting the DCI format may assume and/or use a combination of channel access procedure type, duration for Cat-2 LBT, channel access priority class for Cat-4 LBT and PUSCH starting position corresponding to the entry indicated by the information field.

The fifth option is that an information fields in the DCI format indicates one of RRC-selected combinations of channel access procedure type, duration for Cat-2 LBT, channel access priority class for Cat-4 LBT, and PUSCH starting position. More specifically, possible combinations of channel access procedure type, duration for Cat-2 LBT, channel access priority class for Cat-4 LBT, and PUSCH starting position may be predefined and indexed. For example, combinations shown by Table 10 or Table 11 may be predefined and indexed as indices described in the field value column. The gNB 160 may send RRC parameters for configuring Y entries, each entry being set with a respective index among indices of the predefined combinations. The information field may consist of ceiling($\log_2(Y)$) bits and may indicate one out of Y entries. The UE 102 detecting the DCI format may assume and/or use a combination of channel access procedure type, duration for Cat-2 LBT, channel access priority class for Cat-4 LBT and PUSCH starting position which correspond to the index associated with the entry indicated by the information field.

Different options may apply to different DCI formats. For example, the fourth option or the fifth option may apply to the DCI format 0_1 whose size depends on dedicated RRC configuration, while the first option (including the modified first option which uses subsets, instead of the full sets, of the combinations shown in Table 10 or 11), the second option or the third option may apply to the RAR UL grant and the DCI format 0_0 whose sizes do not depend on dedicated RRC configuration.

Predefined subsets of the combinations shown in Table 10 or 11 may be used by DCI format 0_0 and the RAR UL grant, while the full sets of the combinations shown in Table 10 or 11 may be used by DCI format 0_1. Different subsets may apply to different RNTI. For example, the first predefined subsets of the combinations shown in Table 10 or 11 may be used by DCI format 0_0 with CRC scrambled by TC-RNTI, while the second predefined subsets (which may be different from the first predefined subsets) of the combinations shown in Table 10 or 11 may be used by DCI format 0_0 with CRC scrambled by C-RNTI. Different subsets may apply to different types of search space sets. For example, the first predefined subsets of the combinations shown in Table 10 or 11 may be used by DCI format 0_0 in common search space set, while the second predefined subsets (which may be different from the first predefined subsets) of the combinations shown in Table 10 or 11 may be used by DCI format 0_0 in UE-specific search space set.

Figure 34:
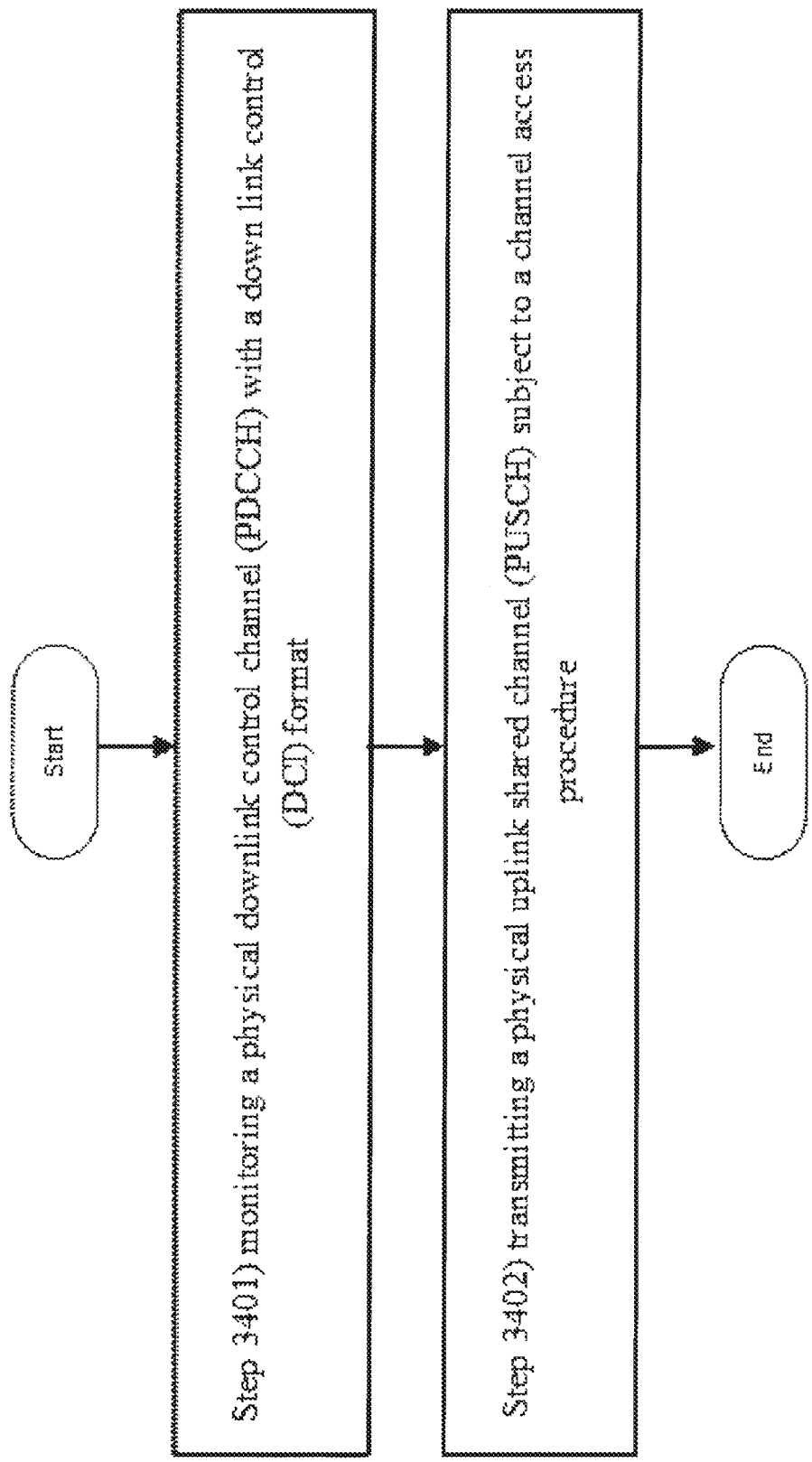
FIG. 34 shows a method for a UE which communicates with a gNB.

FIG. 34 shows a method for a UE which communicates with a gNB. The method may comprise monitoring a physical downlink control channel (PDCCH) with a down link control (DCI) format (Step 3401). The method may also comprise transmitting a physical uplink shared channel (PUSCH) subject to a channel access procedure (Step 3402). A starting position of the PUSCH may be x micro seconds after an initial boundary of an initial symbol which is assigned for the PUSCH. The DCI format may include a 4-bit information field. The 4-bit information may be characterized by at least one or more of following values: a first value of the 4-bit information field indicates that a channel access procedure type is Category-1 Listen-Before-Talk (Cat-1 LBT) and $(N_{TA}+N_{TA\_offset})*T_c \leq x < (N_{TA}+N_{TA\_offset})*T_c+16$; a second value of the 4-bit information field indicates that the channel access procedure type is Cat-2 LBT, a duration for Cat-2 LBT is 16 micro seconds and $x=(N_{TA}+N_{TA\_offset})*T_c+16$; a third value of the 4-bit information field indicates that the channel access procedure type is Cat-2 LBT, the duration for Cat-2 LBT is 25 micro seconds and x=0; a fourth value of the 4-bit information field indicates that the channel access procedure type is Cat-2 LBT, the duration for Cat-2 LBT is 25 micro seconds and x=25; a fifth value of the 4-bit information field indicates that the channel access procedure type is Cat-2 LBT, the duration for Cat-2 LBT is 25 micro seconds and $x=(N_{TA}+N_{TA\_offset})*T_c+25$; a sixth value of the 4-bit information field indicates that the channel access procedure type is Cat-4 LBT, channel access priority class for Cat-4 LBT is class 1 and x=0; a seventh value of the 4-bit information field indicates that the channel access procedure type is Cat-4 LBT, the channel access priority class for Cat-4 LBT is class 2 and x=0; an eighth value of the 4-bit information field indicates that the channel access procedure type is Cat-4 LBT, the channel access priority class for Cat-4 LBT is class 3 and x=0; and a ninth value of the 4-bit information field indicates that the channel access procedure type is Cat-4 LBT, the channel access priority class for Cat-4 LBT is class 4 and x=0. $N_{TA}$ may be a timing adjustment value. $N_{TA\_offset}$ may be a timing advance offset value. $T_c$ may be $1/(480*10^3*4096)$.

Figure 35:
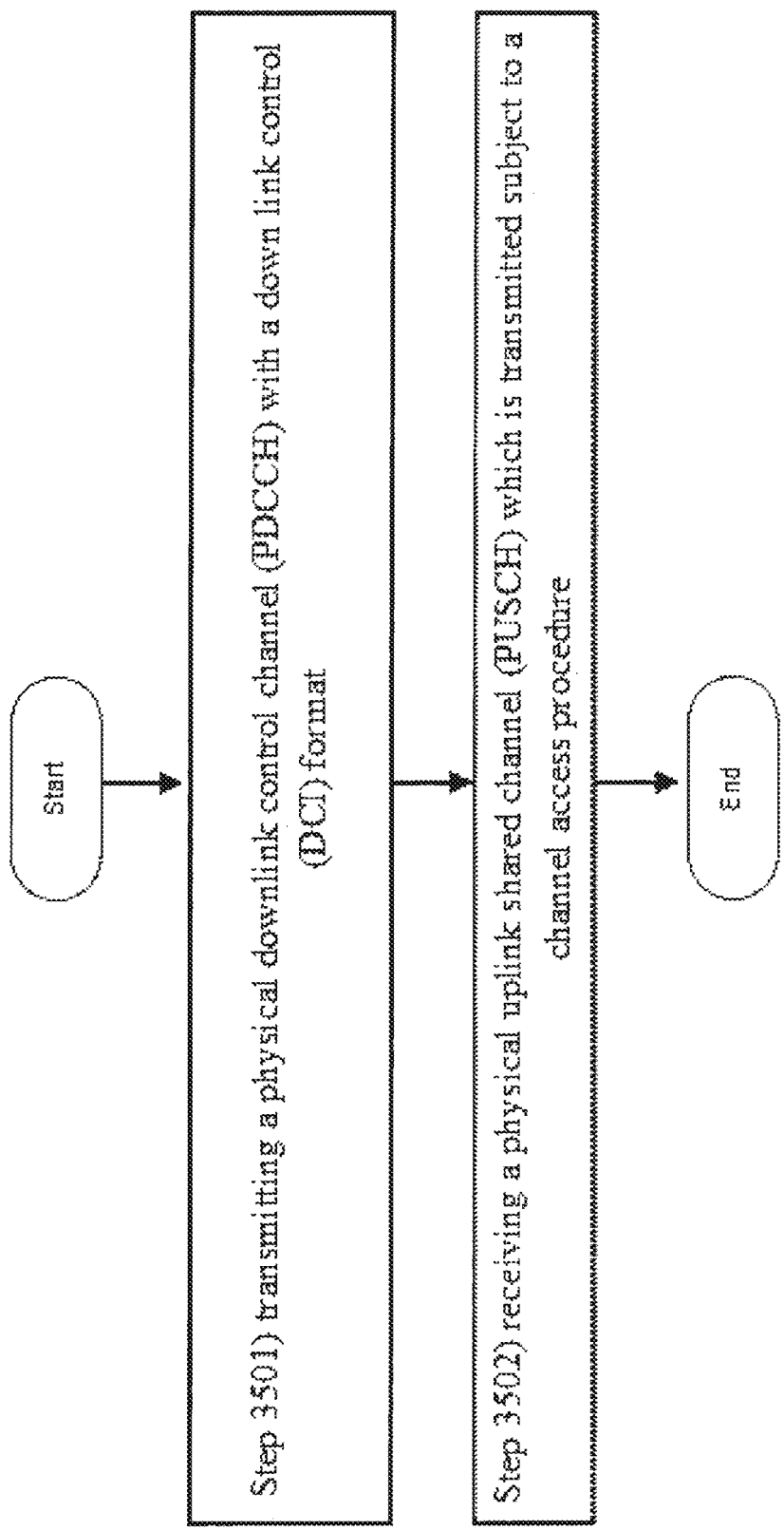
FIG. 35 shows a method for a gNB which communicates with a UE.

FIG. 35 shows a method for a gNB which communicates with a UE. The method may comprise transmitting a physical downlink control channel (PDCCH) with a down link control (DCI) format (Step 3501). The method may also comprise receiving a physical uplink shared channel (PUSCH) which is transmitted subject to a channel access procedure (Step 3502). A starting position of the PUSCH may be x micro seconds after an initial boundary of an initial symbol which is assigned for the PUSCH. The DCI format may include a 4-bit information field. The 4-bit information may be characterized by at least one or more of following values: a first value of the 4-bit information field indicates that a channel access procedure type is Category-1 Listen-Before-Talk (Cat-1 LBT) and $(N_{TA}+N_{TA\_offset})*T_c \leq x < (N_{TA} \pm N_{TA\_offset})*T_c+16$; a second value of the 4-bit information field indicates that the channel access procedure type is Cat-2 LBT, a duration for Cat-2 LBT is 16 micro seconds and $x=(N_{TA}+N_{TA\_offset})*T_c+16$; a third value of the 4-bit information field indicates that the channel access procedure type is Cat-2 LBT, the duration for Cat-2 LBT is 25 micro seconds and x=0; a fourth value of the 4-bit information field indicates that the channel access procedure type is Cat-2 LBT, the duration for Cat-2 LBT is 25 micro seconds and x=25; a fifth value of the 4-bit information field indicates that the channel access procedure type is Cat-2 LBT, the duration for Cat-2 LBT is 25 micro seconds and $x=(N_{TA}+N_{TA\_offset})*T_c+25$; a sixth value of the 4-bit information field indicates that the channel access procedure type is Cat-4 LBT, channel access priority class for Cat-4 LBT is class 1 and x=0; a seventh value of the 4-bit information field indicates that the channel access procedure type is Cat-4 LBT, the channel access priority class for Cat-4 LBT is class 2 and x=0; an eighth value of the 4-bit information field indicates that the channel access procedure type is Cat-4 LBT, the channel access priority class for Cat-4 LBT is class 3 and x=0; and a ninth value of the 4-bit information field indicates that the channel access procedure type is Cat-4 LBT, the channel access priority class for Cat-4 LBT is class 4 and x=0. $N_{TA}$ may be a timing adjustment value. $N_{TA\_offset}$ may be a timing advance offset value. $T_c$ may be $1/(480*10^3*4096)$.

The 4-bit information may be characterized by at least one or more of following values: a tenth value of the 4-bit information field indicates that the channel access procedure type is Cat-4 LBT, the channel access priority class for Cat-4 LBT is class 1 and $x=N_{TA\_offset}*T_c$; an eleventh value of the 4-bit information field indicates that the channel access procedure type is Cat-4 LBT, the channel access priority class for Cat-4 LBT is class 2 and $x=N_{TA\_offset}*T_c$; a twelfth value of the 4-bit information field indicates that the channel access procedure type is Cat-4 LBT, the channel access priority class for Cat-4 LBT is class 3 and $x=N_{TA\_offset}*T_c$; and a thirteenth value of the 4-bit information field indicates that the channel access procedure type is Cat-4 LBT, the channel access priority class for Cat-4 LBT is class 4 and $x=N_{TA\_offset}*T_c$.

It should be noted that the above-described variables used as number of pieces or indices may be considered to be non-negative integers.

It should be noted that a decision on whether a given channel and/or data (including TB and CB) is successfully received or not may be done by referring to Cyclic Redundancy Check (CRC) bits which is appended to the given channel and/or data.

It should be noted that various modifications are possible within the scope of the present invention defined by claims, and embodiments that are made by suitably combining technical means disclosed according to the different embodiments are also included in the technical scope of the present invention.

It should be noted that basically the UE 102 and the gNB 160 may have to assume same procedures. For example, when the UE 102 follows a given procedure (e.g., the procedure described above), the gNB 160 may also have to assume that the UE 102 follows the procedure. Additionally, the gNB 160 may also have to perform the corresponding procedures. Similarly, when the gNB 160 follows a given procedure, the UE 102 may also have to assume that the gNB 160 follows the procedure. Additionally, the UE 102 may also have to perform the corresponding procedures. The physical signals and/or channels that the UE 102 receives may be transmitted by the gNB 160. The physical signals and/or channels that the UE 102 transmits may be received by the gNB 160. The higher-layer signals and/or channels (e.g., dedicated RRC configuration messages) that the UE 102 acquires may be sent by the gNB 160. The higher-layer signals and/or channels (e.g., dedicated RRC configuration messages, MAC CE messages) that the UE 102 sends may be acquired by the gNB 160.

It should be noted that names of physical channels and/or signals described herein are examples.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The invention claimed is:

1. A user equipment (UE) which communicates with a base station, the UE comprising:
receiving circuitry configured to monitor a physical downlink control channel (PDCCH) with a down link control information (DCI) format; and
transmitting circuitry configured to transmit a physical uplink shared channel (PUSCH) subject to a channel access procedure, a starting position of an initial symbol for the PUSCH being adjusted by using a value x; wherein the DCI format includes an information field,
the information field is characterized by a first value and at least one or more of a second value, a third value, a fourth value, a fifth value, a sixth value, a seventh value, an eighth value, and a ninth value:
the first value of the information field indicating that a channel access procedure type of the channel access procedure is Category-1 Listen-Before-Talk (Cat-1 LBT), and the value x is given at least by a Timing Advance (TA) value and 16, where Cat-1 LBT is a type of a channel access procedure without channel sensing;
the second value of the information field indicating that the channel access procedure type is Cat-2 LBT, a duration for Cat-2 LBT is 16 micro seconds, and the value x is given at least by the TA value and 16, where Cat-2 LBT is a type of a channel access procedure with a channel sensing with a single time slot;
the third value of the information field indicating that the channel access procedure type is Cat-2 LBT, the duration for Cat-2 LBT is 25 micro seconds, and x=0;
the fourth value of the information field indicating that the channel access procedure type is Cat-2 LBT, the duration for Cat-2 LBT is 25 micro seconds, and x is given at least by 25 without the TA value;
the fifth value of the information field indicating that the channel access procedure type is Cat-2 LBT, the duration for Cat-2 LBT is 25 micro seconds, and x is given at least by the TA value and 25;
the sixth value of the information field indicating that the channel access procedure type is Cat-4 LBT, channel access priority class for Cat-4 LBT is class 1, and x=0, where Cat-4 LBT is a type of a channel access procedure with a random backoff with an adaptive Contention Window (CW) size;
the seventh value of the information field indicating that the channel access procedure type is Cat-4 LBT, the channel access priority class for Cat-4 LBT is class 2, and x=0;
the eighth value of the information field indicating that the channel access procedure type is Cat-4 LBT, the channel access priority class for Cat-4 LBT is class 3, and x=0; and
the ninth value of the information field indicating that the channel access procedure type is Cat-4 LBT, the channel access priority class for Cat-4 LBT is class 4, and x=0.

2. A base station which communicates with a user equipment (UE), the base station comprising:
transmitting circuitry configured to transmit a physical downlink control channel (PDCCH) with a down link control information (DCI) format; and
receiving circuitry configured to receive a physical uplink shared channel (PUSCH) which is transmitted subject to a channel access procedure, a starting position of an initial symbol for the PUSCH being adjusted by using a value x, wherein
the DCI format includes an information field,
the information field is characterized by a first value and at least one or more of a second value, a third value, a fourth value, a fifth value, a sixth value, a seventh value, an eighth value, and a ninth value:
the first value of the information field indicating that a channel access procedure type of the channel access procedure is Category-1 Listen-Before-Talk (Cat-1 LBT), and the value x is given at least by a Timing Advance (TA) value and 16, wherein Cat-1 LBT is a type of a channel access procedure without channel sensing;

the second value of the information field indicating that the channel access procedure type is Cat-2 LBT, a duration for Cat-2 LBT is 16 micro seconds, and the value x is given at least by the TA value and 16, wherein Cat-2 LBT is a type of a channel access procedure with a channel sensing with a single time slot;

the third value of the information field indicating that the channel access procedure type is Cat-2 LBT, the duration for Cat-2 LBT is 25 micro seconds, and x=0;

the fourth value of the information field indicating that the channel access procedure type is Cat-2 LBT, the duration for Cat-2 LBT is 25 micro seconds, and x is given at least by 25 without the TA value;

the fifth value of the information field indicating that the channel access procedure type is Cat-2 LBT, the duration for Cat-2 LBT is 25 micro seconds, and x is given at least by the TA value and 25;

the sixth value of the information field indicating that the channel access procedure type is Cat-4 LBT, channel access priority class for Cat-4 LBT is class 1, and x=0, wherein Cat-4 LBT is a type of a channel access procedure with a random backoff with an adaptive Contention Window (CW) size;

the seventh value of the information field indicating that the channel access procedure type is Cat-4 LBT, the channel access priority class for Cat-4 LBT is class 2, and x=0;

the eighth value of the information field indicating that the channel access procedure type is Cat-4 LBT, the channel access priority class for Cat-4 LBT is class 3, and x=0; and the ninth value of the information field indicating that the channel access procedure type is Cat-4 LBT, the channel access priority class for Cat-4 LBT is class 4, and x=0.

3. A method for a user equipment (UE) which communicates with a base station, the method comprising:

monitoring a physical downlink control channel (PDCCH) with a down link control information (DCI) format; and transmitting a physical uplink shared channel (PUSCH) subject to a channel access procedure, a starting position of an initial symbol for the PUSCH being adjusted by using a value x, wherein the DCI format includes an information field, the information field is characterized by a first value and at least one or more of a second value, a third value, a fourth value, a fifth value, a sixth value, a seventh value, an eighth value, and a ninth value:

the first value of the information field indicating that a channel access procedure type of the channel access procedure is Category-1 Listen-Before-Talk (Cat-1 LBT), and the value x is given at least by a Timing Advance (TA) value and 16, wherein Cat-1 LBT is a type of a channel access procedure without channel sensing;

the second value of the information field indicating that the channel access procedure type is Cat-2 LBT, a duration for Cat-2 LBT is 16 micro seconds, and the value x is given at least by the TA value and 16, wherein Cat-2 LBT is a type of a channel access procedure with a channel sensing with a single time slot;

the third value of the information field indicating that the channel access procedure type is Cat-2 LBT, the duration for Cat-2 LBT is 25 micro seconds, and x=0;

the fourth value of the information field indicating that the channel access procedure type is Cat-2 LBT, the duration for Cat-2 LBT is 25 micro seconds, and x is given at least by 25 without the TA value;

the fifth value of the information field indicating that the channel access procedure type is Cat-2 LBT, the duration for Cat-2 LBT is 25 micro seconds and x is given at least by the TA value and 25;

the sixth value of the information field indicating that the channel access procedure type is Cat-4 LBT, channel access priority class for Cat-4 LBT is class 1, and x=0, wherein Cat-4 LBT is a type of a channel access procedure with a random backoff with an adaptive Contention Window (CW) size;

the seventh value of the information field indicating that the channel access procedure type is Cat-4 LBT, the channel access priority class for Cat-4 LBT is class 2, and x=0;

the eighth value of the information field indicating that the channel access procedure type is Cat-4 LBT, the channel access priority class for Cat-4 LBT is class 3, and x=0; and the ninth value of the information field indicating that the channel access procedure type is Cat-4 LBT, the channel access priority class for Cat-4 LBT is class 4, and x=0.

* * * * *